US010569682B2

(12) United States Patent
Tanabe et al.

(10) Patent No.: US 10,569,682 B2
(45) Date of Patent: Feb. 25, 2020

(54) MOUNTING MEMBER AND AIRBAG MODULE-EQUIPPED SEAT

(71) Applicant: TS TECH CO., LTD., Asaka-shi, Saitama (JP)

(72) Inventors: Jinichi Tanabe, Tochigi (JP); Hiroshi Izawa, Tochigi (JP); Hiroshi Baba, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 83 days.

(21) Appl. No.: 15/680,596

(22) Filed: Aug. 18, 2017

(65) Prior Publication Data
US 2017/0349075 A1 Dec. 7, 2017

Related U.S. Application Data

(62) Division of application No. 14/361,140, filed as application No. PCT/JP2012/080778 on Nov. 28, 2012, now Pat. No. 9,738,197.

(30) Foreign Application Priority Data

Nov. 29, 2011 (JP) ................................ 2011-260623
Dec. 7, 2011 (JP) ................................ 2011-268259
(Continued)

(51) Int. Cl.
*B60N 2/66* (2006.01)
*B60N 2/68* (2006.01)
(Continued)

(52) U.S. Cl.
CPC ............. *B60N 2/72* (2013.01); *B60N 2/5841* (2013.01); *B60N 2/66* (2013.01); *B60N 2/68* (2013.01);
(Continued)

(58) Field of Classification Search
CPC .......... B60R 21/207; B60R 2021/2076; B60R 2021/2078; B60N 2002/5808
See application file for complete search history.

(56) References Cited

U.S. PATENT DOCUMENTS 5,975,567 A    11/1999  Higashiura
6,003,939 A    12/1999  Nakai et al.
(Continued)

FOREIGN PATENT DOCUMENTS

EP    2 292 478 A1    3/2011
EP    2 322 392 A1    5/2011
(Continued)

OTHER PUBLICATIONS

Extended European Search Report issued in related application EP 12854026.7, dated Apr. 17, 2015, 7 pages.
(Continued)

*Primary Examiner* — Timothy J Brindley
(74) *Attorney, Agent, or Firm* — Drinker Biddle & Reath LLP

(57) ABSTRACT

An easy-to-attach clip member that makes the surroundings of a stay cloth mounting portion compact while maintaining high airbag deployment performance, and an airbag module-equipped seat with the clip member are provided. A clip member is connected to a cloth-form body that transmits a tensile force. The clip member includes a connecting portion connected to one end of the cloth-form body, and a groove engaged with an edge portion of a mounted portion. The clip member is provided to reduce a torque generated at the connecting portion by the tensile force transmitted from the cloth-form body when engaged with the edge portion of the mounted portion, and connects the cloth-form body to the mounted portion.

18 Claims, 51 Drawing Sheets

(30) Foreign Application Priority Data

| | | | |
|---|---|---|---|
| Feb. 22, 2012 | (JP) | | 2012-036655 |
| Feb. 28, 2012 | (JP) | | 2012-041846 |
| Mar. 2, 2012 | (JP) | | 2012-046941 |
| Mar. 8, 2012 | (JP) | | 2012-051853 |
| Mar. 14, 2012 | (JP) | | 2012-057851 |
| Mar. 19, 2012 | (JP) | | 2012-062409 |

(51) Int. Cl.
  *B60R 21/207* (2006.01)
  *B60N 2/72* (2006.01)
  *B60N 2/58* (2006.01)
  *F16B 2/22* (2006.01)
  *F16B 5/06* (2006.01)

(52) U.S. Cl.
  CPC .............. *B60R 21/207* (2013.01); *F16B 2/22* (2013.01); *F16B 5/0692* (2013.01); *B60N 2002/5808* (2013.01); *B60R 2021/2076* (2013.01)

(56) References Cited

U.S. PATENT DOCUMENTS

| | | | |
|---|---|---|---|
| 6,439,597 | B1 | 8/2002 | Harada et al. |
| 6,474,733 | B1 | 11/2002 | Heilig et al. |
| 8,820,780 | B2 | 9/2014 | Thomas |
| 9,346,431 | B1 | 5/2016 | Kim |
| 2002/0063452 | A1 | 5/2002 | Harada et al. |
| 2004/0239081 | A1* | 12/2004 | Tredez .................. B60R 21/207 280/728.2 |
| 2006/0113751 | A1* | 6/2006 | Tracht .................. B60N 2/5825 280/728.2 |
| 2006/0113752 | A1* | 6/2006 | Tracht .................. B60R 21/207 280/728.2 |
| 2006/0113772 | A1 | 6/2006 | Tracht |
| 2007/0145727 | A1 | 6/2007 | Inoue et al. |
| 2007/0187933 | A1* | 8/2007 | Tracht .................. B60R 21/207 280/730.2 |
| 2007/0222190 | A1 | 9/2007 | Tracht |
| 2008/0111355 | A1* | 5/2008 | Zink .................. B60R 21/207 280/730.2 |
| 2008/0129021 | A1* | 6/2008 | Bozintan .............. B60R 21/207 280/728.2 |
| 2008/0136237 | A1 | 6/2008 | Kayumi et al. |
| 2008/0203787 | A1 | 8/2008 | Tracht et al. |
| 2008/0296941 | A1 | 12/2008 | Bederka et al. |
| 2009/0001783 | A1 | 1/2009 | Hazlewood et al. |
| 2009/0001784 | A1* | 1/2009 | Wieczorek ............ B60R 21/207 297/216.1 |
| 2009/0134610 | A1 | 5/2009 | Kai et al. |
| 2009/0206581 | A1 | 8/2009 | Lawall et al. |
| 2014/0183846 | A1 | 7/2014 | Fujiwara et al. |
| 2014/0197621 | A1* | 7/2014 | Thomas ............... B60R 21/207 280/730.2 |
| 2014/0375028 | A1 | 12/2014 | Sahashi |
| 2015/0054261 | A1 | 2/2015 | Tanabe et al. |
| 2015/0076802 | A1 | 3/2015 | Tanabe et al. |
| 2015/0307000 | A1 | 10/2015 | Kozaki |
| 2016/0068129 | A1 | 3/2016 | Tanabe et al. |
| 2016/0114751 | A1 | 4/2016 | Saito et al. |
| 2016/0244018 | A1 | 8/2016 | Zimmermann |
| 2016/0257276 | A1* | 9/2016 | Line ........................ B60N 2/68 |
| 2016/0325646 | A1 | 11/2016 | Tanabe et al. |

FOREIGN PATENT DOCUMENTS

| | | |
|---|---|---|
| JP | S51-008308 U | 1/1976 |
| JP | S63-199660 U | 12/1988 |
| JP | H2-26600 U | 2/1990 |
| JP | H3-44066 Y | 9/1991 |
| JP | H4-53718 Y | 12/1992 |
| JP | H6-38794 U | 5/1994 |
| JP | H7-27920 Y | 6/1995 |
| JP | 08-258661 A | 10/1996 |
| JP | 09-295547 A | 11/1997 |
| JP | 2000-168485 A | 2/2000 |
| JP | 2000-085517 A | 3/2000 |
| JP | 2001-287578 A | 10/2001 |
| JP | 2002-067857 A | 3/2002 |
| JP | 2002-154361 A | 5/2002 |
| JP | 2002-166816 A | 6/2002 |
| JP | 2003-220923 A | 8/2003 |
| JP | 2003-252164 A | 9/2003 |
| JP | 2008-030557 A | 2/2008 |
| JP | 2009-143379 A | 7/2009 |
| JP | 2010-042719 A | 2/2010 |
| JP | 2010-511569 B2 | 4/2010 |
| JP | 4543270 B2 | 7/2010 |
| JP | 2010-179752 A | 8/2010 |
| JP | 4560659 B2 | 8/2010 |
| JP | 2011-183942 A | 9/2011 |
| JP | 2011-230687 A | 11/2011 |
| WO | 2008/070711 A2 | 6/2008 |

OTHER PUBLICATIONS

Office Action issued in related application JP 2011-268259, dated Dec. 1, 2015, with machine generated English translation, 6 pages.

Office Action issued in related application JP 2012-062409, dated Dec. 22, 2015, with machine generated English translation, 6 pages.

Office Action issued in related application JP 2012-057851, dated May 24, 2016, with machine generated English language translation, 4 pages.

Office Action issued in related application JP 2016-124896, dated Apr. 18, 2017, with machine generated English language translation, 6 pages.

Office Action issued in related application JP 2016-124907, dated Apr. 18, 2017, with machine generated English language translation, 7 pages.

Office Action issued in related application JP 2016-124930, dated Apr. 18, 2017, with machine generated English language translation, 7 pages.

Office Action issued in related application JP 2016-133472, dated May 30, 2017, with machine generated English language translation, 6 pages.

Office Action issued in related application JP 2016-153994, dated Jul. 4, 2017, with machine generated English language translation, 6 pages.

Office Action issued in related application JP 2017-230796, dated Nov. 6, 2018, with machine generated English language translation, 6 pages.

\* cited by examiner

MOUNTING MEMBER AND AIRBAG MODULE-EQUIPPED SEAT

CROSS-REFERENCE TO RELATED APPLICATIONS

This application is a divisional of U.S. patent application Ser. No. 14/361,140, filed on May 28, 2014, now U.S. Pat. No. 9,738,197, which is the U.S. national phase of the International Patent Application No. PCT/JP2012/080778, filed Nov. 28, 2012, which claims the benefit of:

| Japanese Patent Application No. | Filed |
| --- | --- |
| JP 2011-260623 | Nov. 29, 2011 |
| JP 2011-268259 | Dec. 7, 2011 |
| JP 2012-036655 | Feb. 22, 2012 |
| JP 2012-041846 | Feb. 28, 2012 |
| JP 2012-046941 | Mar. 2, 2012 |
| JP 2012-051853 | Mar. 8, 2012 |
| JP 2012-057851 | Mar. 14, 2012 |
| JP 2012-062409 | Mar. 19, 2012 | the contents of all being incorporated by reference herein in their entirety.

BACKGROUND

The present disclosure relates to a clip member and an airbag module-equipped seat, and relates to a clip member for engaging a stay cloth for enclosing an airbag module provided at a side portion of a seat back, and an airbag module-equipped seat.

As a conventional airbag module-equipped seat, a seat with an airbag module mounted to a side frame of a seat back frame has been proposed, in which edges of a trim cover and one edge of each of two stay cloths are sewn together to form a tearing portion of the trim cover, the airbag module is enclosed with the two stay cloths drawn from the tearing portion into the inside of the trim cover, and an entire seat back including the airbag module is covered with the trim cover (for example, Japanese Patent Document No. JP 4543270 B1 ("the '270 Document") and Japanese Patent Document No. JP 4560659 B1 ("the '659 Document")).

In the '270 Document, two listing wires are provided at a side frame opposite to an airbag module in such a manner as to intertwine with each other like a wire puzzle. Edges of two stay cloths drawn from a tearing portion into both sides of the airbag module are extended to the two listing wires in such a manner as to enclose the airbag module, and are attached to the respective listing wires.

According to the invention of the '270 Document, the airbag module can be directly enclosed with the stay cloths, and the stay cloths can be securely fixedly attached under tension with the listing wires with the stay cloths at the ends. Thus, the stay cloths can efficiently concentrate the inflation pressure of an airbag to a seam constituting the tearing portion of a trim cover, realizing high deployment performance of the airbag.

However, in the invention of the '270 Document, since the listing wires are provided in such a manner as to intertwine like a wire puzzle, the structure of the listing wires is complicated and the mounting process is also complicated. Further, since the listing wires are necessary to mount the stay cloths to the side frame, the surroundings of the side frame is made large. A more compact configuration has been desired.

In the '659 Document, hooking pins in a vertically elongating rod shape are provided at a module cover housing an airbag module inside, and hooks are connected to end portions of stay cloths continuous from a tearing portion of a trim cover, opposite to the tearing portion. The end portions of the stay cloths opposite to the tearing portion are fixedly connected to the module cover by hooking the hooks on the hooking pins of the module cover.

According to the invention of the '659 Document, it is only necessary to draw the stay cloths into a cavity from an opening edge of a back pad, and hook the hooks of trim codes on the hooking pins of the module cover inside the cavity. Thus the stay cloths can be mounted compact and easily.

Like this, techniques to engage hooks attached to end portions of stay cloths with the airbag module side have been known. However, for hooks as in the '659 Document, hooks engaged with the airbag module side can be rotated by a force applied during airbag deployment.

Further, it has been desired to develop a mechanism that prevents a stay cloth from moving when an end portion of the stay cloth is mounted.

Moreover, the process of mounting end portions of a stay cloth made from a soft cloth requires manual dexterity, and can take time.

Furthermore, it has been desired to further increase support stiffness at an end portion of a stay cloth. In addition, it has been desired to develop a mechanism that prevents, when a tensile force of a stay cloth is applied, an end portion side of the stay cloth to which the tensile force is transmitted from deforming a wall of a holding space holding the end portion side of the stay cloth.

SUMMARY

The present solution has been made in view of the above problems. An object according to various embodiments of the present invention is to provide an easy-to-attach clip member that makes the surroundings of a stay cloth mounting portion compact while maintaining high airbag deployment performance, and an airbag module-equipped seat with the clip member.

A further object is to provide a mounting portion structure that restricts movement of an end portion of a stay cloth mounted to the mounting member from the mounting member, a mounting member, and an airbag module-equipped seat.

Another object is to provide a mounting portion structure improved in workability in mounting a stay cloth to a seat back frame by including a guide that allows for instantaneous perception at the time of mounting that an end portion of a stay cloth is disposed in an appropriate place of the mounting member, a mounting member, and an airbag module-equipped seat.

Another object is to provide a mounting portion structure improved in workability in connecting a stay cloth made from a soft cloth body to a mounting member, a mounting member, and an airbag module-equipped seat.

In addition, another object is to provide a mounting portion structure improved in support stiffness at an end portion side of a guide member for guiding the deployment direction of an airbag module in a holding space of a mounting portion, a mounting member, and an airbag module-equipped seat.

Another object is to provide a mounting portion structure in which when the tensile force is applied to a guide member for guiding the deployment direction of the airbag module, a wall of a holding space of a mounting portion is prevented from being deformed by a pressing force from the end portion side of the guide member to which the tensile force is transmitted, a mounting member, and an airbag module-equipped seat.

Still another object is to provide a mounting portion structure that allows a mounting portion for mounting a guide member for guiding the deployment direction of an airbag module to a mounted portion to be made compact, a mounting member, and an airbag module-equipped seat.

According to various embodiments of the invention, the above-described problems are solved by a mounting member connected to a guide member that transmits a tensile force, including: a connecting portion connected to one end of the guide member; and a groove engaged with an edge portion of a mounted portion, the mounting member being provided to reduce a torque generated at the connecting portion by the tensile force transmitted from the guide member, when engaged with the edge portion of the mounted portion; and the mounting member connecting the guide member to the mounted portion.

Thus, the mounting member connected to the guide member that transmits the tensile force connects the guide member to the mounted portion. Therefore, when the connection between the guide member and the mounted portion is released, the guide member is free from dragging and twisting. In addition, the surroundings of the mounting portion of the guide member can be made compact. Further, since the mounting member is provided to reduce a torque generated at the connecting portion by the tensile force transmitted from the guide member when engaged with the edge portion of the mounted portion, with the guide member connected to the mounted portion, the mounting member can be prevented from rotating more than necessary and causing the guide member to be disengaged from the mounted portion.

Moreover, only with the guide member, the mounting member, and the mounted portion, the guide member can be connected to the mounted portion, thus resulting in a simple configuration and facilitated mounting work. Furthermore, even when the configuration of the mounted portion is changed, the same components can be used without change in shape or the like.

A mounting member connected to a guide member with an edge attached to a tearing portion of a trim cover of an airbag module-equipped seat may include a connecting portion connected to one end of the guide member; and a groove engaged with an edge portion of a side frame of a seat back frame of the seat, the mounting member being provided to reduce a torque generated at the connecting portion by the tensile force transmitted from the guide member, when engaged with the edge portion of the side frame; and the mounting member connecting the guide member to the side frame.

Accordingly, the mounting member can be applied to a seat with an airbag module mounted to a side frame.

Further, since the mounting member mounted to the other edge portion of the stay cloth connects the stay cloth to the side frame, the surroundings of the stay cloth mounting portion can be made compact while high airbag deployment performance is maintained without obstructing airbag inflation and deployment. Moreover, since the mounting member is provided to reduce a torque generated at the connecting portion by the tensile force transmitted from the guide member when engaged with the edge portion of the frame, this can prevent the mounting member from rotating more than necessary to cause the stay cloth to be disengaged from the side frame when the airbag is not deployed. As a result, when the airbag is not deployed, the effect of maintaining a sufficient connection strength between the stay cloth and the side frame via the mounting member can be achieved by a simple configuration.

Moreover, only with the stay cloth, the mounting member, and the side frame, the stay cloth can be connected to the side frame, thus resulting in a simple configuration and facilitated mounting work. Furthermore, even when the shape of an airbag deployment portion or an airbag is changed, the same components can be used without change in shape or the like.

The mounting member may further include the tensile force absorbing portion for absorbing the tensile force transmitted from the guide member to reduce the torque.

Accordingly, a torque generated about the connecting portion can be reduced, and a simple configuration can make the guide member difficult to be disengaged from the side frame when the airbag is not deployed.

The side frame may have a curved flange at the edge portion; and the mounting member may further include a wide portion formed adjacent to the groove, the wide portion generally conforming to the shape of an area surrounded by the flange and the side frame.

Thus, in the mounting member, the wide portion generally conforming to the shape of the inner wall surface of the flange is formed adjacent to the groove so that movement of the wide portion inside an inner wall surface of the flange can be restricted and the mounting member can be prevented from wobbling.

A trim plate may be fixed to the end portion of the guide member; an engaging portion for engaging the trim plate may be provided at the wide portion; and the trim plate may be configured to be disengageable from the engaging portion by the force of the airbag inflating and deploying.

Accordingly, by the trim plate being disengaged from the engaging portion, the stay cloth can be easily released from the side frame during airbag inflation and deployment. Further, by selecting the strength of the trim plate, the shapes of the trim plate and the engaging portion, or the like as appropriate, it can be easily set under what measure of force the stay cloth is released from the side frame.

The engaging portion may be a groove provided in the wide portion opposite to the side frame edge portion.

Thus, the stay cloth is not held between the side frame and the mounting member, which allows for quick inflation and deployment of the airbag. Also, the stay cloth can be prevented from being dragged by friction between the stay cloth, the side frame, and the mounting member during airbag inflation and deployment.

At least one of a wall surface forming the engaging portion and one end side of the guide member may have a movement restraining portion for positioning the one end side of the guide member with respect to the wall surface in a direction to engage or disengage the one end side of the guide member with or from the engaging portion.

Accordingly, the end portion of the guide member after mounted can be prevented from moving in an engaging and disengaging direction in the engaging portion. Further, the positioning of the guide member end portion side in the engaging and disengaging direction becomes possible, facilitating the mounting of the guide member to the mounted portion.

The engaging and disengaging direction may be a direction substantially orthogonal to the direction of the tensile force acting on the guide member.

Thus, a portion with or from which the guide member is engaged or disengaged is not weakened by the tensile force acting on the guide member. Further, the end portion of the guide member can be prevented from moving in the engaging portion of the mounting member in a direction substantially orthogonal to the direction of the tensile force acting on the guide member.

A slit may be provided in a side wall of the engaging portion, the slit extending to an outside surface of the mounting member; the slit and the engaging portion may be open at at least one of an upper end and a lower end of the mounting member; a one end side guide portion for guiding insertion of the one end side of the guide member may be provided at an open end of the upper end and the lower end of the engaging portion; and a guide member guide portion for guiding insertion of a portion adjacent to the one end side of the guide member may be provided at an end of the upper end and the lower end of the slit at which the one end side guide portion is provided.

Thus, when the end portion side of the guide member is inserted from the upper end or the lower end of the engaging portion, the end portion side guide portion and the guide member guide portion guide the insertion of the end portion side of the guide member or a portion adjacent to the end portion side, improving workability in mounting the guide member to the mounting portion.

The one end side guide portion and the guide member guide portion may have a chamfered shape formed continuously from the one end side guide portion to the guide member guide portion at an open end of the upper end and the lower end; and the continuously formed chamfered shape may become gradually deeper from an end portion of the one end side guide portion toward an end portion of the guide member guide portion.

Accordingly, the insertion of the portion adjacent to the end portion of the guide member into the slit, which is a first step of the work of mounting the end portion of the guide member to the mounting member, can be guided more smoothly. In addition, on the other hand, the chamfered shape of the end portion side guide portion provided at the engaging portion can be formed relatively shallow so that the end portion side of the guide member can be securely held in the engaging portion.

The slit may communicate with the engaging portion, and a connection portion between the engaging portion and the slit may constitute a bent passage for the guide member; and an outside wall of the slit may be inclined at an obtuse angle with respect to an outside wall of the engaging portion at a location where the slit is adjacent to the engaging portion.

Thus, at the location where the slit is adjacent to the engaging portion, the outside wall of the slit is inclined at an obtuse angle with respect to the outside wall of the engaging portion so that the outside wall of the slit is positioned to cover the end portion side of the guide member held in the engaging portion. Consequently, at the location where the slit is adjacent to the engaging portion, a force in a direction to press the end portion side of the guide member back into the engaging portion is applied via the guide member passed into the slit so that the end portion side of the guide member can be prevented from disengaging from the engaging portion.

An edge side of an outside wall of a pair of walls forming the slit, a surface on the slit side of an inside wall of the pair of walls, the engaging portion, a surface on the opposite side to the slit of the engaging portion, the flange, and an engagement area between the mounting member and the flange may be located in the same plane.

Thus, since portions subjected to a force during airbag inflation are located in the same plane, the mounting member can be formed compact while maintaining the rigidity.

One of the flange and the wide portion may have a protrusion for fixing the flange and the wide portion to each other, and the other may have a recess to engage with the protrusion in a position corresponding to the position of the protrusion.

Accordingly, movement of the mounting member inside the inner wall surface of the flange can be restricted, and the mounting member can be prevented from wobbling.

The side frame may have a rotation restricting portion to abut the wide portion to restrict the rotation of the mounting member.

Accordingly, rotation of the mounting member in a slipping-out direction can be restricted, and slipping-out can be prevented when the airbag is in a non-deployed state in which it is not inflated and deployed.

The engaging portion may be held between a pair of walls provided at the wide portion, and have an opening communicating with the outside between the pair of walls; the rotation restricting portion may be a protrusion protruded from the side frame; and the protrusion may be engaged with a distal end portion on the opening side of one of the pair of walls to position the mounting member with respect to the side frame.

The mounting member may be integrally molded.

Accordingly, the mounting member mounted to the seat can be prevented from generating noise.

According to various embodiments of the invention, the above-described problems are solved by a seat equipped with an airbag module housing an airbag, including: a side frame extending along a side portion of the seat; the airbag module mounted to the side frame; a trim cover for the seat; and a guide member with an edge attached to a tearing portion of the trim cover; wherein a mounting member is connected to the guide member; the mounting member includes a connecting portion connected to one end of the guide member, and a groove engaged with an edge portion of the side frame; the mounting member is provided to reduce a torque generated at the connecting portion by the tensile force transmitted from the guide member when engaged with the edge portion of the side frame; and the mounting member connects the guide member to the side frame.

According to various embodiments of the present invention, the mounting member connected to the guide member that transmits the tensile force connects the guide member to the mounted portion. Thus, when the connection between the guide member and the mounted portion is released, drawing and twisting of the guide member do not occur, and also the surroundings of the guide member mounting portion can be made compact. Further, since the mounting member is provided to reduce a torque generated at the connecting portion by the tensile force transmitted from the guide member when engaged with the edge portion of the mounted portion, with the guide member connected to the mounted portion, the mounting member can be prevented from rotating more than necessary to cause the guide member to disengage from the mounted portion.

Moreover, only with the guide member, the mounting member, and the mounted portion, the guide member can be connected to the mounted portion, thus resulting in a simple configuration and facilitated mounting work. Furthermore, even when the configuration of the mounted portion is changed, the same components can be used without change in shape or the like.

BRIEF DESCRIPTION OF THE DRAWINGS

Various embodiments of the invention are illustrated below in the following drawings, in which.

DETAILED DESCRIPTION

A guide member, as described below, is a sheet-shaped member less elastic than a skin, such as a stay cloth with one edge sewn to a tearing portion that is provided at a skin or the like at a location where an airbag module is housed, to transmit a force applied during airbag deployment to the tearing portion to accelerate the airbag deployment, or a stay cloth disposed between an airbag module and another member to prevent the other member, such as a cushion pad, from being damaged by a force associated with airbag inflation during airbag deployment.

Hereinafter, a mounting member and an airbag module-equipped seat according to various embodiments of the present invention will be described with reference to FIGS. 1 to 51.

Hereinafter, description will be made on application to a side frame 10 as an example of a mounted portion. However, the mounted portion is not limited to this, and application can be made to another frame of a vehicle, an end portion of a pipe-shaped member, or the like. The mounted portion is also not limited to a vehicle member, and application can also be made to, for example, an engaging portion of a pole for locking a belt in a belt partition used for controlling a line in front of a store or a register.

Embodiment 1

Figure 1:
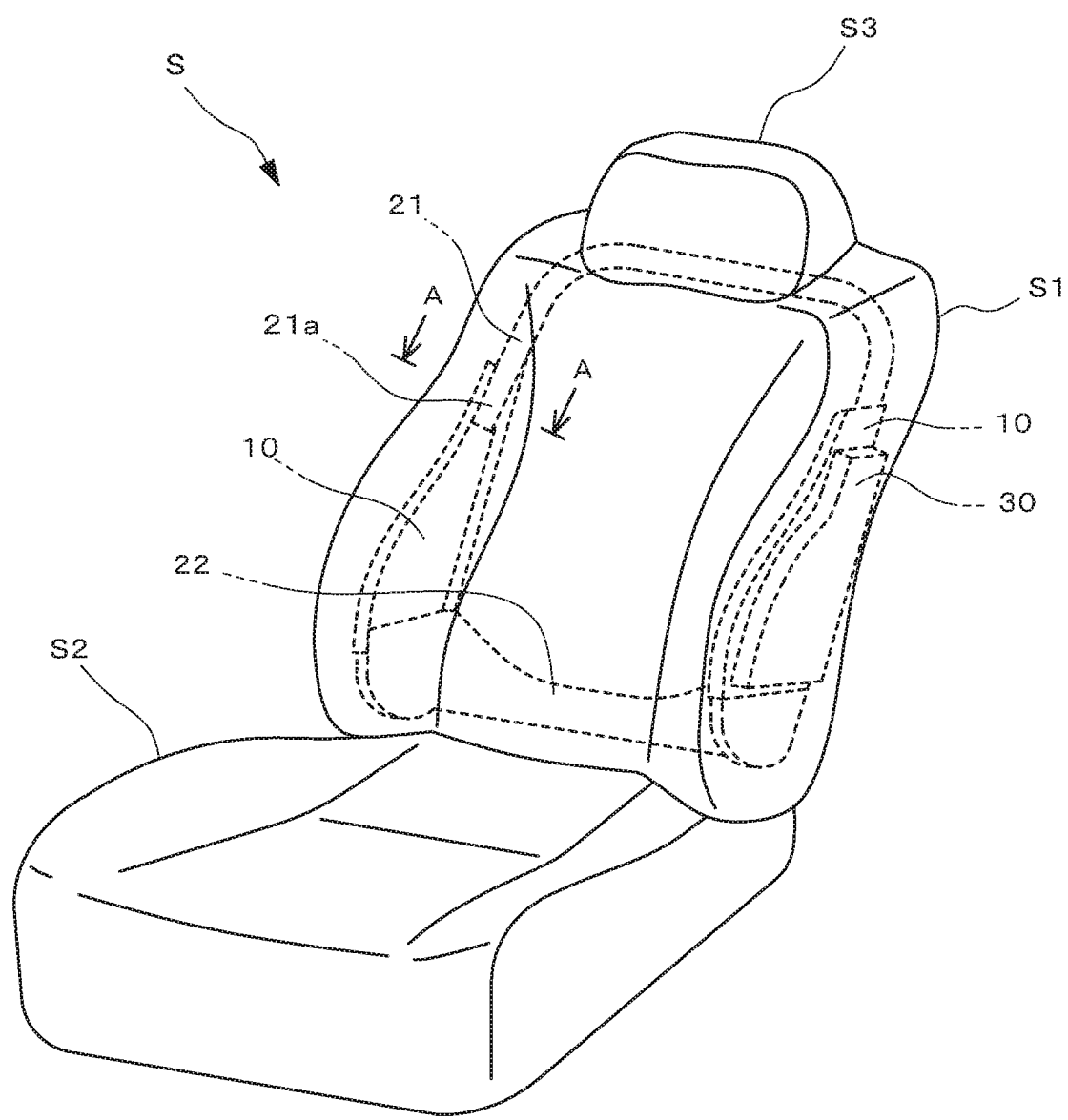
FIG. 1 is an external view of an airbag module-equipped seat according to embodiment 1 of the present invention.

As shown in FIG. 1, a vehicle seat S according to this embodiment is composed of a seat back S1, a seat base portion S2, and a headrest S3.

Figure 2:
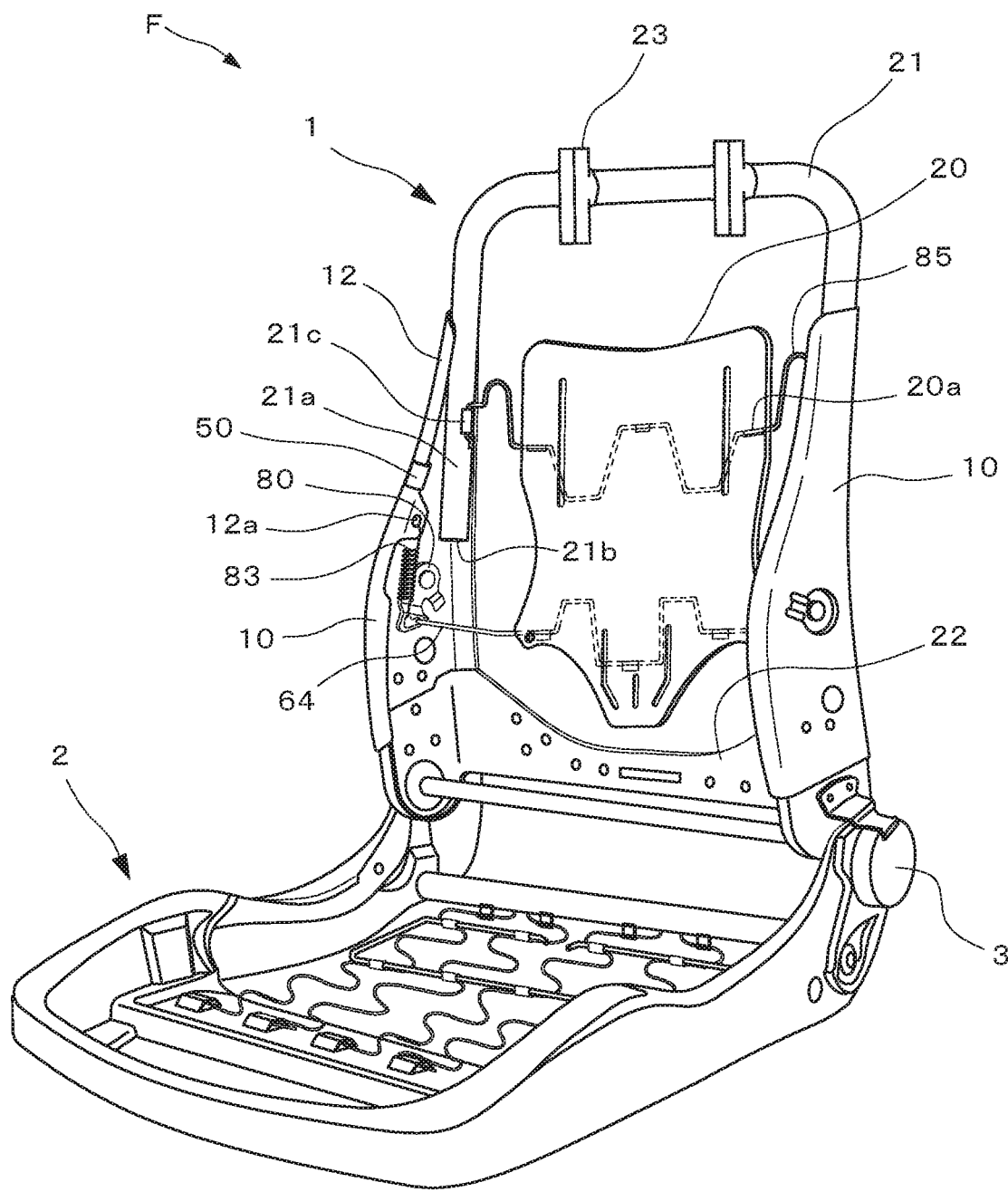
FIG. 2 is a perspective view of a seat frame of the airbag module-equipped seat according to embodiment 1 of the present invention.

In the vehicle seat S, a seat frame F as shown in FIG. 2 is provided. The seat frame F is composed of a seat back frame 1 as a frame for the seat back S1, and a seat base frame 2 as a frame for the seat base portion S2. The seat base frame 2 and the seat back frame 1 are connected via a reclining mechanism 3. A cushion and a trim cover are provided on the outside of the seat back frame 1 and the seat base frame 2 to constitute the seat back S1 and the seat base portion S2.

As shown in FIGS. 1 and 2, the seat back S1 includes, as its main components, the seat back frame 1, a cushion pad 5 placed on the seat back frame 1, a trim cover 4 covering the seat back frame 1 and the cushion pad 5, and a pair of stay cloths 31, 32 sewn at one end to a tearing portion 40 of the trim cover 4.

As shown in FIGS. 1 and 2, the seat back frame 1 is formed in a frame shape by side frames 10 spaced right and left and extending in an up and down direction, an upper frame 21 connecting upper end portions of the side frames 10, and a lower frame 22 connecting lower end portions thereof.

Figure 3:
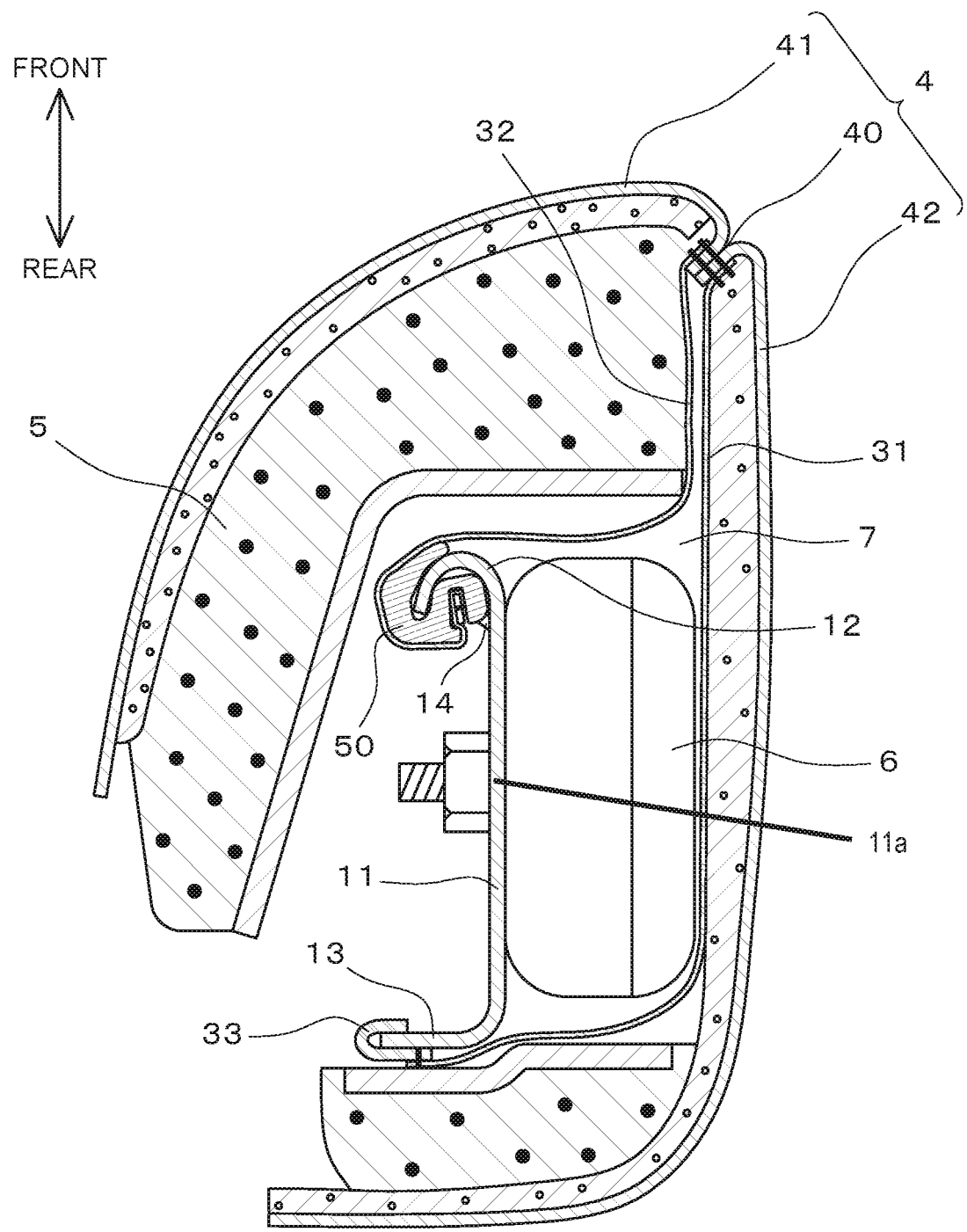
FIG. 3 is a cross-sectional view along A-A in FIG. 1.

Each side frame 10 is formed by stamping sheet metal, and includes, as shown in FIG. 3, a generally flat-shaped side plate 11, a forward edge portion 12 formed by bending back a forward end portion of the side plate 11 inward in a U shape, and a rear edge portion 13 formed by bending a rear end portion inward in an L shape. The forward edge portion 12 corresponds to a flange.

An upper half portion of the forward edge portion 12 constitutes an inclined portion extending forward at an inclination with respect to the up and down direction of the vehicle seat S.

Figure 4:
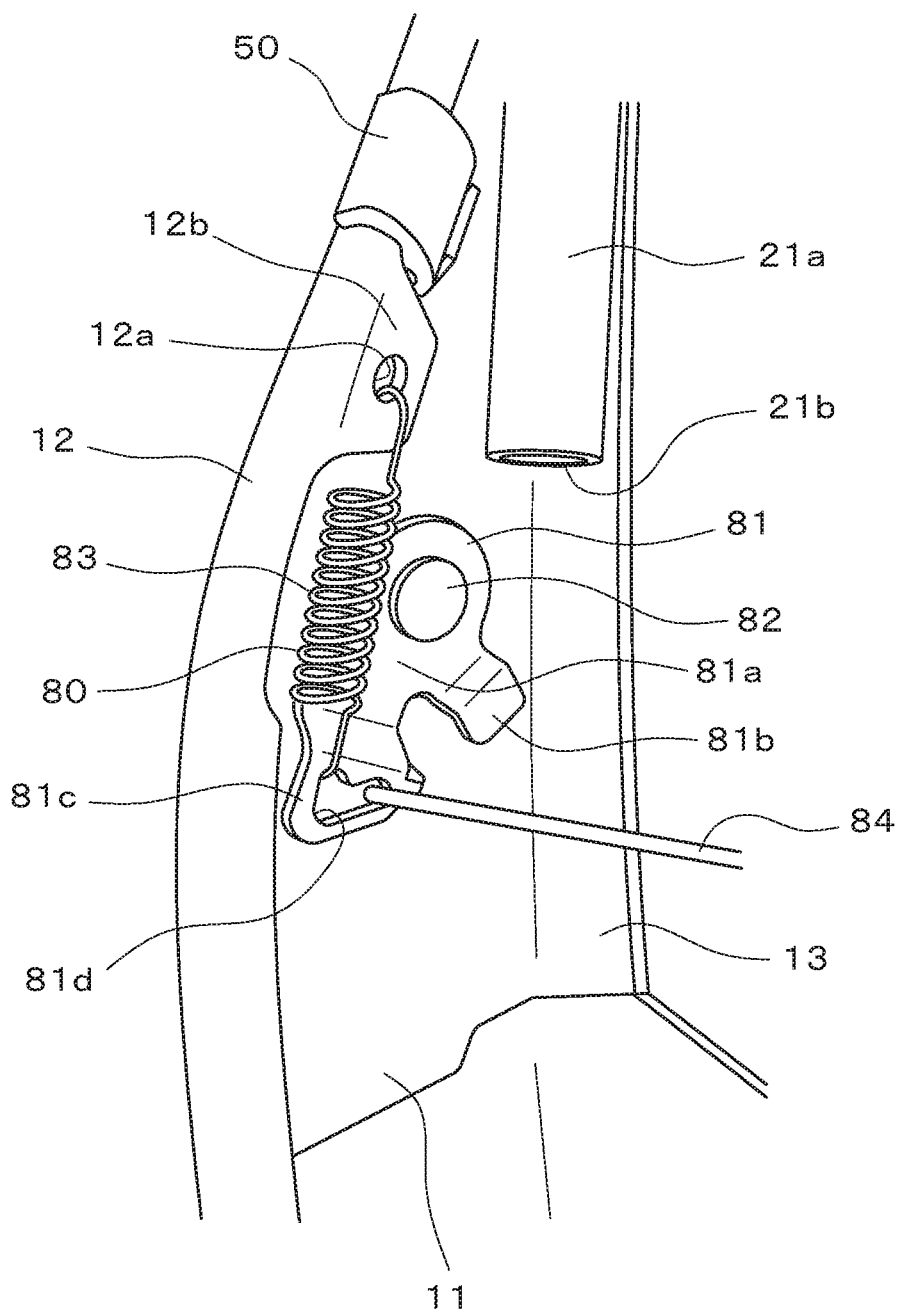
FIG. 4 is an explanatory perspective view diagram illustrating a lower connecting member.

In FIGS. 2 and 4, a shaft hole not shown through which a bolt 82 is inserted is formed in the side plate 11 at a height position corresponding to the side of an occupant, for example, a position of about 20 cm from the lower end. Above the shaft hole (not shown), an end portion of the forward edge portion 12 extends out. At the extending-out place, a spring engaging hole 12a at which the upper end of a coil spring 83 is supported is provided.

An airbag module 6 is fixed to the side frame 10.

The airbag module 6 has a known configuration and, not shown specifically, is assembled by holding an inflator with a retainer, mounting the inflator with the retainer to an inner portion of an airbag close to a mounting base portion with a fastening bolt of the retainer protruded outside of the airbag, housing the whole body in a module case with the fastening bolt of the retainer further protruded outside, and providing a harness and a connector necessary for circuit configuration with associated equipment such as an impact sensor.

As the module case, one with an openable and closable lid hinged to a case body, or one with a housing composed of a case body provided at its front surface with a weak portion such as a V groove and a lower plate openable by the inflation pressure of an airbag is mounted.

The upper frame 21 is formed by a cylindrical body with a circular cross section curved in a channel shape. However, the upper frame 21 is not limited to this, and may be formed from a tubular body with a polygonal, for example, rectangular cross section, or a frame body with a channel-shaped or a C-shaped cross section, or the like.

The upper frame 21 has end portions 21b between the upper ends and the lower ends of the side frames 10. A portion near the end portion 21b is extended along the longitudinal direction of the side frame 10 and welded to an inside surface of the side frame 10. The extended portion constitutes an extended portion 21a. The end portion 21b is located slightly above the spring engaging hole 12a in the side frame 10 so that when a stay cloth mounting member 50 is attached to the extended portion 21a and the end portion 21b, a lower connecting member 80 and the stay cloth mounting member 50 do not interfere with each other.

The upper frame 21 is provided with the pillar support 23, and a headrest frame not shown is provided on the pillar support 23. A cushion member is provided on the outside of the headrest frame to constitute the headrest S3.

A pressure receiving member 20 made from plate-shaped resin is disposed between the right and left side frames 10.

The pressure receiving member 20 is a member for protecting the head and the neck of an occupant from an impact caused by a rear collision and reducing an impact to the neck, and has the function of moving rearward at the time of a rear collision, causing the upper body of an occupant to deeply get into the seat back S1, and thereby speedily reducing the space between the head of the occupant and the headrest.

The pressure receiving member 20 is connected to the right and left side frames 10 with an upper wire 85 and the lower connecting members 80.

The lower connecting members 80 each include, as shown in FIGS. 2 and 4, a rotary member 81, a bolt 82 for rotatably supporting the rotary member 81 on the side frame 10, a coil spring 83 for biasing the rotary member 81 in a direction to cause the pressure receiving member 20 to be biased forward, and a lower wire 84 connecting a lower portion of the pressure receiving member 20 to the rotary member 81. The lower connecting members 80 are provided bilaterally symmetrically on both right and left sides of the pressure receiving member 20.

As shown in FIG. 4, the rotary member 81 is made by stamping a metal sheet, and includes a body portion 81a extending diagonally forward along the forward edge portion 12, a rear edge portion 81b protruding downward from a rear lower edge of the body portion 81a and bent in an L shape toward the inside of the vehicle seat S and then bent again downward, and a lower edge portion 81c protruding such that the body portion 81a is extended from a forward lower edge of the body portion 81a and bent in an L shape toward the inside of the vehicle seat S and then bent again downward.

The rear edge portion 81b abuts the rear edge portion 13 of the side frame 10 to function as a stopper for restricting the forward and rearward movement of the rotary member 81 to a predetermined position. The rear edge portion 81b extends out downward from the body portion 81a to not interfere with the stay cloth mounting member 50.

The lower edge portion 81c is formed with a generally L-shaped engaging hole 81d. The lower wire 84 is engaged with the rear end of the engaging hole 81d. The lower end of the coil spring 83 is engaged with the front end of the engaging hole 81d. The coil spring 83 is engaged at its upper end with the spring engaging hole 12a in the side frame 10 and is engaged at its lower end with the engaging hole 81d in a stretched state.

The body portion 81a is formed with the shaft hole not shown for the bolt 82. The rotary member 81 is rotatably attached to the side plate 11 with the bolt 82 inserted through the shaft hole not shown.

As shown in FIG. 2, the lower wire 84 and the upper wire 85 are engaged with respective claws 20a formed on the pressure receiving member 20. The upper wire 85 is engaged with wire engaging holes 21c in the upper frame 21.

As shown in FIG. 3, the cushion pad 5 is formed with a space 7 for housing the air bag module 6.

The trim cover 4 is made from a known material, and is sewn in a bag shape by sewing together a front gore 41 for covering from the seat center to the right and left bank surfaces and side gores 42 extending from the peripheral sides to the back, and further connecting a back gore not shown to the side gores 42 with slide fasteners not shown in an openable and closable manner.

The trim cover 4 is formed with the tearing portion 40 along the bulging top of a bank portion between the front gore 41 and the side gore 42. The tearing portion 40 has edges of the front gore 41 and the side gore 42 sewn to each other in such a manner as to be tearable by the tensile force caused by the inflation of the airbag while maintaining strength bearable to normal use.

A first stay cloth 31 and a second stay cloth 32 are made from a cloth-form material with small elasticity, and act to transmit stress caused by airbag inflation to the tearing portion 40.

Figure 5:
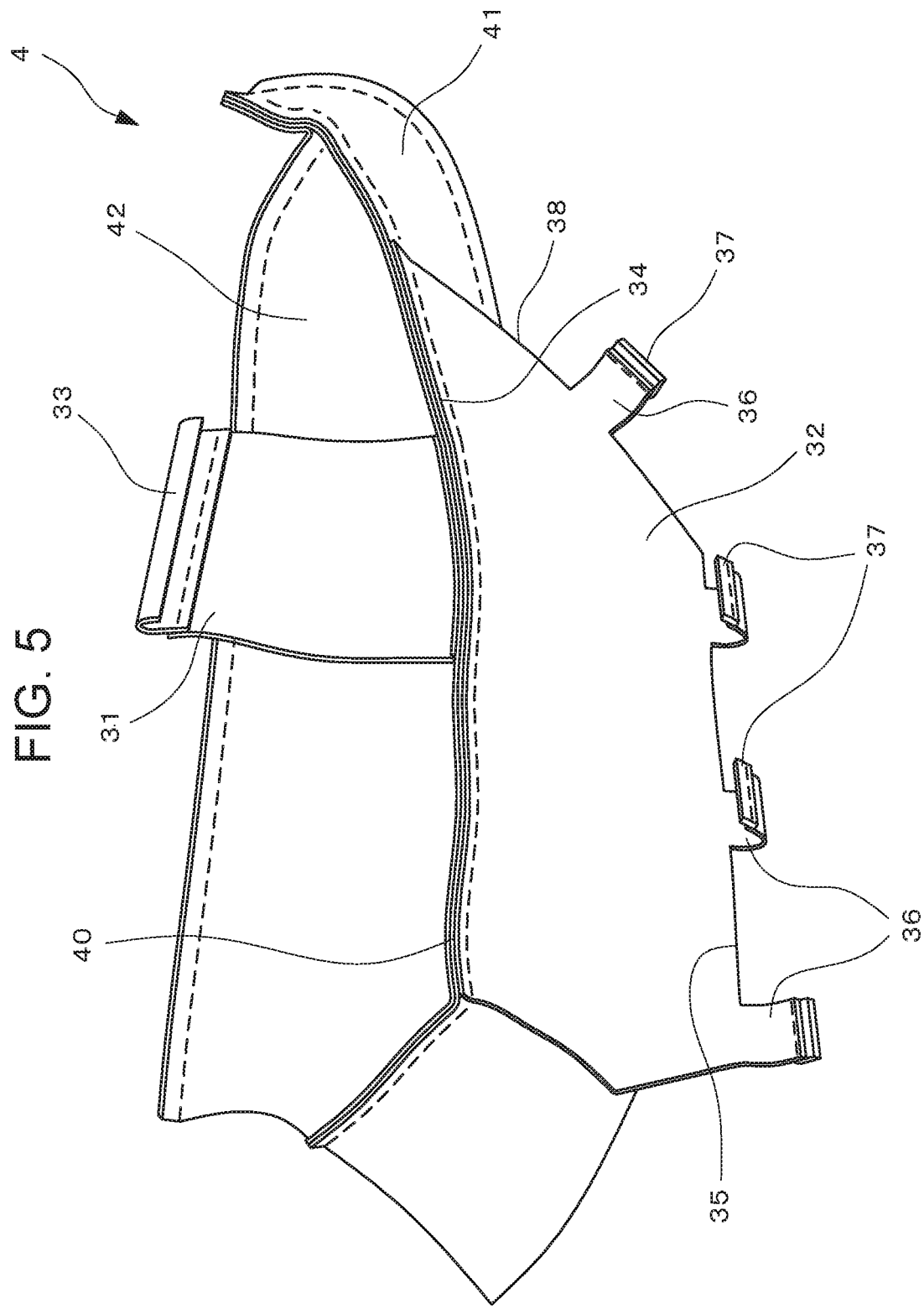
FIG. 5 is an explanatory perspective view diagram illustrating a trim cover and stay cloths sewn together at a tearing portion according to embodiment 1 of the present invention.

As shown in FIG. 5, the first stay cloth 31 is made of a generally rectangular cloth elongated in a direction in which the tensile force acts, with one end sewn together with the edges of the front gore 41 and the side gore 42 of the trim cover 4 and one end of the second stay cloth 32. To the other end of the first stay cloth 31, an elongated locking member 33 made from resin in a generally J shape in cross section is sewn.

As shown in FIG. 5, the second stay cloth 32 is made of a generally trapezoidal cloth in which an edge 34 on the tearing portion 40 side and an edge 35 on the opposite side to the tearing portion 40 are substantially in parallel, and the edge 34 on the tearing portion 40 side is formed longer. A plurality of mounting portions 36 for mounting trim plates 37, protruding in a rectangular shape is provided at the edge 35 opposite to the tearing portion 40 and at an edge 38.

The one edge 38 of two edges connecting the edge 34 on the tearing portion 40 side and the edge 35 opposite to the tearing portion 40 is formed in an oblique edge with respect to the edge 34 on the tearing portion 40 side and the edge 35 opposite to the tearing portion 40 to conform to the shape of an inclined portion of the side frame 10 at which the upper half portion of the forward edge portion 12 extends out forward at an inclination from its upper end to its lower end.

Figure 6:
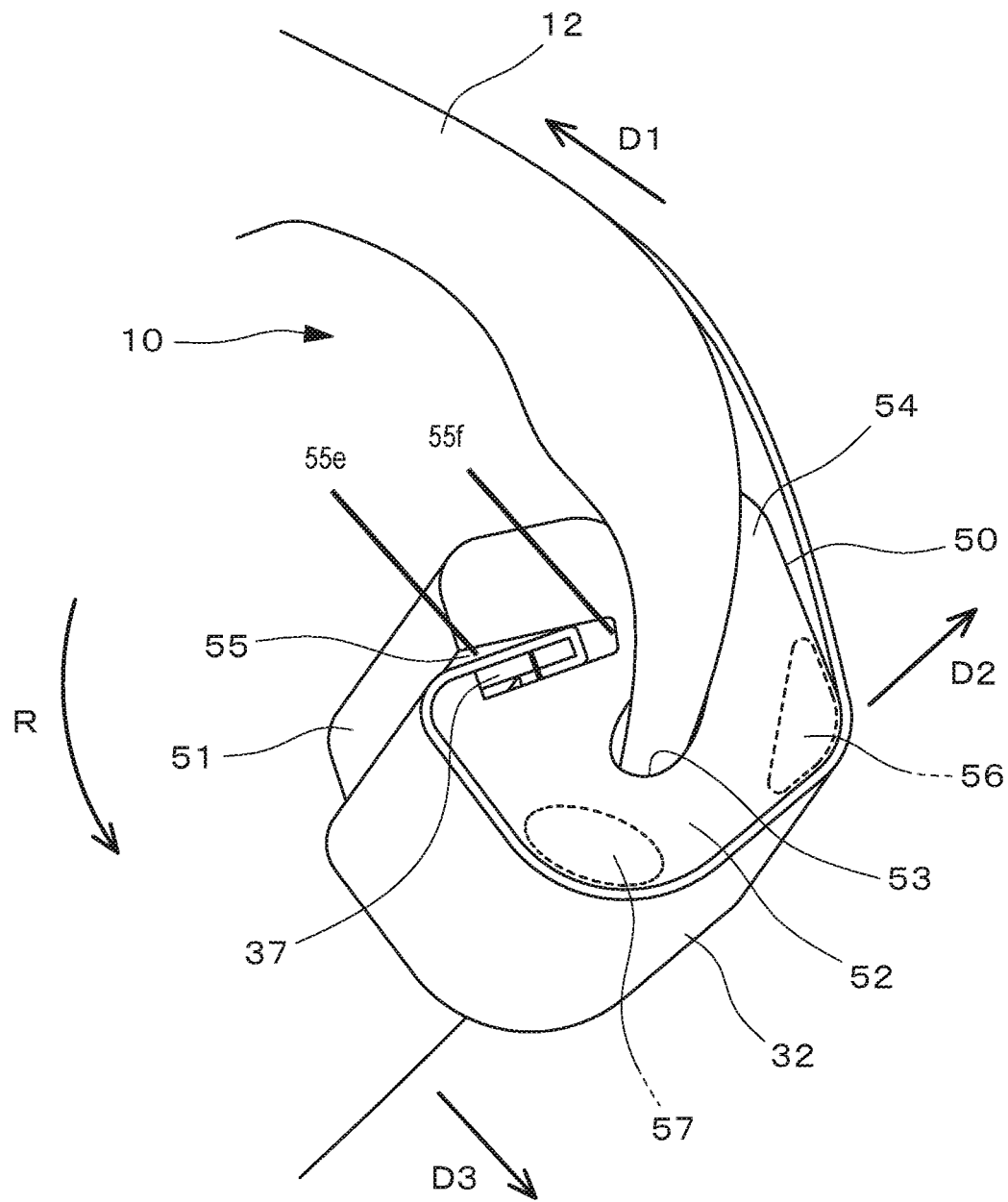
FIG. 6 is an explanatory perspective view diagram illustrating a stay cloth connected to a seat back frame via a mounting member according to embodiment 1 of the present invention.
Figure 7:
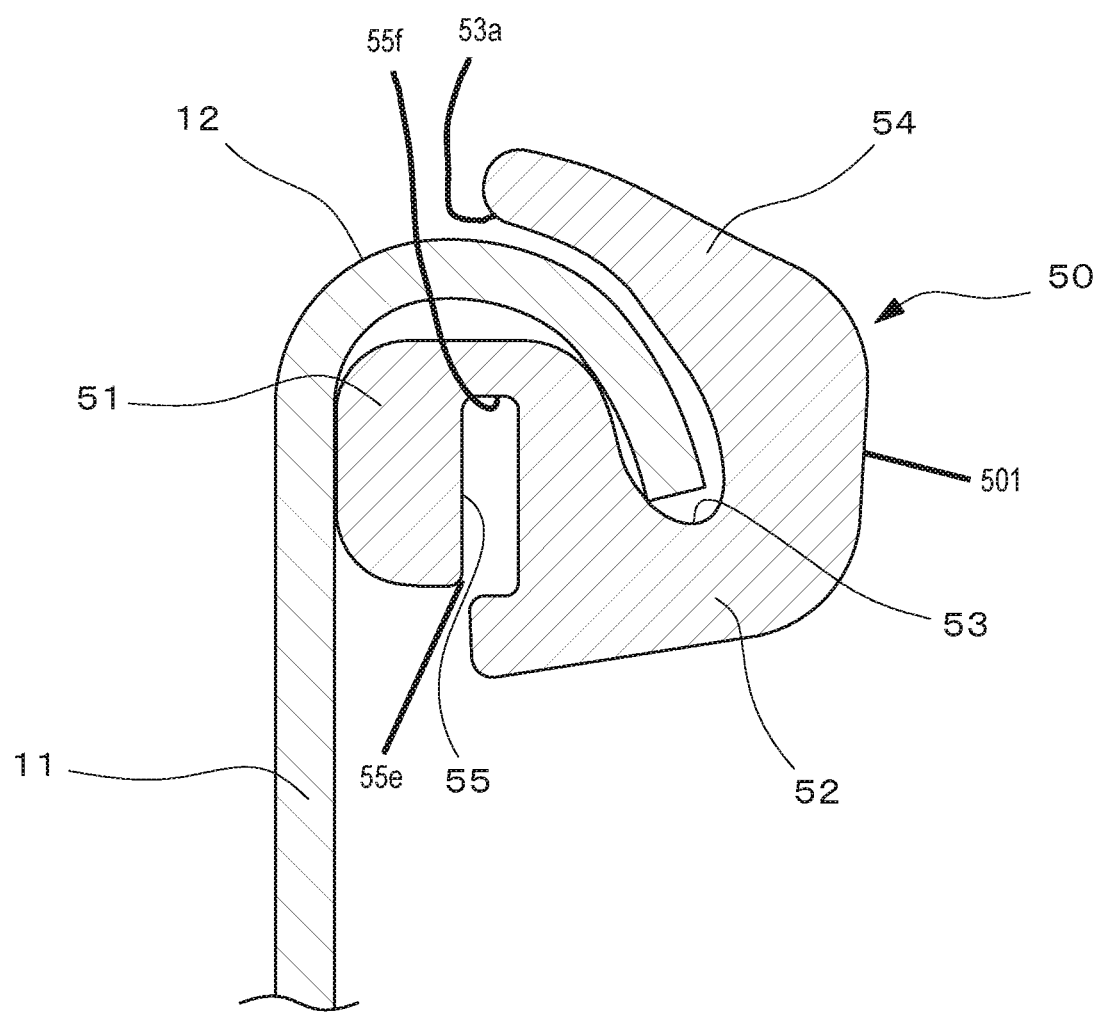
FIG. 7 is an explanatory cross-sectional view diagram illustrating the mounting member mounted to the seat back frame according to embodiment 1 of the present invention.

The edge 34 on the tearing portion 40 side of the second stay cloth 32 is sewn together with edge portions of the front gore 41 and the side gore 42 of the trim cover 4 and one end of the first stay cloth 31 at the tearing portion 40. As shown in FIGS. 6 and 7, the trim plates 37 are sewn to the respective mounting portions 36 of the edge 35 on the opposite side and the edge 38 of the second stay cloth 32.

The trim plates 37 are rectangular plates made from hard resin. The trim plates 37 are stay cloth end portion shape retaining members used for retaining the shape of the end portions of the mounting portions 36 of the stay cloth 32. The trim plates 37 fixed to the end portions of the stay cloth 32 improve workability during insertion of each end portion of the stay cloth 32 into an engaging portion 55. In this embodiment, the trim plates 37 are fixed to the mounting portions 36 of the stay cloth 32, which is not limiting. Without using the trim plate 37, an end portion of each mounting portion 36 of the stay cloth 32 may be folded two or more times and sewn together, or rolled in two or more rolls and sewn together, or rolled in two or more rolls, sewn together, and compressed in one direction, to be inserted into the engaging portion 55.

As shown in FIG. 3, the first stay cloth 31 and the second stay cloth 32 are drawn into the space 7 from the tearing portion 40. The locking member 33 at the other end of the first stay cloth 31 is engaged with the rear edge portion 13 of the side frame 10. The trim plate 37 at the other end of the second stay cloth 32 is engaged with the forward edge portion 12 of the side frame 10 via the mounting member 50.

The mounting member 50 is integrally molded from hard resin, and, as shown in FIGS. 6 and 7, includes a wide portion 51 having a shape generally conforming to the shape of the inner wall of the forward edge portion 12 of the side frame 10, a hooking portion 52 formed on the forward edge portion 12 end portion side of the wide portion 51, an extension portion 54 provided such that an end portion of the hooking portion 52 opposite to the wide portion 51 extends in a direction of extension of the second stay cloth 32 to cover an outside surface of the forward edge portion 12, and tensile force absorbing portions 56, 57 for absorbing a tensile force transmitted from the second stay cloth 32 to reduce a torque generated at a connecting portion.

In the hooking portion 52, a groove 53 is formed continuously from the wide portion 51 on the forward edge portion 12 end portion side of the wide portion 51. The groove 53 holds the end portion of the forward edge portion 12.

The wide portion 51 is formed with an engaging portion 55 for engaging the trim plate 37 on the opening side of the forward edge portion 12. The engaging portion 55 has a groove in a generally rectangular cross-sectional shape sized to be able to engage the trim plate 37 inside. The engaging portion 55 corresponds to a connecting portion in claims.

The engaging portion 55 is formed as an opening that is open at the upper and lower ends and extends from the upper end to the lower end.

The engaging portion 55 may alternatively be open at one of the upper and lower ends, preferably only at the upper end, and closed at the other end. The mounting member 50 with the engaging portion 55 open at the upper end and closed at the lower end is particularly suitable for being used only for either of the right and left side frames 10. The mounting member 50 with the engaging portion 55 open at both the upper and lower ends is particularly suitable for being used for both the right and left side frames 10. At this time, an end that is the upper end when used for one of the right and left side frames 10 becomes the lower end when used for the other side frame 10.

As shown in FIGS. 3, 5, and 6, the trim plate 37 is inserted into the engaging portion 55 to be engaged, the second stay cloth 32 is drawn out from the engaging portion 55 and extended, covering the outer surfaces of the hooking portion 52 and the extension portion 54 in an enclosing manner, and led to the tearing portion 40.

Figure 8:
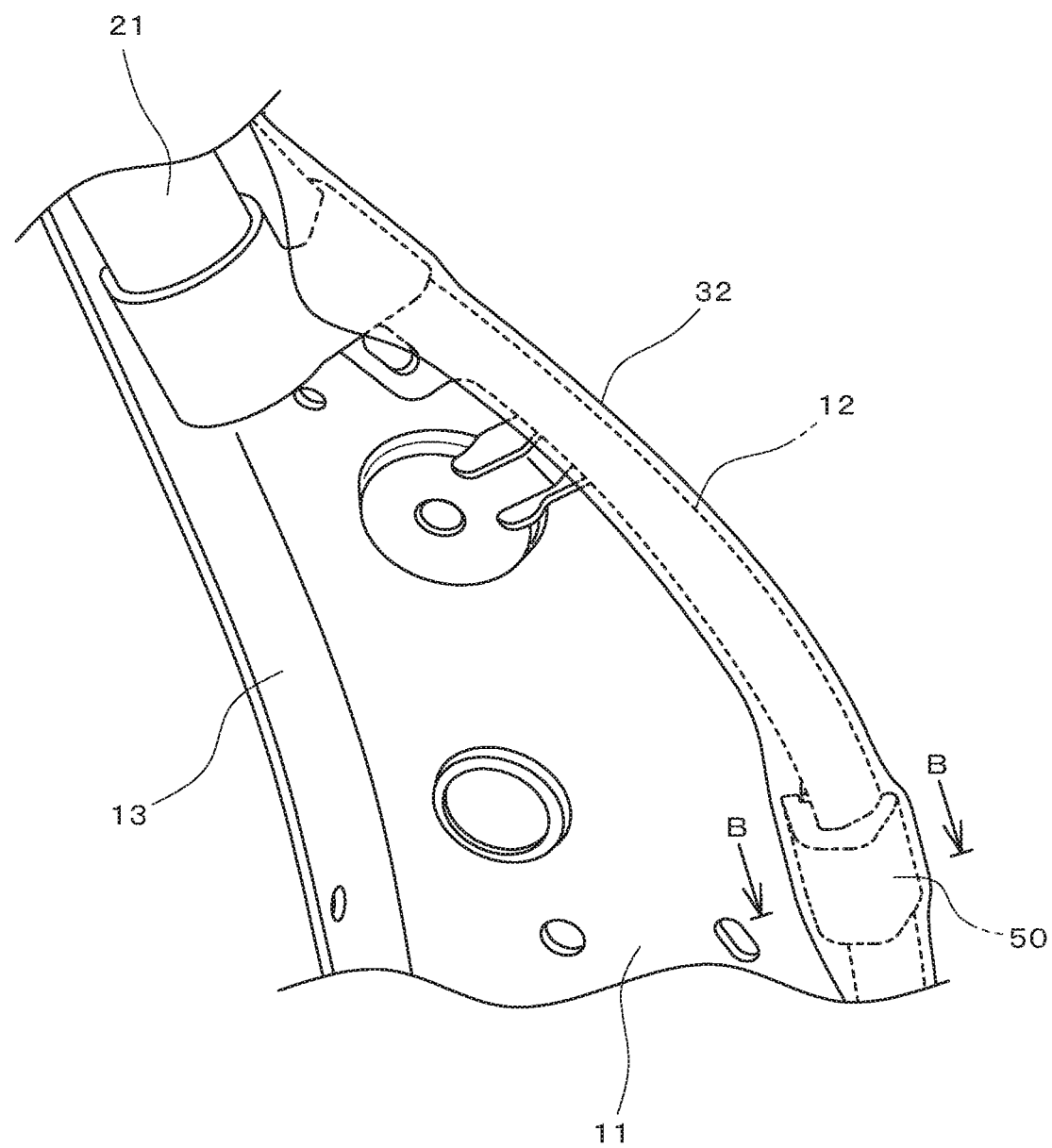
FIG. 8 is a perspective view showing the stay cloth connected to the seat back frame via the mounting member according to embodiment 1 of the present invention.

The second stay cloth 32 engaged like this is disposed as shown in FIG. 8.

As shown in FIG. 6, the tensile force absorbing portions 56, 57 are formed by areas in which the outer surface of the hooking portion 52 is bent at 90° to 120°.

When the trim plate 37 to which the second stay cloth 32 is mounted is engaged with the engaging portion 55, and the mounting member 50 is attached to the forward edge portion 12, a portion from the engaging portion 55 through the tensile force absorbing portion 56 to the tensile force absorbing portion 57 is covered by the second stay cloth 32 as shown in FIG. 6. When the airbag is not deployed or when the airbag is being inflated for deployment, the second stay cloth 32 is subjected to the tensile force in an arrow D1 direction that is a direction from a portion contacting the tensile force absorbing portion 56 toward the tearing portion 40.

Since the mounting member 50 is made from hard resin, the tensile force absorbing portions 56, 57 have some elasticity, and contract inward when subjected to a pressure from the outside. Consequently, the tensile force in the arrow D1 direction is weakened by the tensile force absorbing portions 56, 57 contracting inward at locations where the second stay cloth 32 is sequentially bent in the extension direction on the outer surfaces of the tensile force absorbing portions 56, 57.

Accordingly, as compared with the case where the second stay cloth 32 extends in an arrow D3 direction in FIG. 6, when the second stay cloth 32 extends in the directions of arrows D1 and D2, the tensile force acting on the second stay cloth 32 is weakened at the tensile force absorbing portions 56, 57, resulting in a reduction in a torque R generated at the engaging portion 55 at which the second stay cloth 32 is connected to the mounting member 50.

Figure 9:
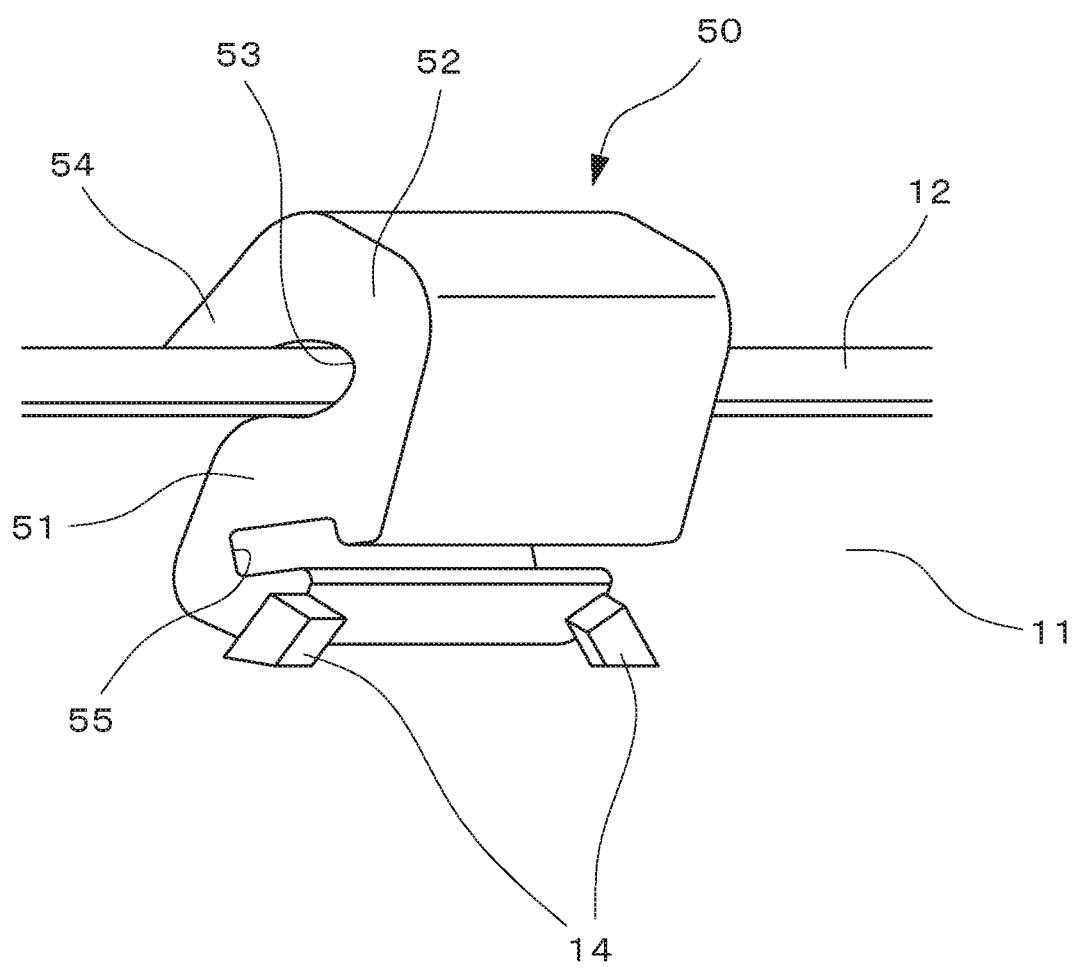
FIG. 9 is an explanatory perspective view diagram illustrating protrusions for preventing sliding and rotation of the mounting member according to embodiment 1 of the present invention.

As shown in FIG. 9, a pair of protrusions 14 may be provided on the side plate 11 of the side frame 10 on both sides of a plane in which the wide portion 51 of the mounting member 50 contacts the side plate 11 to prevent the mounting member 50 from sliding along the forward edge portion 12 and rotating about the groove 53. The protrusions 14 are inclined to a direction in which the mounting member 50 is slidable along the side plate 11 so that distal ends thereof face the inside of the mounting member 50. Further, the protrusions 14 have an angle with respect to a direction in which the mounting member 50 rotates about the groove 53 to prevent the rotation of the mounting member 50 about the groove 53.

In this embodiment, the mounting member 50 is used as a mounting member in the various designs. Alternatively, the mounting member may be configured as a mounting member 50a to 50f, or 50i shown in FIGS. 10 to 16.

Figure 10:
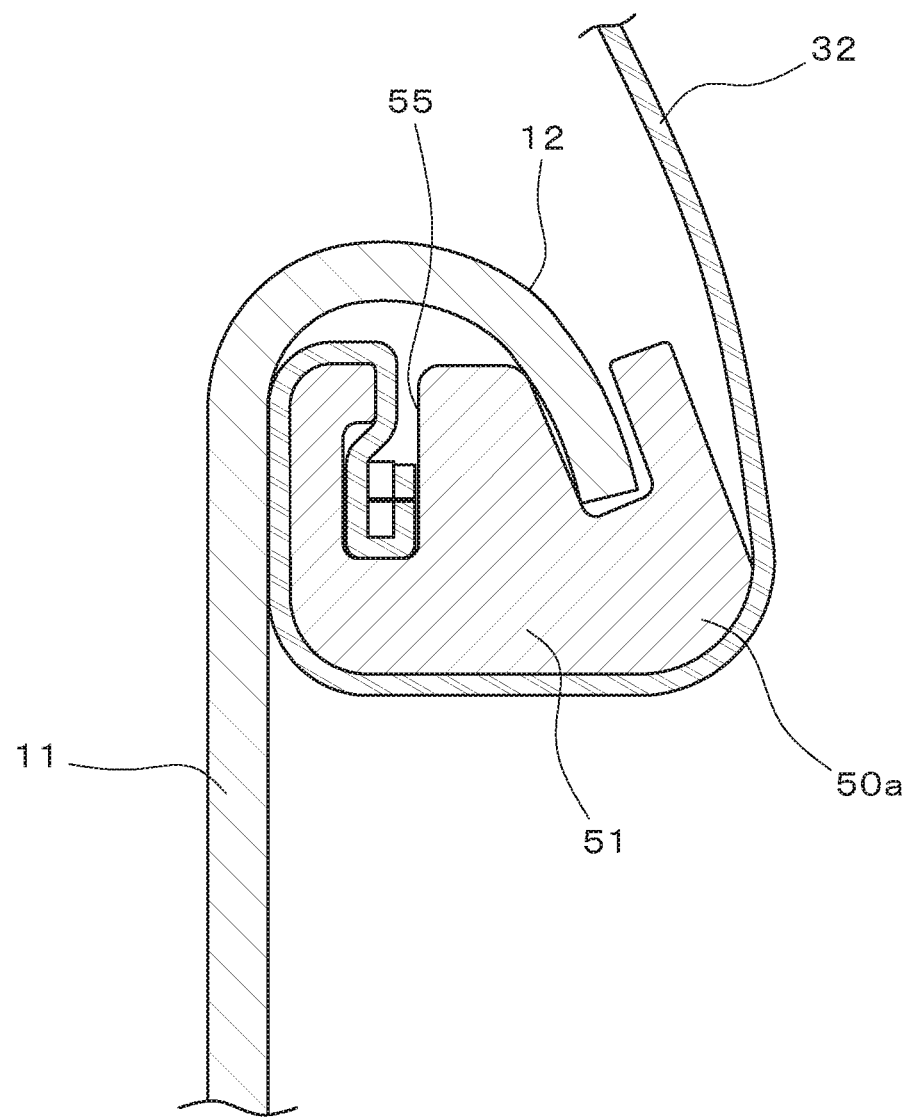
FIG. 10 is a cross-sectional view showing a modification of the mounting member.

The mounting member 50a in FIG. 10 has an engaging portion 55 for engaging the trim plate 37 provided in a surface of a wide portion 51 facing the forward edge portion 12. Other components are similar to those of the mounting member 50.

Figure 11:
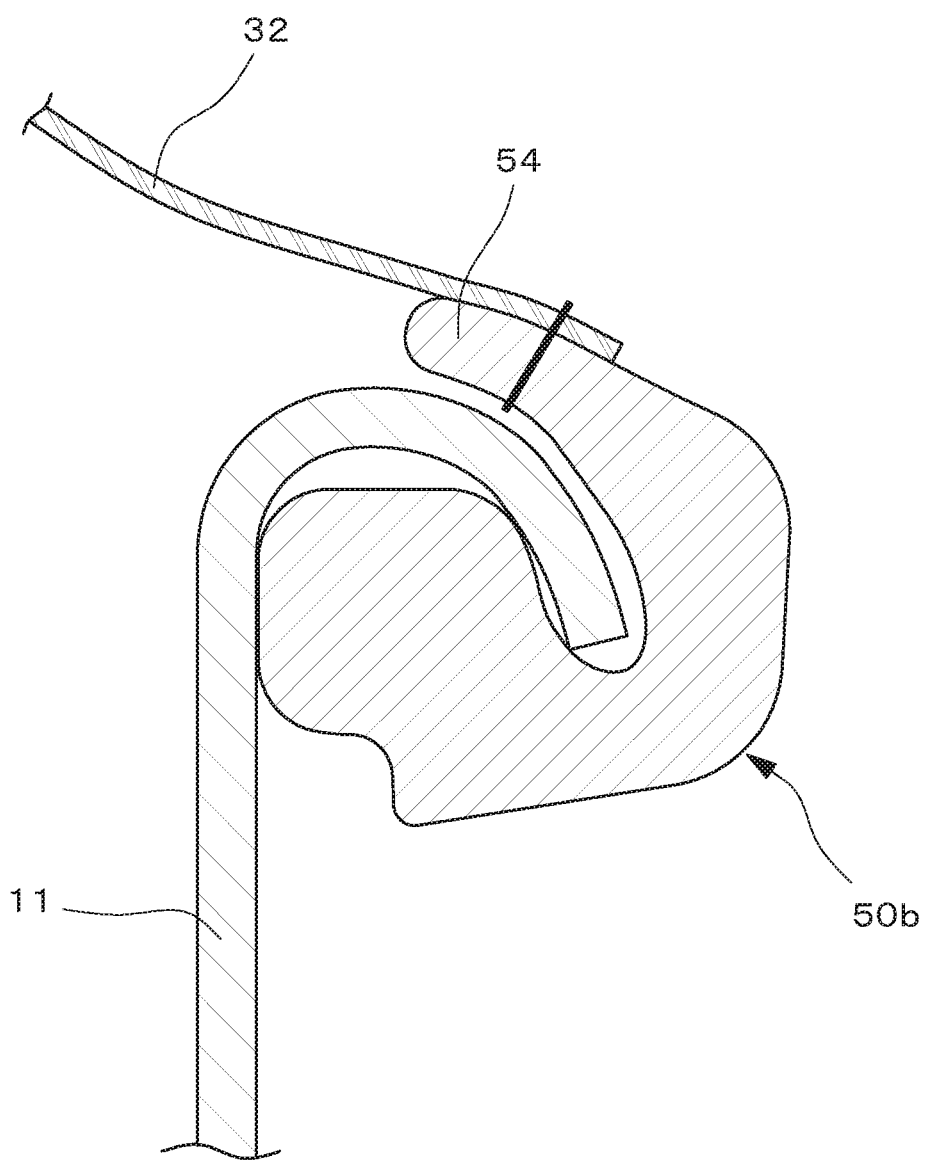
FIG. 11 is a cross-sectional view showing another modification of the mounting member.

The mounting member 50b in FIG. 11 does not have an engaging portion for engaging the trim plate 37. An end portion of the second stay cloth 32 is sewn to an extension portion 54. Other components are similar to those of the mounting member 50.

Figure 12:
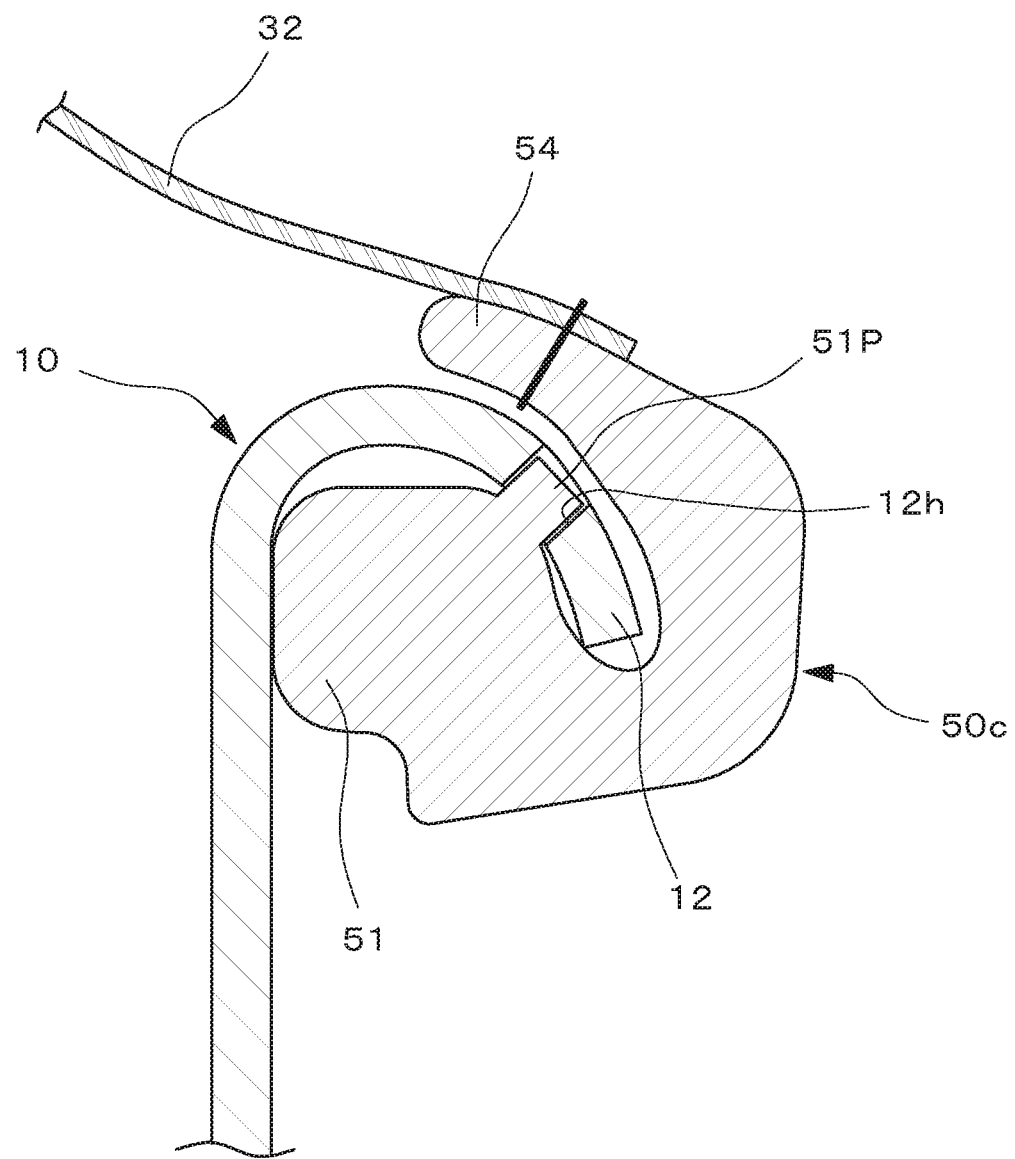
FIG. 12 is a cross-sectional view showing still another modification of the mounting member.

Like the mounting member 50b in FIG. 11, the mounting member 50c in FIG. 12 does not have an engaging portion for engaging the trim plate 37. An end portion of the second stay cloth 32 is sewn to an extension portion 54. A wide portion 51 has a protrusion 51p on a surface facing the forward edge portion 12 of the side frame 10. The protrusion 51p is configured to engage with a hole 12h provided in the forward edge portion 12 near the end thereof. Other components are similar to those of the mounting member 50.

Figure 13:
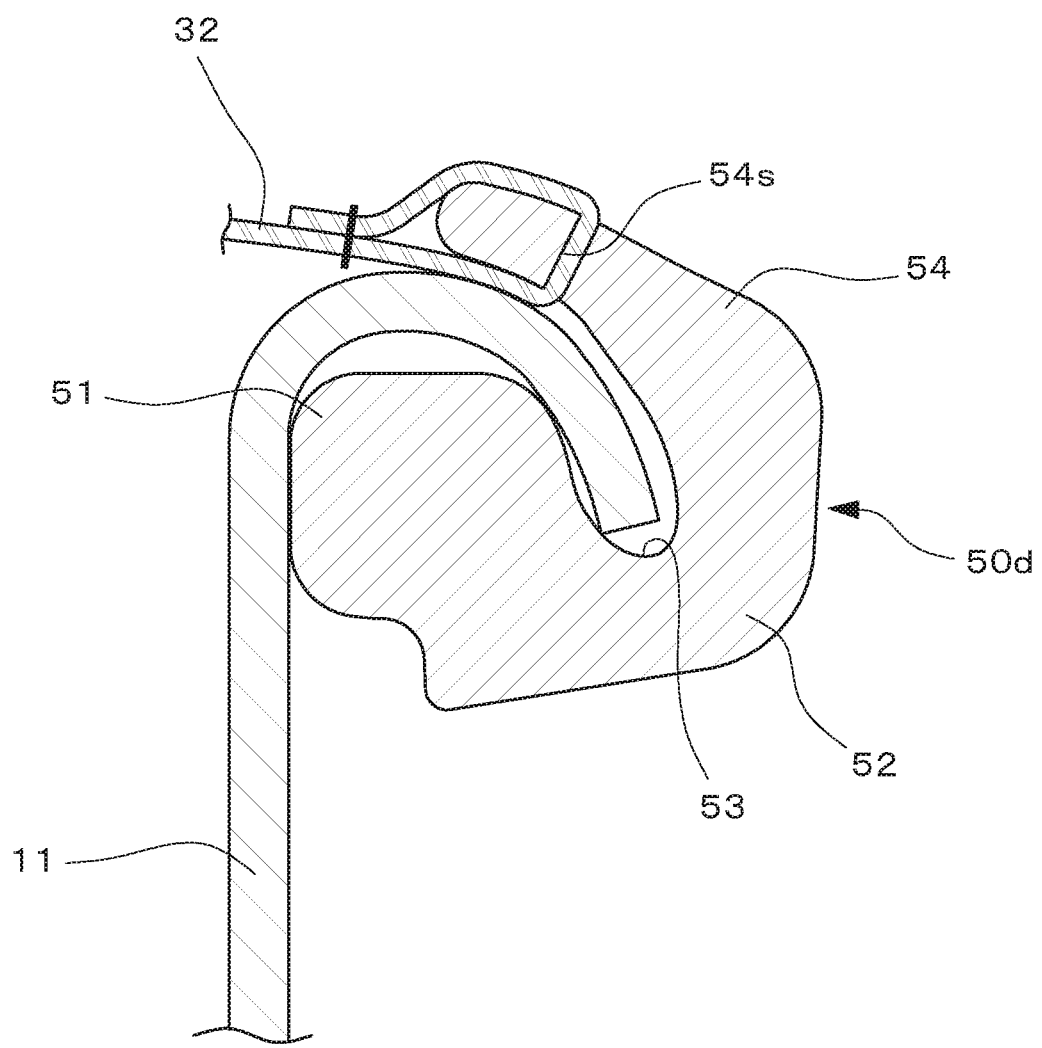
FIG. 13 is a cross-sectional view showing still another modification of the mounting member.

Like the mounting member 50b in FIG. 11, the mounting member 50d in FIG. 13 does not have an engaging portion for engaging the trim plate 37. An extension portion 54 is formed with a slit 54s extending substantially orthogonally to an extension direction of the extension portion 54. An end portion of the second stay cloth 32 is inserted into the slit 54s and then folded back, and overlapping portions are sewn together to be fixed. Other components are similar to those of the mounting member 50.

Figure 14:
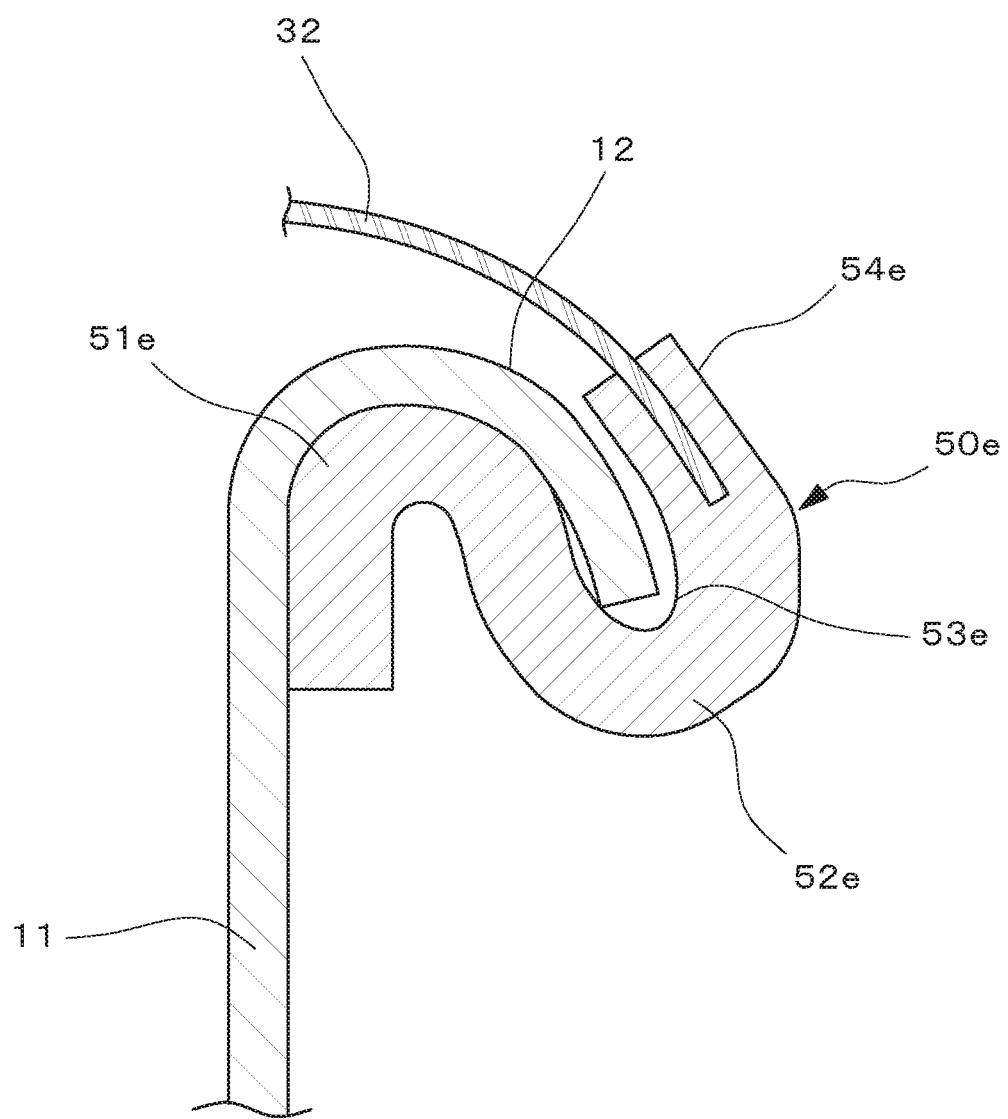
FIG. 14 is a cross-sectional view showing still another modification of the mounting member.

The mounting member 50e in FIG. 14 is made from a hard resin bent in a generally n shape in cross section, and includes a wide portion 51e having a shape generally conforming to the inner wall of the forward edge portion 12, a hooking portion 52e for holding an end portion of the forward edge portion 12 in a groove 53e, and an extension portion 54e provided such that an end portion of the hooking portion 52e on the opposite side to the wide portion 51e extends in an extension direction of the second stay cloth 32, covering an outside surface of the forward edge portion 12.

To the extension portion 54e, an end portion of the second stay cloth 32 is fixed by insert molding so that the second stay cloth 32 extends in an extension direction of the extension portion 54e. Other components are similar to those of the mounting member 50.

Figure 15:
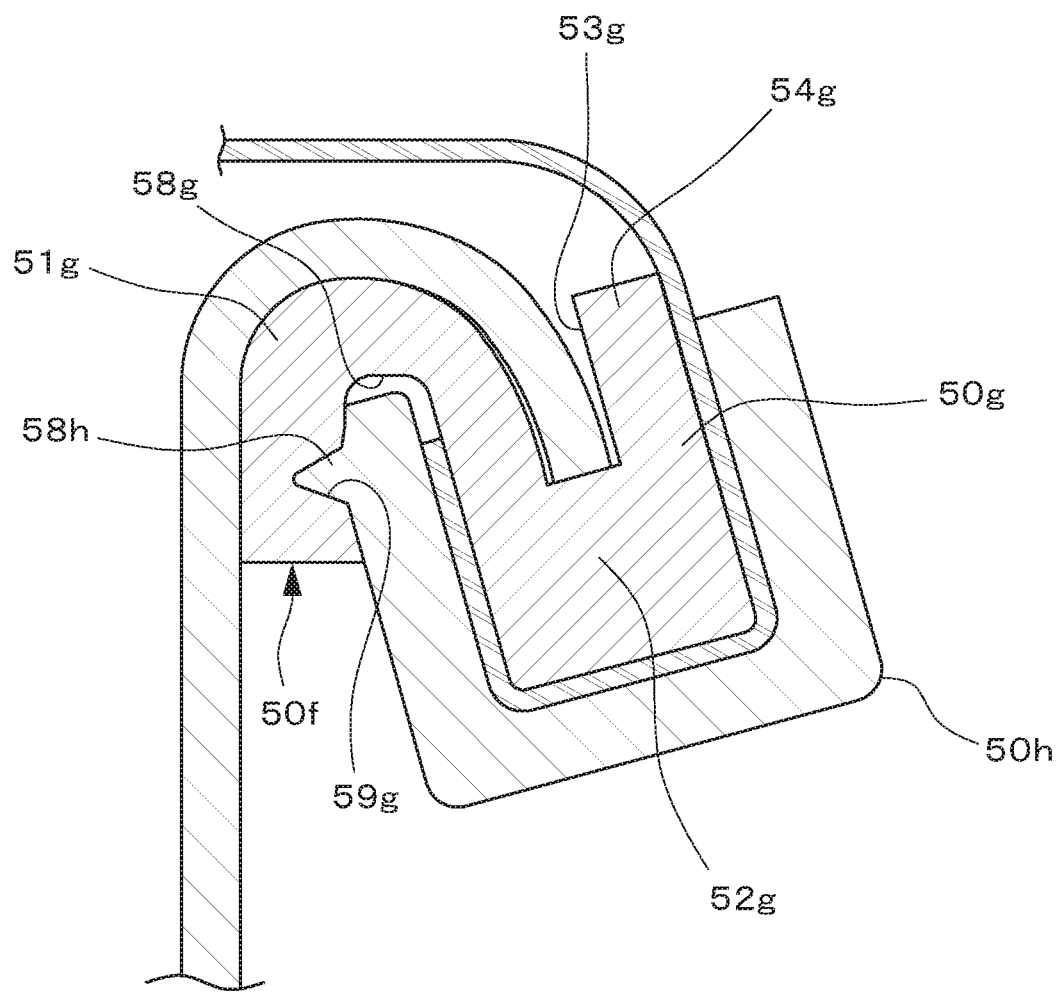
FIG. 15 is a cross-sectional view showing still another modification of the mounting member.

The mounting member 50f in FIG. 15 is formed such that an end portion of the second stay cloth 32 is held between a first clip 50g and a second clip 50h.

The first clip 50g is made from a hard resin bent in a generally n shape in cross section, and includes a wide portion 51g having a shape generally conforming to the inner wall of the forward edge portion 12, a hooking portion 52g for holding an end portion of the forward edge portion 12 in a groove 53g, and an extension portion 54g provided such that an end portion of the hooking portion 52g on the opposite side to the wide portion 51g extends in an extension direction of the second stay cloth 32, covering an outside surface of the forward edge portion 12.

The wide portion 51g has a recess 58g on the opening side of the forward edge portion 12, and has a groove 59g in a surface of the recess 58g with which a protrusion 58h of the second clip 50h engages.

The second clip 50h is made from a hard resin, and has an inner wall shaped in a generally U shape in cross section, substantially the same shape as the outer surface shape of the first clip 50g. One wall of a pair of opposed side walls of the second clip 50h is disposed in the recess 58g of the wide portion 51g of the first clip 50g. The protrusion 58h is provided on this one wall. With the second stay cloth 32 held between the first clip 50g and the second clip 50h, the protrusion 58h engages with the groove 59g of the first clip 50g, thereby connecting the end portion of the second stay cloth 32 to the mounting member 50f.

Figure 16:
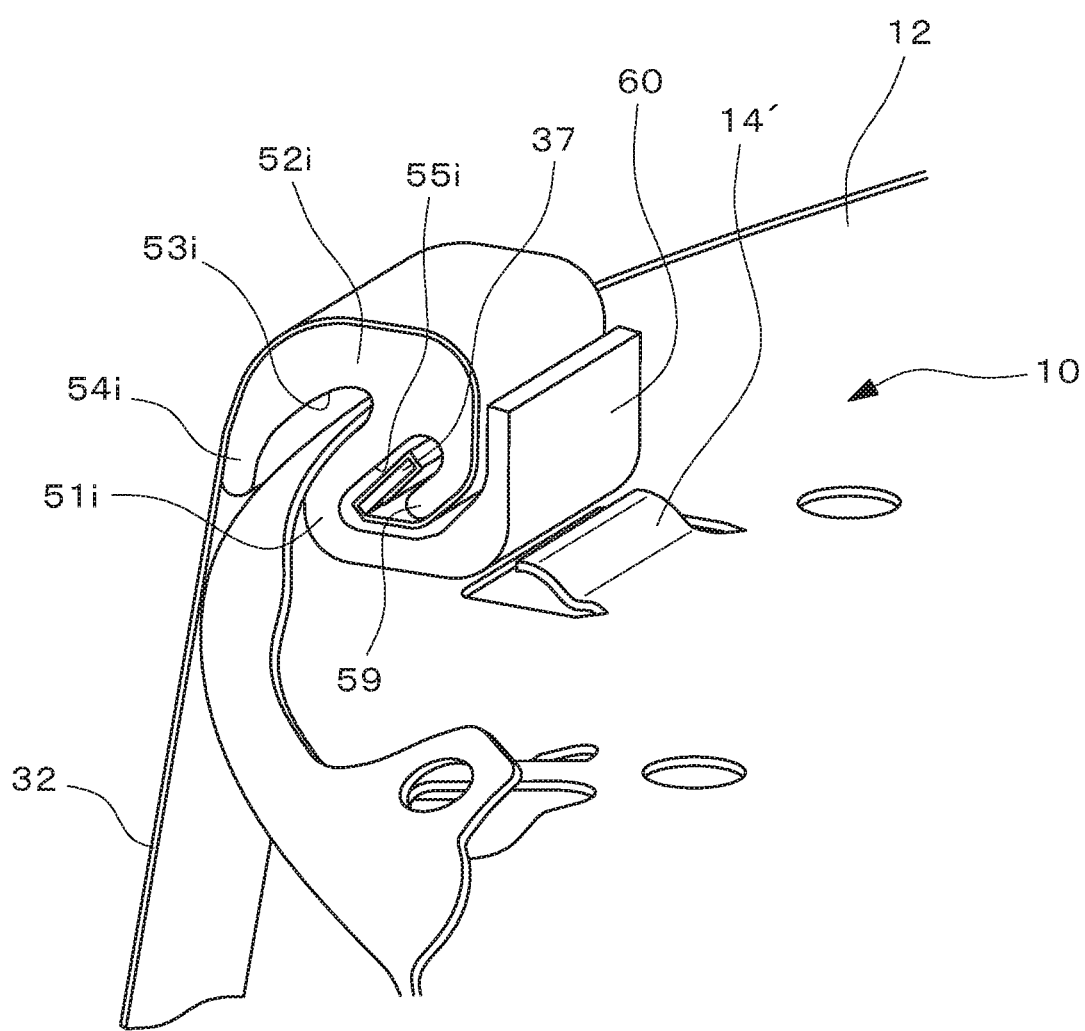
FIG. 16 is a cross-sectional view showing still another modification of the mounting member.

The mounting member 50i in FIG. 16 is integrally molded from a hard resin, and includes, as shown in FIG. 16, a wide portion 51i having a shape generally conforming to the shape of the inner wall of the forward edge portion 12 of the side frame 10, a hooking portion 52i formed on the forward edge portion 12 end portion side of the wide portion 51i, and an extension portion 54i provided such that an end portion of the hooking portion 52i on the opposite side to the wide portion 51i extends in an extension direction of the second cloth 32, covering an outside surface of the forward edge portion 12.

The hooking portion 52i is formed with a groove 53i continuous from the wide portion 51i on the forward edge portion 12 end portion side of the wide portion 51i. The groove 53i holds an end portion of the forward edge portion 12.

The wide portion 51i is formed with an engaging portion 55i for engaging the trim plate 37. The engaging portion 55i has a groove in a generally rectangular shape in cross section shaped to be able to engage the trim plate 37 inside. An opening of the engaging portion 55i is formed on the opening side of the forward edge portion 12.

A first wall 59 and a second wall 60 are provided on the opening side of the engaging portion 55i. The first wall 59 is extended from a surface of the engaging portion 55i abutting one side of the trim plate 37. The second wall 60 is extended from a surface of the engaging portion 55i abutting the other side of the trim plate 37. The first wall 59 and the second wall 60 are opposite to each other with a certain space between the outside surface of the first wall 59 and the inside surface of the second wall 60, and extend in opposite directions to each other.

The second wall 60 covers and conceals an end portion of the first wall 59 from the outside. The second wall 60 is formed to extend in contact with the side plate 11 of the side frame 10, and then rise substantially vertically from the side plate. An end portion of the second wall 60 is located opposite to the side plate 11 of the side frame 10 further than the end portion of the first wall 59.

As shown in FIG. 16, a space between the first wall 59 and the second wall 60 constitutes a passage for the second stay cloth 32. The second stay cloth 32 extends, being pressed against the outer surface of the first wall 59 for close contact.

A protrusion 14' to abut the second wall 60 is formed on an inner surface of the side frame 10 at an end portion opposite to the forward edge portion 12 at an area where the outer surface of the second wall 60 contacts the side frame 10. The protrusion 14' is formed by cutting and raising the side frame 10, and an end portion thereof extends in parallel with a rising portion of the second wall 60 to support the place where the second wall 60 rises from the side plate 11.

The protrusion 14' can prevent the mounting member 50i from sliding along the forward edge portion 12 and rotating about the groove 53.

Other components of the mounting member 50i are similar to those of the mounting member 50.

The mounting member 50i, in which the second wall 60 is provided to cover the end portion of the first wall 59 from the outside, and the space between the first wall 59 and the second wall 60 is formed as a passage for the second stay cloth 32, can further greatly reduce a torque generated at the trim plate 37 by the tensile force transmitted from the second stay cloth 32.

Embodiment 2

A second embodiment of the present invention will be described with reference to FIGS. 17 to 19. Components similar to those in Embodiment 1 will not be described.

Figure 17:
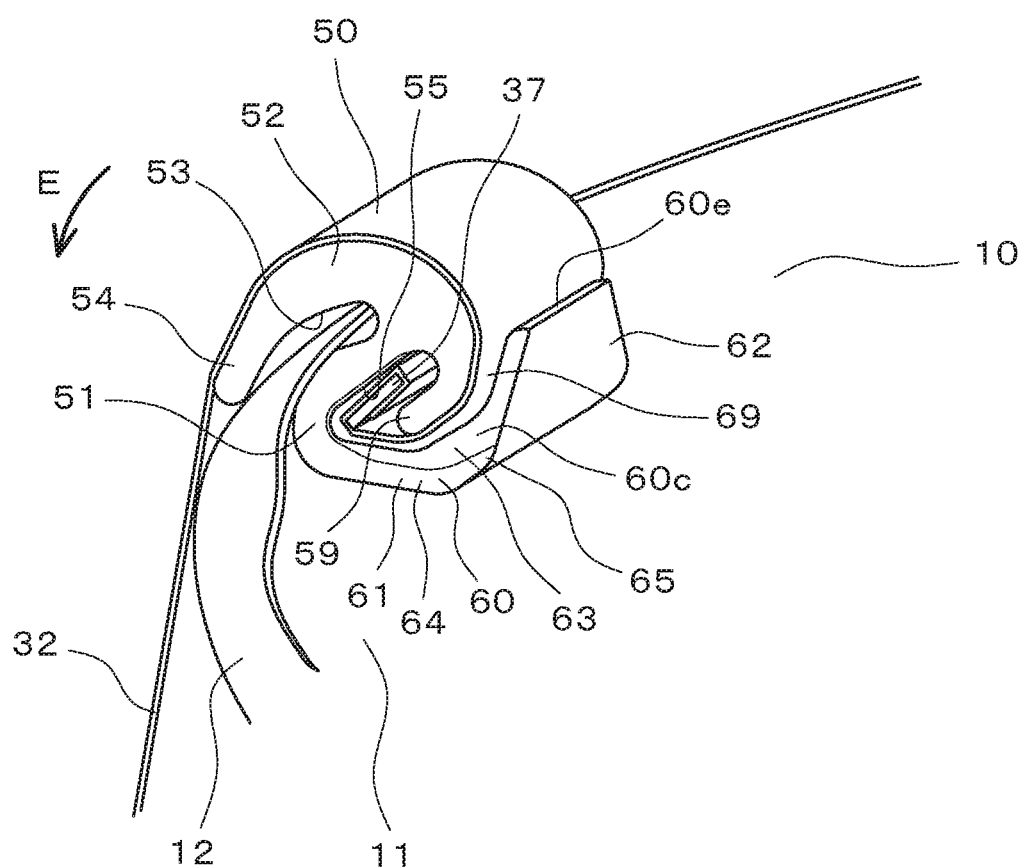
FIG. 17 is an explanatory perspective view diagram illustrating a stay cloth connected to a seat back frame via a mounting member according to embodiment 2 of the present invention.
Figure 18:
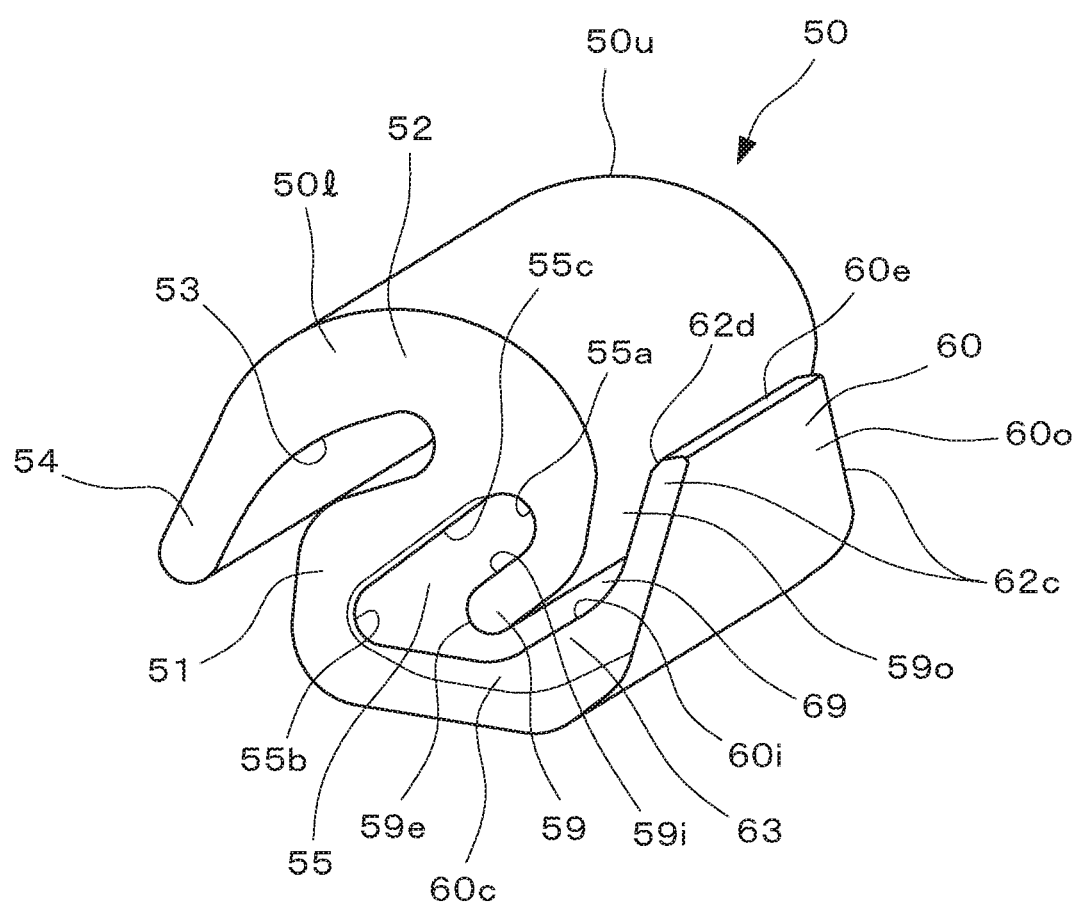
FIG. 18 is a perspective view of a mounting member according to embodiment 2 of the present invention.
Figure 19:
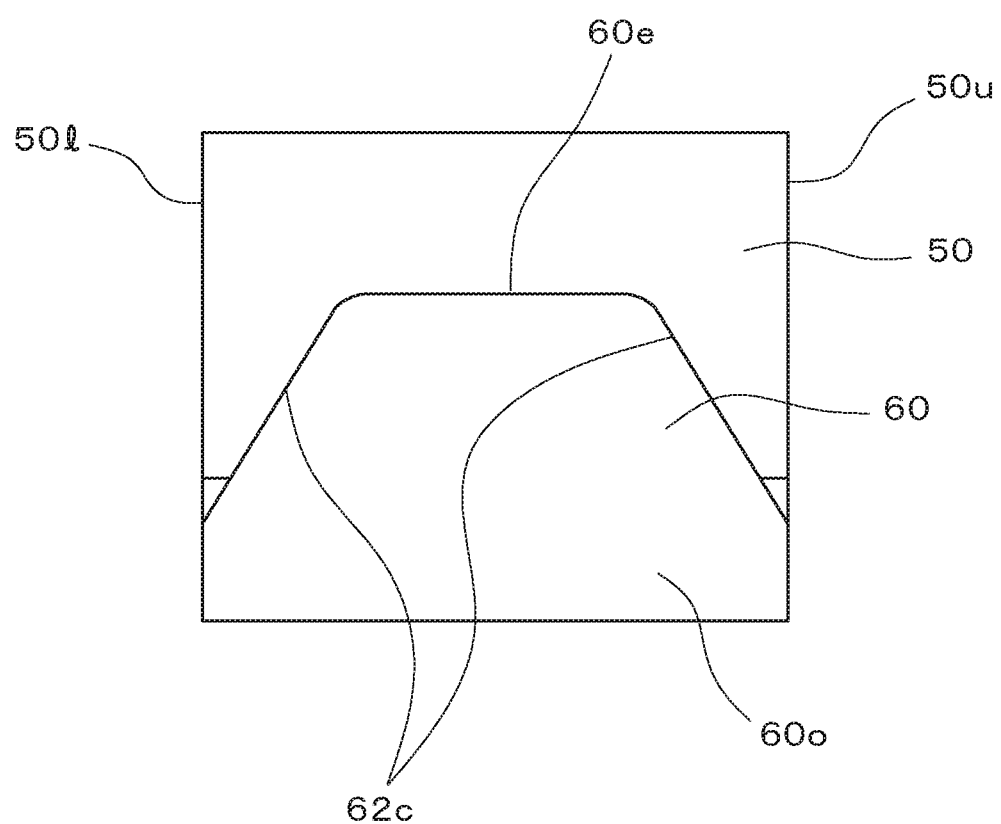
FIG. 19 is a side view of the mounting member according to embodiment 2 of the present invention.

In place of the mounting member 50 in embodiment 1, a mounting member 50 shown in FIGS. 17 to 19 may be used.

In the mounting member 50 in this embodiment, a space between an inner wall surface 59i and a curved surface 55b constitutes an opening continuous with a slit 69.

The slit 69 is provided at the location of a side wall of an engaging portion 55 on the opposite side to a groove 53, and is an opening extending to an outside surface of the mounting member 50 and formed by a space surrounded by a first wall 59 and a second wall 60.

The first wall 59 is extended from a curved surface 55a, and the second wall 60 is extended from a curved surface 55b. The second wall 60 includes an extension portion 61 extending at an inclination with respect to the first wall 59, facing an end portion 59e of the first wall 59. On the opposite side of the extension portion 61 to the curved surface 55b, a covering portion 63 bent and extended from the extension portion 61, covering an outer wall surface 59o of the first wall 59 is formed.

The first wall 59 and the covering portion 63 of the second wall 60 are opposed to each other substantially in parallel with a certain space between the outer wall surface 59o of the first wall 59 and an inner wall surface 60i of the covering portion 63 of the second wall 60, and extend in opposite directions to each other. The space constitutes the slit 69.

The first wall 59 and the second wall 60 constitute a wall of the engaging portion 55 on the opposite side to a hooking portion 52.

The mounting member 50 has a shape in which a portion from an extension portion 54 to the first wall 59 is formed in a wall shape in a generally C shape in cross section, and the second wall 60 in a generally inverted C shape in cross section branching off from an intermediate point of a portion from the extension portion 54 to the first wall 59 is connected to a portion from the extension portion 54 to the first wall 59 as a unit. The second wall 60 branches off from the intermediate portion of the portion from the extension portion 54 to the first wall 59, forming a generally inverted C shape in cross section, and extends to the side opposite to the extension portion 54 further than the first wall 59 to cover the end portion 59e of the first wall 59.

As shown in FIG. 17, the second wall 60 is formed such that, with the mounting member 50 attached to the forward edge portion 12 of the side frame 10, the extension portion 61 extends in a direction toward the rear edge portion 13 from the forward edge portion 12 side in contact with the side plate 11 of the side frame 10, and then a rising portion 62 rises substantially vertically away from the side plate 11. An end portion 60e of the second wall 60 is located opposite to the side plate 11 of the side frame 10 further than the end portion 59*e* of the first wall 59.

The slit 69 constitutes a passage for the stay cloth 32 as shown in FIG. 17. The stay cloth 32 extends, being pressed against the outer surface of the first wall 59 for close contact.

As shown in FIGS. 17 and 18, edges at which a curved surface continuous from a plane surface 55*c* of the engaging portion 55 through the curved surface 55*b* to the inner wall surface 60*i* of the second wall 60 intersects with an upper end surface 50*u* and a lower end surface 50*l* of the mounting member 50 are chamfered to form chamfered portions 60*c*. Of each chamfered portion 60*c*, a portion surrounding the engaging portion 55 corresponds to a one end side guide portion in claims, and a portion surrounding the slit 69 corresponds to a guide member guide portion other configurations.

The depth of chamfering of the chamfered portion 60*c* is gradually deeper from the plane surface 55*c* through the curved surface 55*b* and the inner wall surface 60*i* toward the end portion 60*e* of the second wall 60.

As shown in FIG. 19, the rising portion 62 of the second wall 60 is formed with oblique surface portions 62*c* by obliquely cutting the end portion 60*e* on the upper end surface 50*u* and the lower end surface 50*l* sides.

The angle between one of the oblique surface portions 62*c* and the upper end surface 50*u* or the lower end surface 50*l* of the second wall 60 is less than 45° and generally about 20° to 30°.

Since an end surface of the oblique surface portion 62*c* on the upper end surface 50*u* or the lower end surface 50*l* side is formed with the chamfered portion 60*c*, the end surface of the oblique surface portion 62*c* on the upper end surface 50*u* or the lower end surface 50*l* side is configured to be away from the upper end surface 50*u* and the lower end surface 50*l* while being further away from the upper end surface 50*u* or the lower end surface 50*l* on the inner wall surface 60*i* side than on the outer wall surface 60*o* side.

In this embodiment, the oblique surface portions 62*c* are cut so that edges on the outer wall surface 60*o* side become substantially linear, but are not limited to this, and may be formed in a concave curve at the center toward the rising portion 62.

The oblique surface portions 62*c* may be cut out after molding the mounting member 50, or may be formed during molding of the mounting member 50.

The end portion 60*e* of the second wall 60 is formed as an oblique surface so that an edge on the inner wall surface 60*i* side is located lower toward the extension portion 61 than an edge on the outer wall surface 60*o* side. The edge on the inner wall surface 60*i* side of the end portion 60*e* is chamfered to form a chamfered portion 62*d*.

The mounting member 50 in this embodiment, which has the chamfered portion 60*c*, thus improves workability in the work of mounting the trim plate 37 to which the second stay cloth 32 is mounted into the engaging portion 55 of the mounting member 50.

The work of mounting the trim plate 37 into the engaging portion 55 is performed in the following manner.

First, a worker folds a mounting portion 36 of the second stay cloth 32 once along the boundary between the trim plate 37 and the mounting portion 36 to put the trim plate 37 on top of the mounting portion 36 by the width of the trim plate 37.

Next, with the trim plate 37 and the mounting portion 36 held, the mounting portion 36 is inserted into the slit 69, being put against the chamfered portion 60*c* of the oblique surface portion 62*c*. Then, the trim plate 37 is inserted into the engaging portion 55, being put against the chamfered portion 60*c* of the curved surface 55*b* and the plane surface 55*c*. Thereafter, the trim plate 37 is pressed into the engaging portion 55 to complete the connection between the trim plate 37 to which the second stay cloth 32 is mounted and the mounting member 50.

In this embodiment, the mounting portion is provided at the mounting member 50 formed as a body separate from the forward edge portion 12 of the side frame 10, but is not limited to this, and may be provided integrally with the forward edge portion 12 as a mounted portion.

This embodiment is a structure of a mounting portion for mounting an end portion side of a guide member for guiding the deployment direction of an airbag module to a mounted portion.

The mounting portion includes a holding space for holding inside the end portion side of the guide member in a removable manner. A slit extending to an outside surface of the mounting portion is provided in a side wall of the holding space. The slit and the holding space are open at at least one of the upper and lower ends of the mounting portion.

An end portion side guide member for guiding insertion of the end portion side of the guide member is provided on the open side of the upper and lower ends of the holding space. A guide member guide portion for guiding insertion of a portion adjacent to the end portion side of the guide member is provided on the side of the upper and lower ends of the slit on which the end portion side guide portion is provided.

Accordingly, when the end portion side of the guide member is inserted from the upper end or the lower end of the holding space, the end portion side guide portion and the guide member guide portion guide insertion of the end portion side or the portion adjacent to the end portion side of the guide member, improving the workability of mounting the guide member to the mounting portion.

The mounted portion is a side frame of a seat equipped with an airbag module. The mounting member has a body separate from the side frame, and includes the mounting portion and a groove to be engaged with the side frame.

Thus, the work of mounting the end portion side of the guide member to the side frame of the airbag module-equipped seat is improved in workability.

The holding space and the slit communicate with each other, constituting a passage for the guide member. The passage for the guide member is bent in the slit. The end portion side guide portion and the guide member guide portion have a chamfered shape formed continuously from the end portion side guide portion to the guide member guide portion on the open side of the upper and lower ends.

Accordingly, the portion adjacent to the end portion side of the guide member is put against the guide member guide portion, and then the portion adjacent to the end portion side is pulled around into along the bent guide member passage while the end portion of the guide member is inserted into the holding space, being pressed against the end portion side guide portion, so that the end portion side of the guide member can be easily mounted to the mounting member.

The chamfered shape is formed along an outside surface of the bent guide member passage.

Thus, when the portion adjacent to the end portion side of the guide member is put against the guide member guide portion, and then the portion adjacent to the end portion side of the guide member is pulled around into along the bent guide member passage while the end portion side of the guide member is inserted into the holding space, being pressed against the end portion side guide portion, the guide member can be inserted, being pressed against an outside edge of the bent guide member passage. Thus, during the insertion work, the end portion side of the guide member forms a tapered shape thinnest on the guide member passage side like a funnel, ensuring an area larger than the area of the bent guide member passage for an area of work by the worker, and thus improving the workability.

The holding space includes a first wall constituting one of side walls defining the holding space and having a distal end in a plane along the side wall, and a second wall constituting the other one of the side walls and extending to the outside of the holding space opposite to the distal end. The second wall covers the first wall with a slit between the second wall and an outer wall surface of the first wall. The vertical width of the second wall is formed smaller than the vertical width of a wall forming the groove.

Thus, the groove to be mounted to the side frame can be made relatively large in the width of the wall to ensure rigidity for mounting to the side frame, and the second wall can be made relatively small in width to improve workability during guide member insertion.

The second wall includes an extension portion extending to the outside of the holding space, facing the distal end of the first wall, and a covering portion bending and further extending from the extension portion, covering at least a portion of the outer wall surface of the first wall with a slit between the covering portion and the outer wall surface of the first wall. A distal end of the covering portion has an oblique surface portion inclined with respect to the distal end on the upper end or the lower end side on which the chamfered shape is provided.

Accordingly, insertion of the portion adjacent to the end portion side of the guide member into the slit as a first step of the work of mounting the end portion side of the guide member to the mounting member can be performed from the oblique surface portion inclined with respect to the distal end so that workability in insertion of the portion adjacent to the end portion side of the guide member into the slit can be improved.

The oblique surface portion is formed by the upper end or the lower end inclined substantially linearly or in a concave curve in a side view.

Thus, unlike the case where the oblique surface portion is cut in a convex curve or the like in a side view, the oblique surface portion does not interfere with insertion of the guide member into the slit, and can improve workability.

Embodiment 3

A third embodiment of the present invention will be described with reference to FIGS. 20 to 24. Components similar to those in embodiment 1 will not be described.

Figure 20:
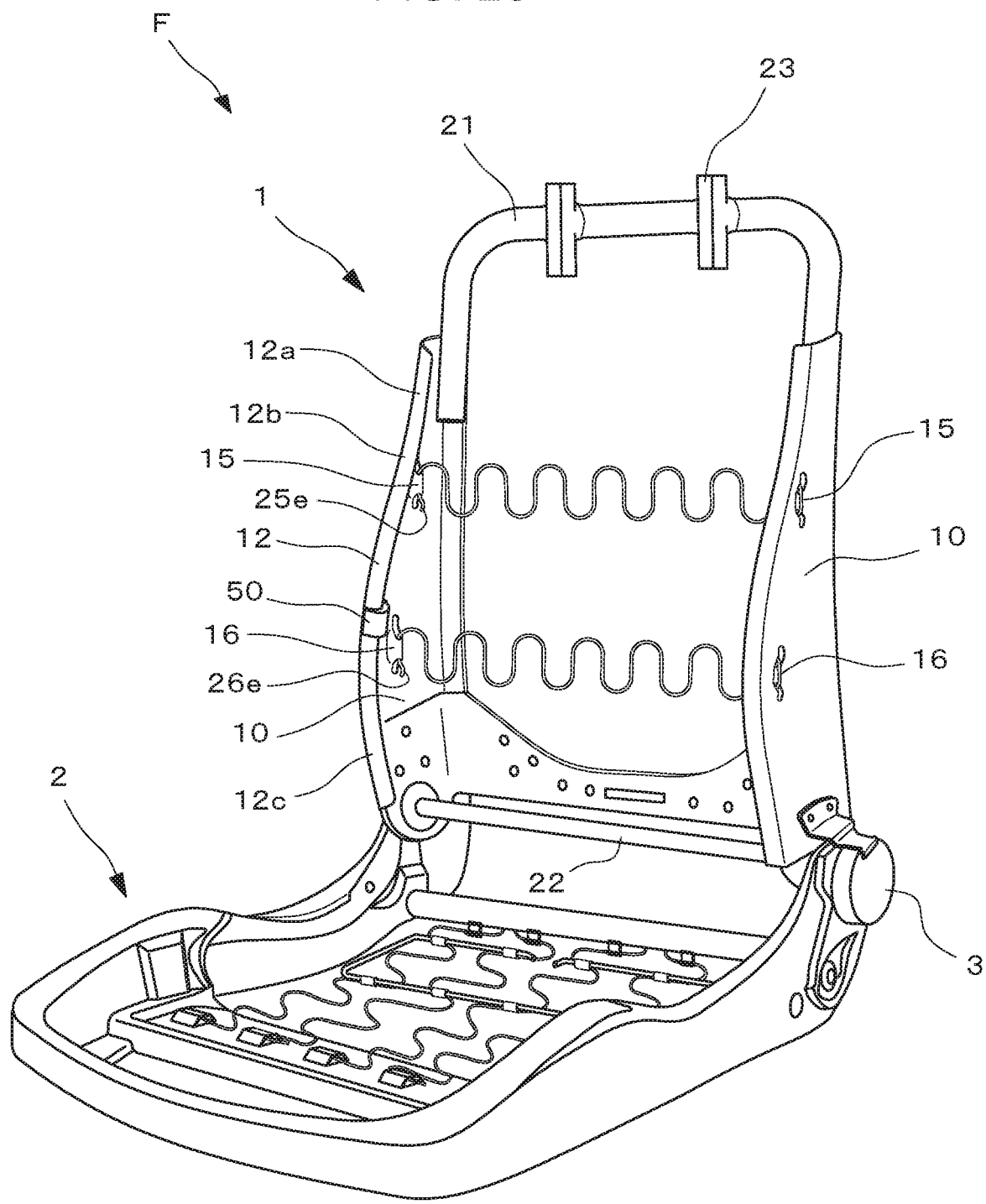
FIG. 20 is a perspective view of a seat frame of an airbag module-equipped seat according to embodiment 3 of the present invention.

In a side frame 10 in this embodiment, a forward edge portion 12 includes, as shown in FIG. 20, an upper portion 12a, a large curvature portion 12b, and a lower portion 12c. The upper portion 12a is a portion between the upper end of the forward edge portion 12 and the large curvature portion 12b, and is at a nearly uniform distance from a rear edge portion 13, or is located slightly further from the rear edge portion 13 at a lower portion than at an upper portion.

The large curvature portion 12b is a portion between the upper portion 12a and the lower portion 12c, and is a place where the distance from the rear edge portion 13 increases sharply. The large curvature portion 12b curves in a concave shape toward the rear of the seat S in a side view. The curvature of the curve formed by the large curvature portion 12b in a side view is greater than the curvatures of curves formed by portions included in the upper portion 12a and the lower portion 12c in a side view along the entire length of the large curvature portion 12b.

The lower portion 12c is a portion between the large curvature portion 12b and the lower end of the forward edge portion 12, and is a place where the distance from the rear edge portion 13 is greatest.

The forward edge portion 12 includes a curved portion 12m with an end portion curved toward the inside of the seat S, and a bent portion 12n extended further from the curved portion 12m and bent back toward the rear of the seat S, and is formed in a U shape in cross section. However, this is not limiting, and the end portion may be bent inward of the seat S to be formed in an L shape.

Figure 21:
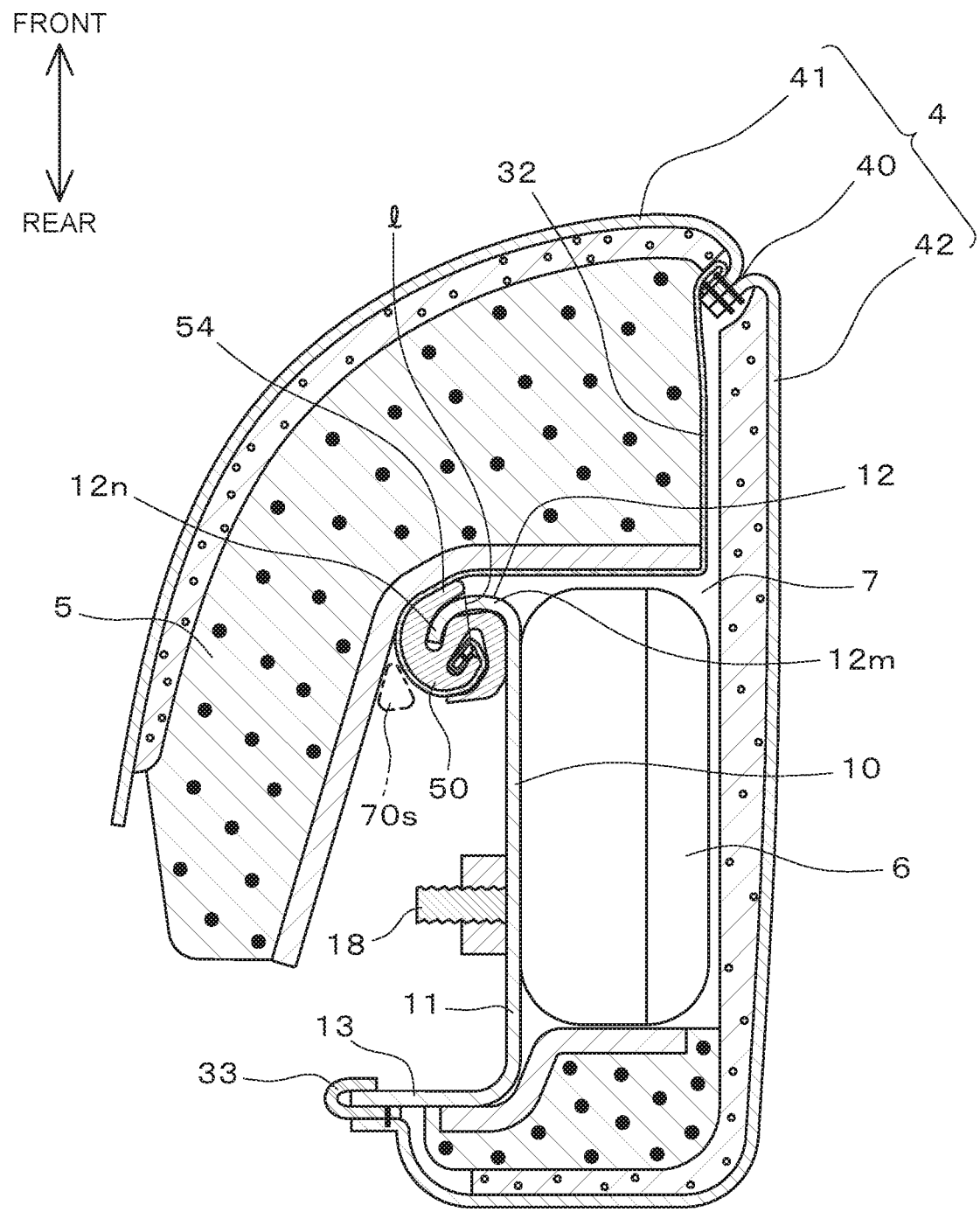
FIG. 21 is a cross-sectional view along A-A in FIG. 1.

An airbag module 6 is fixed to the side frame 10 by a bolt 18. The bolt 18 extends through a wall of the airbag module 6 on the side frame 10 side and a side plate 11 of the side frame 10, and is fastened with a nut. As shown in FIG. 21, the bolt 18 is disposed closer to the rear of the seat S than the center in a front to back direction of the side frame 10.

Figure 22:
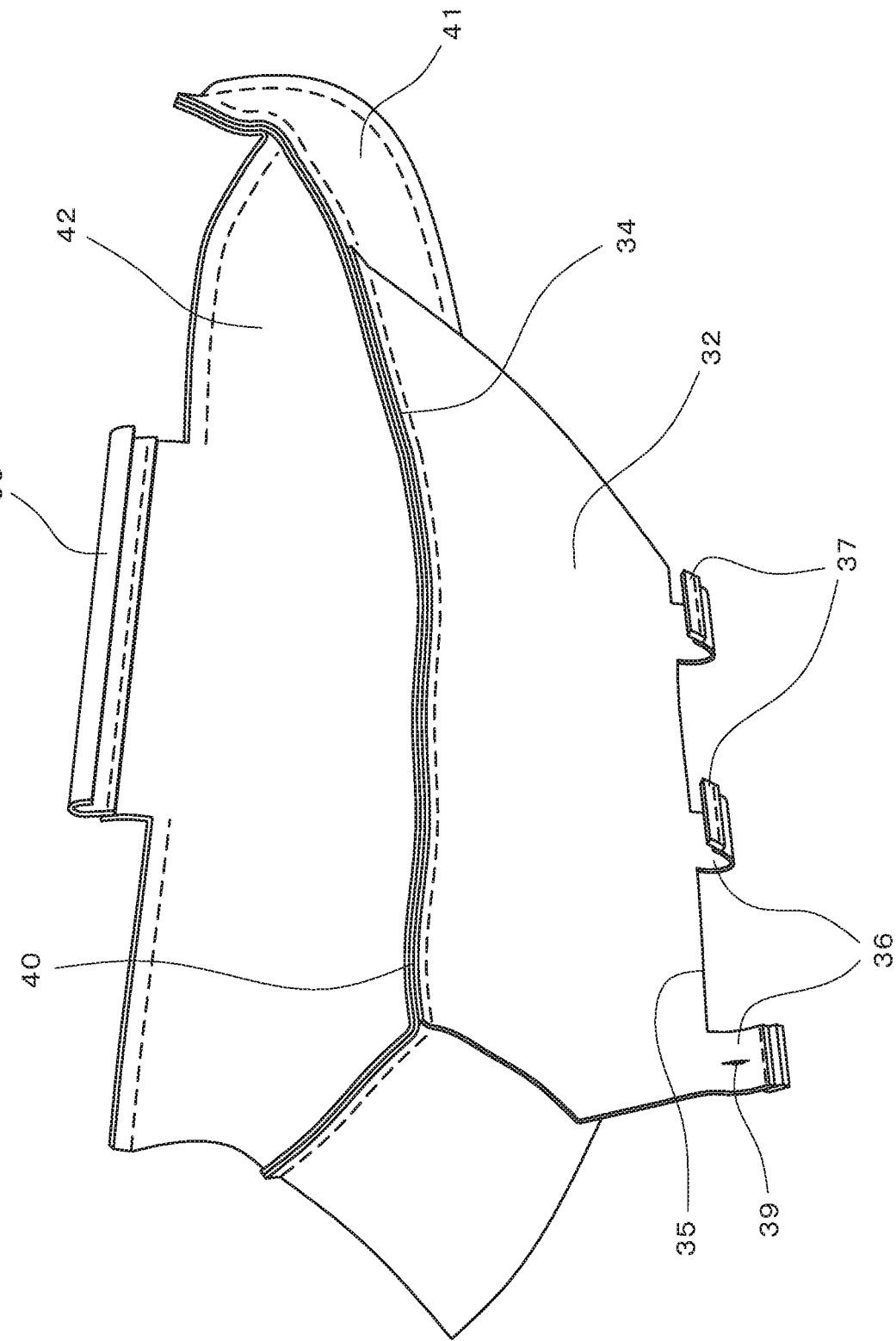
FIG. 22 is an explanatory perspective view diagram illustrating a trim cover and stay cloths sewn together at a tearing portion according to embodiments 3 and 5 of the present invention.

As shown in FIG. 22, an edge 42e of a side gore 42 opposite to a tearing portion 40 is formed longer at an area near the center than areas on both sides, to which an elongated locking member 33 made from a resin in a generally J shape in cross section is sewn. The locking member 33 is used for engaging the central area of the edge 42e with the rear edge portion 13 of the side frame 10.

In the mounting member 50 in this embodiment, a groove 53 is formed by a space between a wide portion 51 and an extension portion 54 branching off from a base portion of the wide portion 51. The groove 53 holds the bent portion 12n at the distal end of the forward edge portion 12. The groove 53 and the wide portion 51 and the extension portion 54 forming the groove 53 constitute a mounted portion connecting portion.

Figure 23:
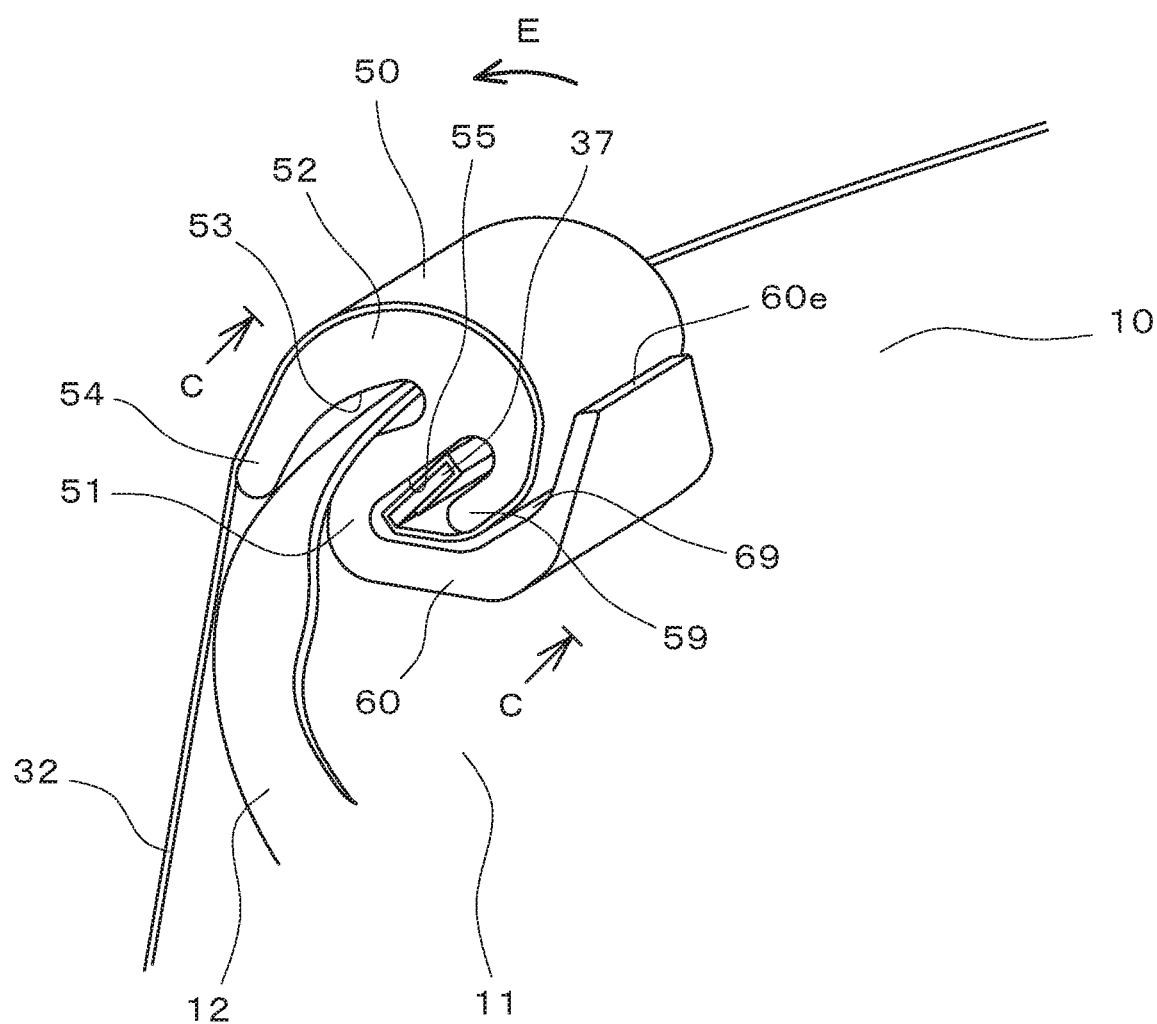
FIG. 23 is an explanatory perspective view diagram illustrating a stay cloth connected to a seat back frame via a mounting member according to embodiments 3 and 5 of the present invention.
Figure 24:
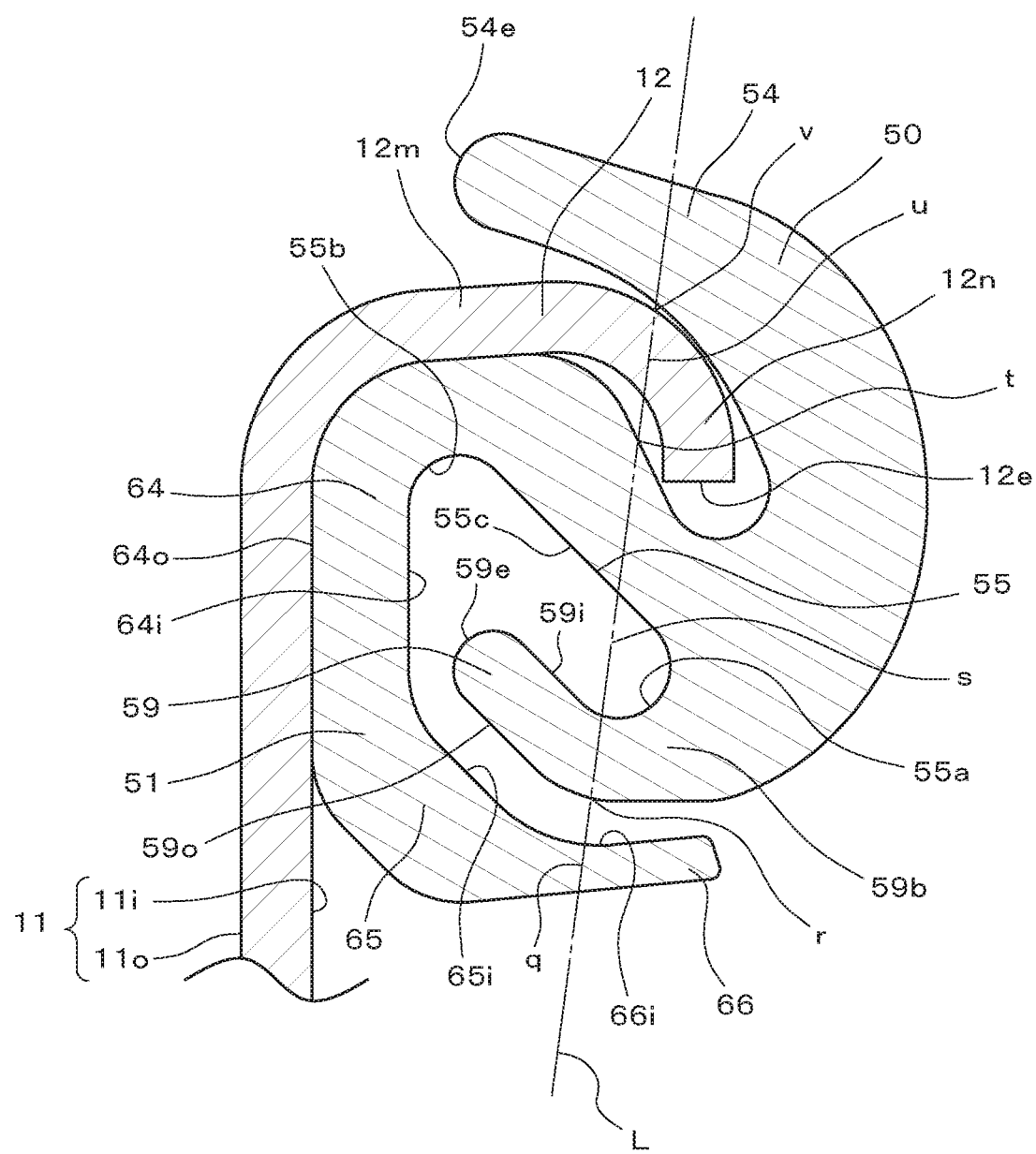
FIG. 24 is an explanatory cross-sectional view diagram illustrating the state of engagement between the mounting member and a side frame according to embodiment 3 of the present invention.

As shown in FIGS. 23 and 24, an engaging portion 55 includes, at one end of a plane surface 55c, a curved surface 55a for surrounding one end side of a trim plate 37 in a cross-sectional length direction, and includes at the other end a curved surface 55b for surrounding the other end side of the trim plate 37 in the cross-sectional length direction. The curved surface 55a is located on the deep side when viewed from the slit 69 side, and the curved surface 55b on the side near the slit 69.

Further, the engaging portion 55 includes an inner wall surface 59i of a first wall 59 continuous from the curved surface 55a, facing the plane surface 55c. The first wall 59i is formed shorter than the plane surface 55c. A wall surface formed by the curved surfaces 55a, 55b and the plane surface 55c constitute a side wall defining the engaging portion 55.

The first wall 59 is extended from the curved surface 55a, and a second wall 60 is extended from the curved surface 55b. The first wall 59 and the second wall 60 extend in opposite directions to each other, constituting a wall of the engaging portion 55 on the opposite side to a hooking portion 52. As shown in FIG. 24, the second wall 60 includes a first extension portion 64, a second extension portion 65, and a third extension portion 66. The first extension portion 64 has an inner wall surface 64i extending at an inclination with respect to the first wall 59 in a direction to be closer to the first wall 59 side as moving toward the outside of the engaging portion 55, facing an end portion 59e of the first wall 59. An outer wall surface 64o of the first extension portion 64 abuts a surface 11i facing the inside of the seat S of the side plate 11 of the side frame 10 when the mounting member 50 is attached to the forward edge portion 12.

On the side of the first extension portion 64 opposite to the curved surface 55b, the second extension portion 65 bending from the first extension portion 64 and further extending to the outside of the engaging portion 55 is provided.

The second extension portion 65 has an inner wall surface 65i extending substantially in parallel with and along an outer wall surface 59o of the first wall 59.

On the side of the second extension portion 65 opposite to the first extension portion 64, the third extension portion 66 bending from the second extension portion 65 and further extending to the outside of the engaging portion 55 is provided. The third extension portion 66 covers a base portion 59b of the first wall 59.

The inner wall surface 65i of the second extension portion 65 and an inner wall surface 66i of the third extension portion 66 form a space with the outer wall surface 59o of the first wall 59 with a certain distance therebetween. The space constitutes the slit 69.

As shown in FIG. 23, with the trim plate 37 to which a stay cloth 32 is sewn held in the engaging portion 55, the mounting member 50 is engaged at the groove 53 with the forward edge portion 12 of the side frame 10. At this time, the extension portion 54 and the wide portion 51 hold the bent portion 12n of the forward edge portion 12 in a concealing manner. The groove 53 is fitted onto the distal end of the bent portion 12n, extending over the front and rear surfaces of the bent portion 12n.

The front surface side of the bent portion 12n is covered by the extension portion 54 as shown in FIGS. 21 and 23. The extension portion 54 is formed thinner than other portions of the hooking portion 52.

As shown in FIG. 21, a mounting portion 36 that is an end portion of the stay cloth 32 is provided closer to the center in the seat S front to back direction, that is, closer to the rear of the seat S in this embodiment, than the rear surface of the forward edge portion 12, that is, a surface continuous from the surface 11i of the side frame 10 opposite to the airbag module 6 mounting surface.

The mounting portion 36 that is the end portion of the stay cloth 32 is disposed in an area surrounded by the surface 11i of the side frame 10 opposite to the airbag module 6 mounting surface, the curved portion 12m and the bent portion 12n.

As shown in FIG. 21, the end portion 12e of the forward edge portion 12 is disposed inside in the seat S width direction of a line 1 connecting the end portion 54e of the extension portion 54 on the outside in the seat front to back direction and the mounting portion 36 that is the end portion of the stay cloth 32 housed in the engaging portion 55, and is located on the opposite side to the direction in which a portion of the stay cloth 32 contacting the outside surface of the extension portion 54 is pulled during the deployment of the airbag module 6.

As shown in FIGS. 21 and 24, the end portion 12e of the forward edge portion 12 is located closer to the rear of the seat S, that is, closer to the inside in the seat S front to back direction than the location of the engaging portion 55 closest to the front of the seat S, that is, the curved surface 55b in FIG. 6 that is at the outermost location in the seat S front to back direction.

As shown in FIG. 24, the wide portion 51 of the mounting member 50 on the side frame 10 abuts at the outer wall surface 64o of the first extension portion 64 on a surface 11i of the side plate 11 of the side frame 10 on the inside of the seat S. The surface 11i corresponds to the rear surface of the airbag module mounting surface 11o.

As shown in FIG. 21, the mounting member 50 has a portion of an outside surface from the front of the seat S to the inside of the seat S contacting the cushion pad 5 via the stay cloth 32. More specifically, the cushion pad 5 abuts the outside surface of the extension portion 54 of the mounting member 50 across the stay cloth 32. A pressing force from the cushion pad 5 acts on the extension portion 54, pressing the extension portion 54 against the outside surface of the forward edge portion 12.

A space 70s is left between a portion of the outside surface of the mounting member 50 from the rear of the seat S to the inside of the seat S and the cushion pad 5 to the extent that the mounting member 50 can be visually checked from the rear of the seat S. This space 70s allows the mounting member 50 to be visually checked in the mounting state from the outside of the seat S when the locking member 33 located at the rear of the seat is removed.

As shown in FIG. 21, a portion of the rear surface of the cushion pad 5 closer to the rear of the seat S than the forward edge portion 12 extends rearward and inward of the seat S at an inclination with respect to the side plate 11 of the side frame 10.

The mounting member 50 is provided in a position different from that of the bolt 18 for mounting the airbag module 6 to the side frame 10 as shown in FIG. 21. The mounting member 50 is attached closer to the front of the seat S than the bolt 18, and is arranged at a distance therefrom in the seat S front to back direction. The bolt 18 and the mounting member 50 are formed at the same height, and are arranged in line with each other in the seat S front to back direction.

As shown in FIG. 20, the mounting member 50 is attached to a place other than the large curvature portion 12b of the forward edge portion 12 of the side frame 10, that is, to the upper portion 12a or the lower portion 12c. FIG. 20 shows an example of attaching the mounting member 50 to the lower portion 12c.

In the mounting member 50 in FIG. 24, an edge side (q) of the second wall 60 located outside of the pair of walls forming the slit 69, the outer wall surface 59o (r) on the slit 69 side of the first wall 59 located inside of the pair of walls, the engaging portion 55 (s), the plane surface 55c (t) of the engaging portion 55 on the side opposite to the slit 69, a flange (u) of the side frame 10, and an engagement area (v) between the mounting member 50 and the flange are located in the same plane L.

In this embodiment, a side frame includes a flange formed by an end portion of the side frame at the front or the rear of the seat bending toward the seat inside. A mounting member is attached to an end portion side of a guide member. The mounting member includes a guide member connecting portion to which the end portion side of the guide member is attached, and a mounted portion connecting portion to be engaged with the mounted portion. The mounted portion connecting portion is attached to the flange so that the mounting member is attached to the side frame. An end portion of the guide member is provided closer to the center of the side frame in the seat front to back direction than a surface of the flange continuous from a rear surface of an airbag module mounting surface of the side frame.

Therefore, unlike the case where an oblique surface portion is cut in a convex curve or the like in a side view, the oblique surface portion does not interfere with insertion of the guide member into a slit, improving workability.

The end portion of the flange bent toward the seat inside includes a bent portion bent back forward or rearward of the seat. The mounted portion connecting portion is connected to the bent portion. The end portion of the guide member is disposed in an area surrounded by the rear surface of the airbag module mounting surface of the side frame and the bent portion.

Thus, the flange includes the bent portion, which increases the rigidity of the flange and increase mounting rigidity when the guide member is mounted to the side frame via the mounting member.

Since the end portion of the guide member is disposed in the area surrounded by the rear surface of the airbag module mounting surface of the side frame and the bent portion, the mounting position of the end portion of the guide member is restricted.

The mounting member abuts the rear surface of the airbag module mounting surface of the side frame.

Accordingly, the rear surface of the airbag module mounting surface of the side frame whose rigidity is increased by mounting the airbag thereto supports the mounting member, thus increasing the mounting rigidity of the mounting member.

The mounting member is engaged with the bent portion formed at the end portion of the side frame at the seat front. A cushion pad is disposed at the seat front of the side frame and on the opposite side to the airbag module mounting surface. The mounting member is subjected to a pressing force from the cushion pad.

The mounting member is subjected to a pressing force from the cushion pad at a portion of an outside surface of the mounting member that is on the inside in a seat width direction and on the outside in a seat front to back direction.

Accordingly, a sense of flapping of the cushion pad is prevented, and also the mounting member is prevented from coming out from the side frame. Further, an airbag peripheral mechanism of the seat can be made compact.

The mounted portion connecting portion attached to the distal end of the bent portion extends over front and rear surfaces of the distal end of the bent portion. Thus, mounting rigidity is increased.

A portion of the mounted portion connecting portion covering the front surface of the distal end of the bent portion is formed thinner than other portions of the mounted portion connecting portion.

Thus, a portion of the guide member passing along the outside of the mounting member does not extend out largely from the distal end of the bent portion, which prevents the guide member from being damaged by nearby members.

The mounting member is disposed in a position different from that of a module mounting member for mounting the airbag module to the side frame in the seat front to back direction.

Thus, interference between the mounting member and a member such as a bolt for mounting the airbag module to the side frame can be prevented, which results in improved workability.

The module mounting member is disposed at the rear with respect to the center of the side frame in the seat front to back direction.

Thus, interference between the mounting member and a member such as a bolt for mounting the airbag module to the side frame can be prevented, which results in improved workability.

The mounting member is disposed at the distal end of the flange in a position different from the position where the curve formed by the distal end is largest in curvature.

In the position where the curve formed by the distal end of the flange is largest in curvature, the degree of curve is great and it is difficult to attach the mounting member. The mounting member is disposed at the distal end of the flange in a position different from the position where the curve formed by the distal end is largest in curvature, which results in improved mountability of the mounting member.

The mounted portion connecting portion includes an extension portion for covering the front surface of the distal end of the bent portion. The distal end of the flange is disposed on the opposite side to the direction in which the guide member is pulled with respect to a straight line connecting the distal end of the extension portion and the end portion of the guide member housed in the guide member connecting portion.

Consequently, when the airbag module is deployed or is not deployed, the more the tensile force acts on the guide member, the more the mounting member is pressed against the distal end of the flange, which can prevent the mounting member from disengaging from the flange.

In the '659 Document, the hooks are hooked on the hooking pins provided at the module cover. Since a module cover is often formed by resin molding or the like, as in the '659 Document, it is desired to increase the rigidity of a member to which a hook is attached. Further, since a mounting member such as a hook is used to mount a stay cloth to the airbag module side, there has been a demand for a configuration with which workability in mounting is improved, a mounting member is difficult to disengage, a good fit is provided between the surroundings of a mounting mechanism and a cushion pad, and the surroundings of the mounting mechanism are made compact.

This embodiment can provide an airbag module-equipped seat with increased mounting rigidity in mounting a stay cloth to the airbag module side using a mounting member. The embodiment can further provide an airbag module-equipped seat with a stay cloth mounted to the airbag module side using a mounting member, the airbag module-equipped seat that provides good workability in mounting, a mounting member difficult to disengage, a good fit between the surroundings of the mounting mechanism and the cushion pad, and the compact surroundings of the mounting mechanism.

Embodiment 4

Figure 25:
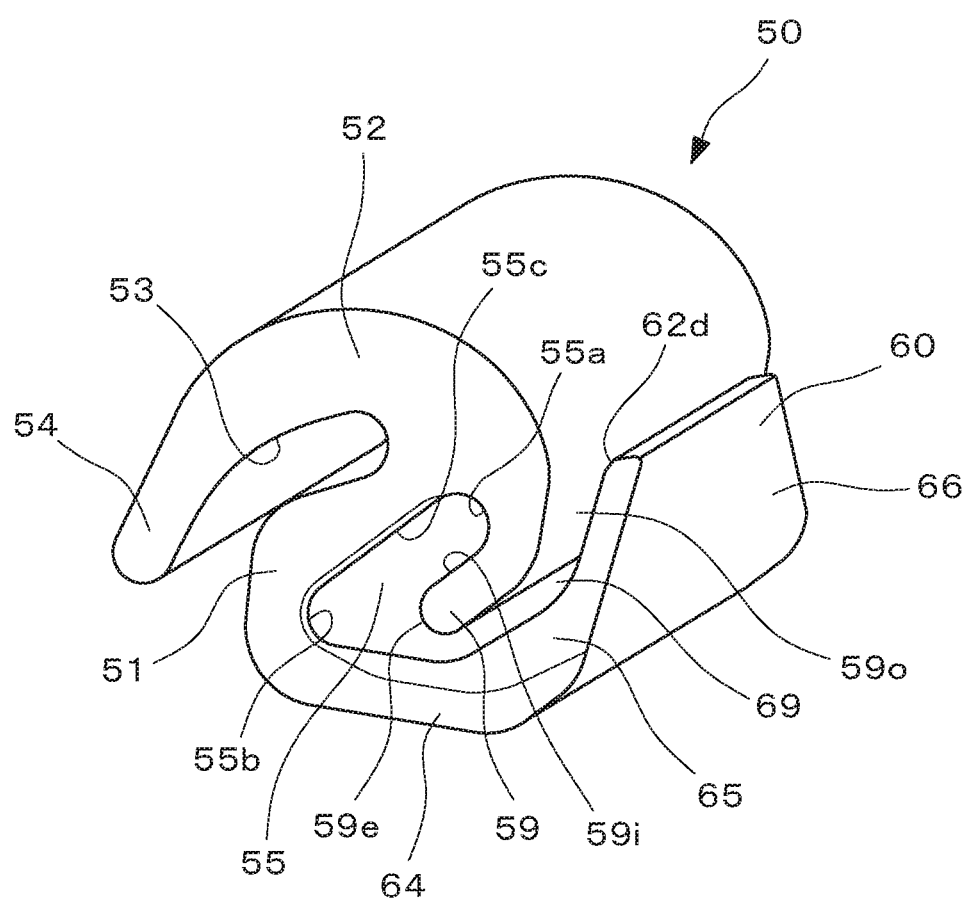
FIG. 25 is a perspective view of a mounting member according to embodiment 4 of the present invention.

A fourth embodiment of the present invention will be described with reference to FIGS. 17, 24, and 25. Components similar to those in embodiment 1 will not be described.

In a mounting member 50 in this embodiment, an inner wall surface 64i of a first extension portion 64, an inner wall surface 65i of a second extension portion 65, and an inner wall surface 66i of a third extension portion 66 bend at angles between each other. The angle between the inner wall surface 64i of the first extension portion 64 and the inner wall surface 66i of the third extension portion 66 is about 90°.

As shown in FIG. 24, the second extension portion 65 is formed thicker than the first extension portion 64 and the third extension portion 66. The second extension portion 65 is in a position where the second extension portion 65 is subjected to a pressing force from an end portion 59e of the first wall 59 via a stay cloth 32 when a trim plate 37 subjected to the tensile force acting on the stay cloth 32 presses the first wall 59 outward.

That is, as shown in FIG. 17, when the trim plate 37 to which the stay cloth 32 is mounted is mounted to the mounting member 50, the tensile force in an arrow E direction acts on the stay cloth 32. The tensile force is transmitted to the trim plate 37, and as shown in FIG. 24, the trim plate 37 presses the first wall 59 in a direction that is a direction toward the second extension portion 65. Of the first wall 59, a portion displaced largest by a pressing force caused by the trim plate 37 is the end portion 59*e*. In this embodiment, the second extension portion 65 is formed thick so that the end portion 59*e* is supported on the inner wall surface 65*i* of the second extension portion 65 via the stay cloth 32, and the trim plate 37 is prevented from disengaging from the engaging portion 55.

As for the thicknesses of the first extension portion 64, the second extension portion 65, and the third extension portion 66, the second extension portion 65 is thickest. Second, the first extension portion 64 is formed thickest. The third extension portion 66 that is least subjected to a pressing force caused by the tensile force of the stay cloth 32 is formed thinnest. The third extension portion 66 formed thin thus also improves workability in the work of inserting the stay cloth 32 into the slit 69.

Further, when attached to the forward edge portion 12 of the side frame 10, as shown in FIG. 24, the first extension portion 64 abuts the side plate 11 of the side frame 10 so that a pressing force from the trim plate 37 can also be received by the side plate 11. This allows the first extension portion 64 to be formed thinner than the second extension portion 65.

As shown in FIGS. 17 and 24, the mounting member 50 is attached to the side frame 10 by the groove 53 engaged with the forward edge portion 12 of the side frame 10 with the trim plate 37 to which the end portion of the stay cloth 32 is sewn held in the engaging portion 55.

The mounting of the stay cloth 32 to the side frame 10 via the mounting member 50 is performed by the following process.

A worker first folds once a mounting portion 36 of the stay cloth 32 along the boundary between the trim plate 37 and the mounting portion 36 to put the trim plate 37 on top of the mounting portion 36 by the width of the trim plate 37.

Then, with the trim plate 37 and the mounting portion 36 held, the mounting portion 36 is inserted into the slit 69. Then, the trim plate 37 is inserted into the engaging portion 55 and pressed thereinto to complete connection between the trim plate 37 to which the stay cloth 32 is mounted and the mounting member 50.

Then, the groove 53 of the mounting member 50 is engaged with a predetermined place of the forward edge portion 12 of the side frame 10.

The above work is performed for all mounting members 50 to complete mounting of the stay cloth 32 to the side frame 10 via the mounting members 50.

This embodiment is a structure of a mounting portion for mounting an end portion side of a guide member for guiding the deployment direction of an airbag module to a mounted portion, in which the mounting portion has a holding space for holding inside the end portion side of the guide member in a removable manner, and along a side wall defining the holding space, a slit extending to an outside surface of the mounting portion is provided. The slit and the holding space communicate, constituting a passage for the guide member bent at a connection portion between the holding space and the slit. At a location where the slit is adjacent to the holding space, an outside wall of the slit is inclined at an obtuse angle with respect to an outside wall of the holding space.

Accordingly, the outside wall of the slit is positioned in such a manner as to cover the end portion side of the guide member held in the holding space. Thus, at the location where the slit is adjacent to the holding space, a force acts in a direction to press the end portion side of the guide member back into the holding space via the guide member passed into the slit so that the end portion side of the guide member can be prevented from disengaging from the holding space.

The mounted portion is a side frame of a seat equipped with an airbag module. The mounting member is formed by a body separate from the side frame, and includes the mounting portion and the groove to be engaged with the side frame.

The holding space includes a first wall constituting one of side walls defining the holding space and having a distal end in a plane along the side wall, and a second wall constituting the other one of the side walls and extending at one end to the outside of the holding space, facing the distal end. The side walls have an opening through which the holding space communicates with the slit between the distal end of the first wall and the second wall. The second wall includes a first extension portion extending outward of the holding space at an inclination with respect to the first wall, facing the distal end of the first wall.

Accordingly, at the location where the slit is adjacent to the holding space, a force acts in a direction to press the end portion side of the guide member back into the holding space via the guide member passed into the slit so that the end portion side of the guide member can be prevented from disengaging from the holding space.

Further, when the end portion side of the guide member is mounted to the side frame of the airbag module-equipped seat, the end portion side of the guide member is prevented from disengaging from the side frame side.

The second wall includes a second extension portion extending from the first extension portion further outward of the holding space along an outer wall surface of the first wall. A surface of the second extension portion on the first wall side has an angle with respect to the first extension portion.

A slit constituting a passage for the guide member can be formed between the outside surface of the first wall and the second extension portion. Since the second extension portion extends along the outer wall surface of the first wall, the slit can be formed compact.

The second wall includes a third extension portion extending from the second extension portion further to the opposite side to the first extension portion, covering a base portion of the first wall.

Thus, the slit can be formed along the first extension portion, the second extension portion, and the third extension portion. Further, since the first wall is covered along the first extension portion, the second extension portion, and the third extension portion, the first wall can be prevented from falling outward and being deformed by a pressure from inside the holding space, and enlarging the holding space. Further, the third extension portion can prevent the guide member from bending.

The second extension portion and the third extension portion have a certain distance from the outer wall of the first wall.

Thus, the slit can be formed uniformly in width to form the slit compact.

The second extension portion is formed thicker at a portion subjected to a pressing force from inside the holding space via the first wall than at other portions of the second wall.

When the tensile force acts on the guide member, a portion that is subjected to the largest pressing force from the end portion side of the guide member held in the holding space is the first wall. A portion of the second extension portion that is subjected to the pressing force via the first wall is formed thicker than other portions so that the first wall can be efficiently prevented from falling outward by the pressing force, deforming, and enlarging the holding space.

Embodiment 5

A fifth embodiment of the present invention will be described with reference to FIGS. 22, 23, and 26 to 31. Components similar to those in embodiment 1 will not be described.

A trim cover 4 in this embodiment has a mounting portion 36 with a cut 39 shown in FIG. 22 made at a place about 1.5 times the width of the trim plate 37 in the direction of pulling a stay cloth 32 from the place where the trim plate 37 is sewn. In place of the cut 39, an opening in a circular, oval, polygonal, or some other shape may be provided.

Figure 26:
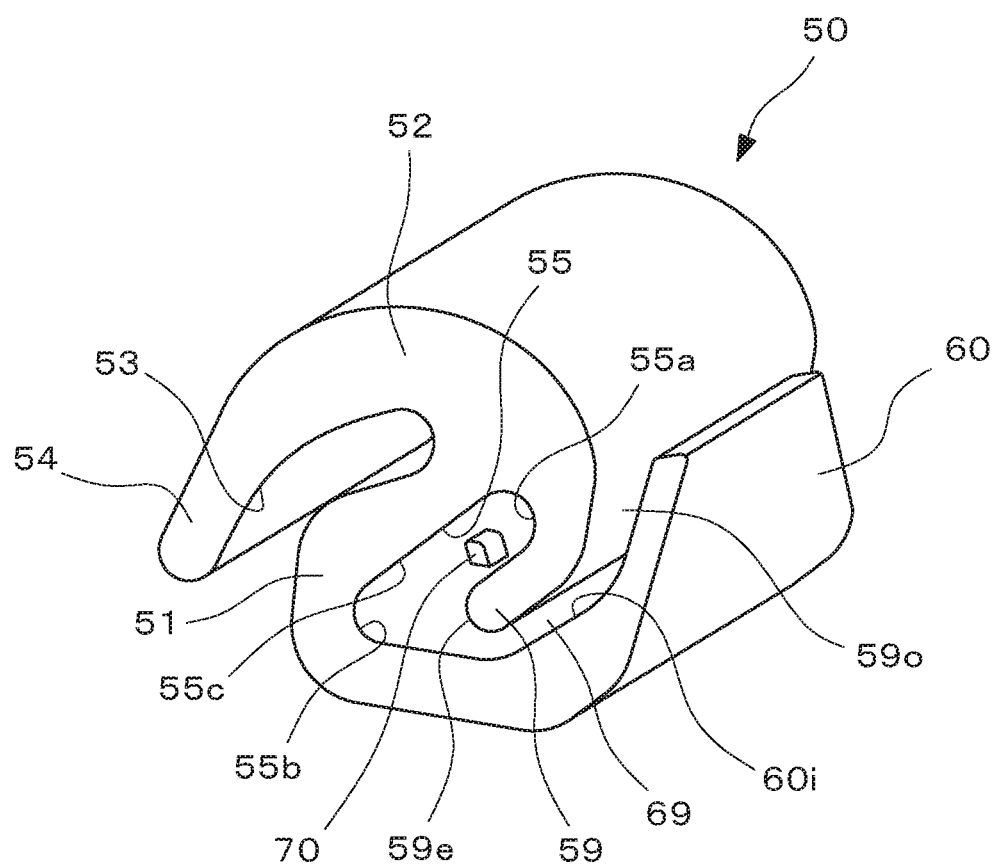
FIG. 26 is a perspective view of a mounting member according to embodiment 5 of the present invention.
Figure 27:
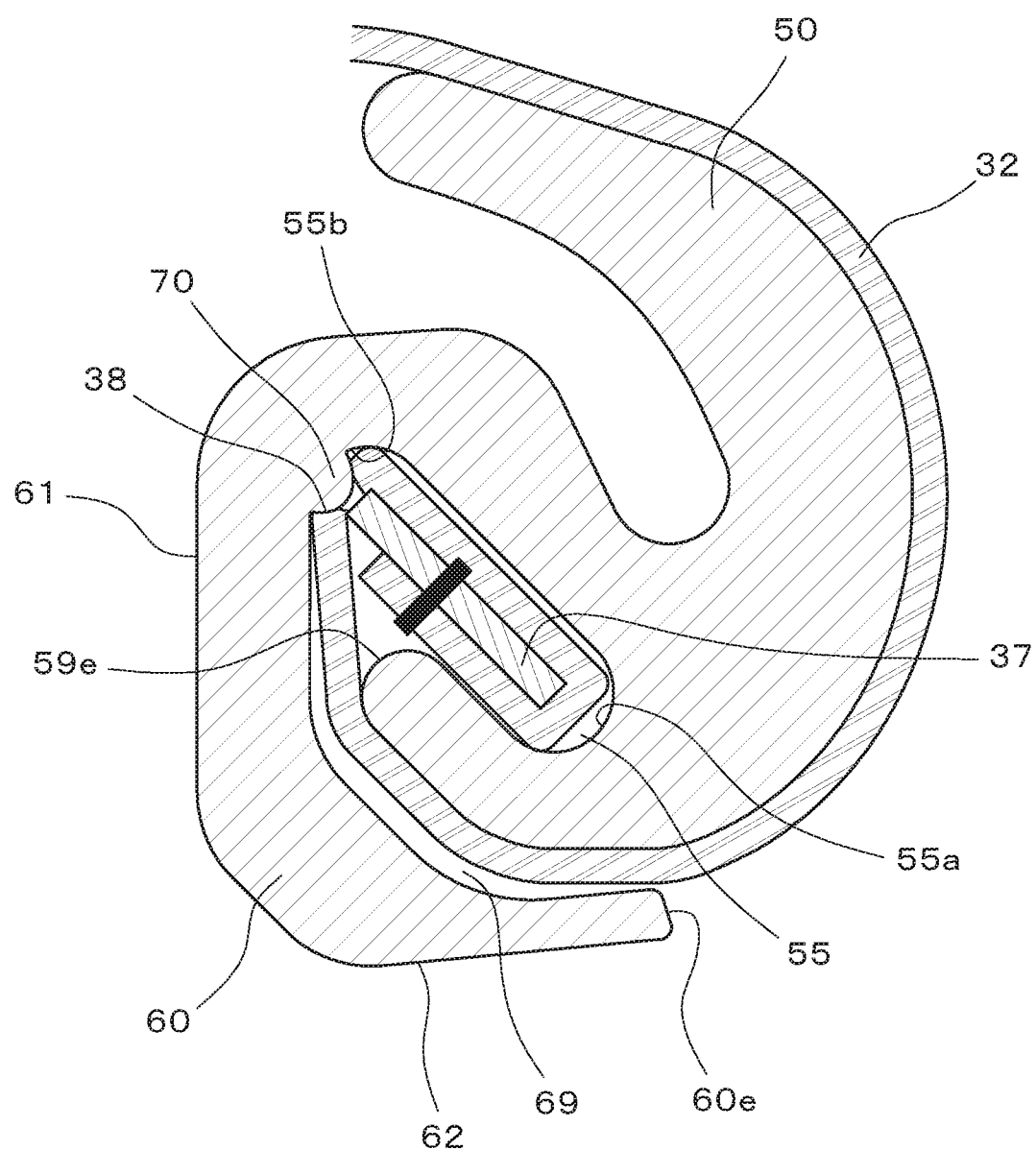
FIG. 27 is a cross-sectional view along C-C in FIG. 23, and is a cross-sectional explanatory diagram with a side frame omitted.

Further, as shown in FIGS. 26 and 27, on a curved surface 55b of a mounting member 50, near the center in the vehicle seat S up and down direction, a protrusion 70 is erected for positioning the stay cloth 32 with respect to the mounting member 50. Thus, the protrusion 70 is provided on the curved surface 55b that is closer to a slit 69 than a curved surface 55a so that the protrusion 70 presses the trim plate 37 toward the curved surface 55a deeper and further from the slit 69. Consequently, when the airbag is not deployed, the trim plate 37 and the stay cloth 32 can be prevented from disengaging.

As shown in FIGS. 23, 26, and 27, a second wall 60 is provided in such a manner as to cover and conceal an end portion 59e of a first wall 59 from outside, and the slit 69 between the first wall 59 and the second wall 60 is formed as a passage of the stay cloth 32, so that the mounting member 50 can reduce a torque generated at the trim plate 37 by the tensile force transmitted from the stay cloth 32.

Thus, since the mounting member 50 is provided with the protrusion 70 and the stay cloth 32 is provided with the cut 39, when the trim plate 37 to which the stay cloth 32 is mounted is inserted from the upper end or the lower end of an engaging portion 55, the protrusion 70 engages with the cut 39, positioning the trim plate 37 in the mounting member 50.

Although the cut 39 is formed in the stay cloth 32 in this embodiment, the cut 39 does not necessarily need to be provided. Even when the cut 39 is not formed, the stay cloth 32 is wrapped around the trim plate 37 so that the stay cloth 32 acts like a cushion on the surface of the trim plate 37. Accordingly, the protrusion 70 presses the trim plate 37 toward the curved surface 55a on the deep side further from the slit 69, restricting movement of the trim plate 37 in the engaging portion 55. The protrusion 70 and the cut 39 correspond to a movement restraining portion. The movement restraining portion also functions as a position restricting portion for restricting the position of the trim plate 37 in the engaging portion 55.

In this embodiment, the mounting portion is provided at the mounting member 50 formed as a body separate from the forward edge portion 12 of the side frame 10 that corresponds to a mounted portion, which is not limiting. The mounting portion may be integrally provided with the forward edge portion 12 as the mounted portion.

Figure 28:
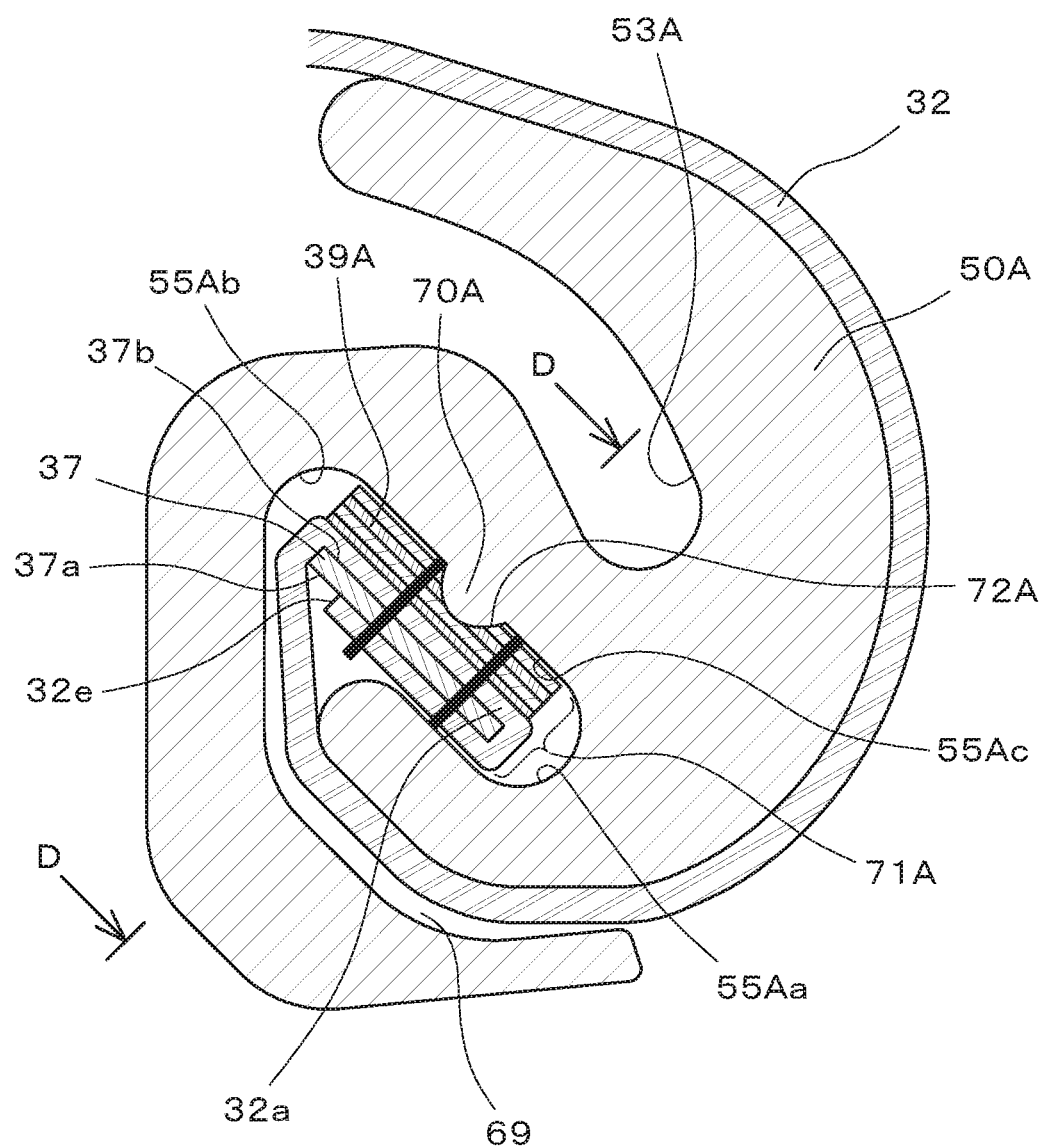
FIG. 28 is an explanatory cross-sectional view diagram illustrating the state of connection between a mounting member and a trim plate according to a modification of embodiment 5 of the present invention.
Figure 31:
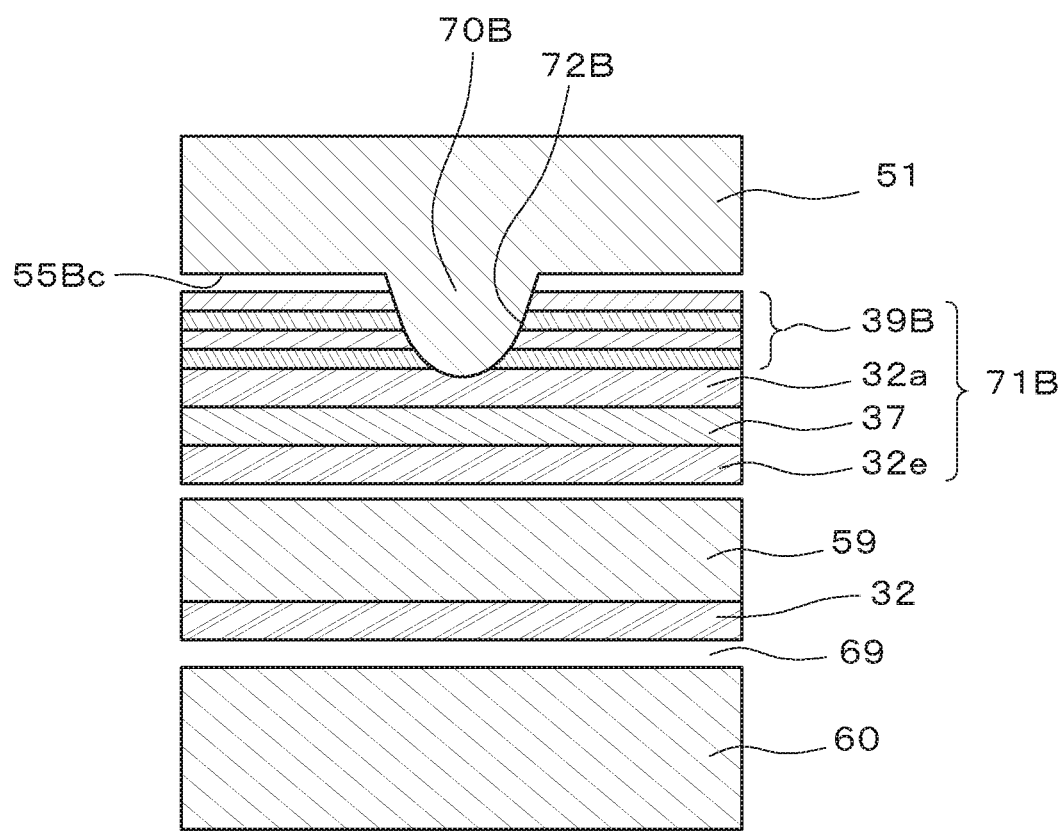
FIG. 31 is a cross-sectional view along G-G in FIG. 30.
Figure 32:
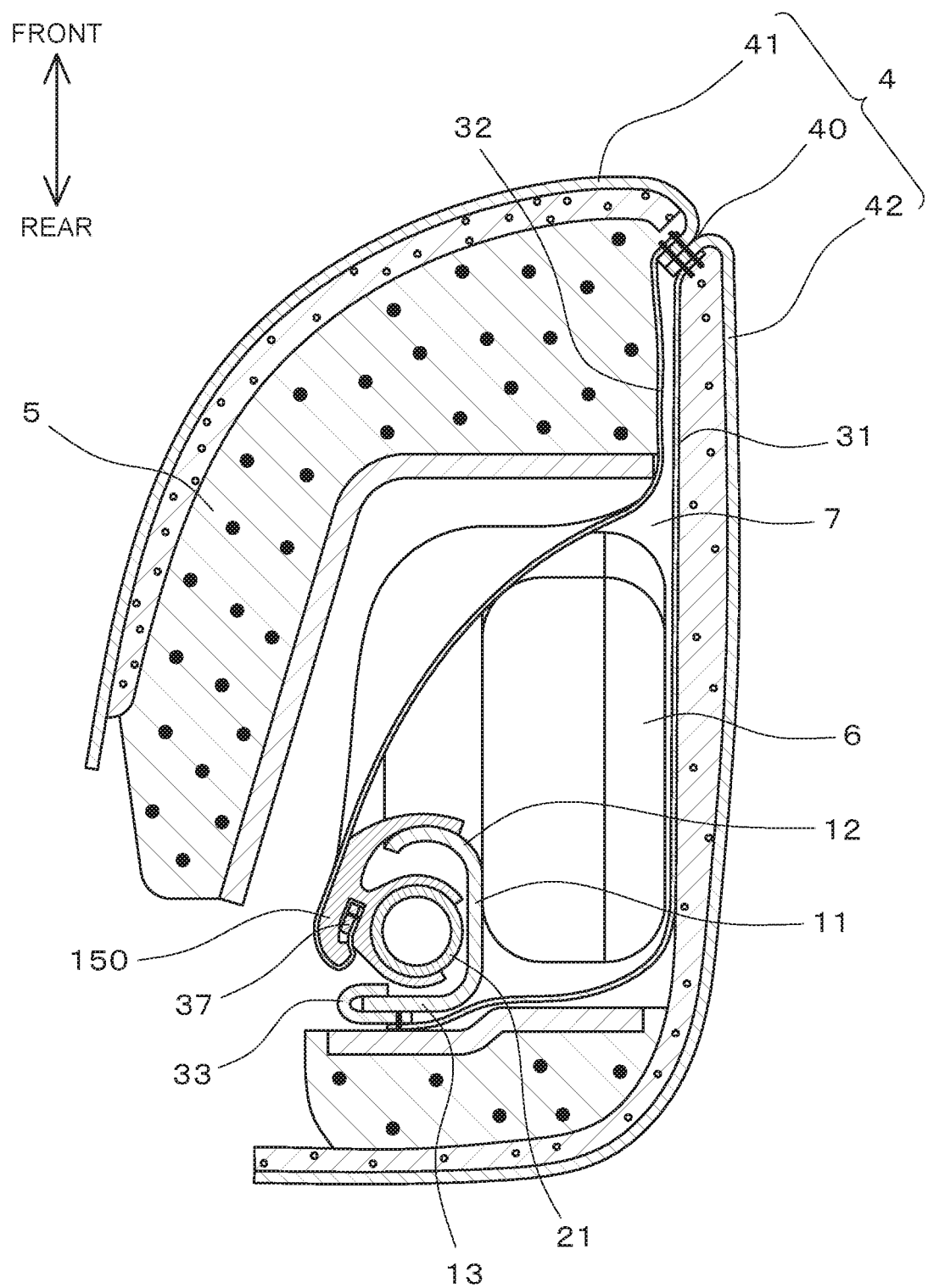
FIG. 32 is a cross-sectional view along A-A in FIG. 1.

Although the mounting member 50 is used in this embodiment as a mounting member of the various embodiments described herein, the mounting member may be configured as a mounting member 50A or 50B shown in FIG. 28 or 31 instead.

Figure 29:
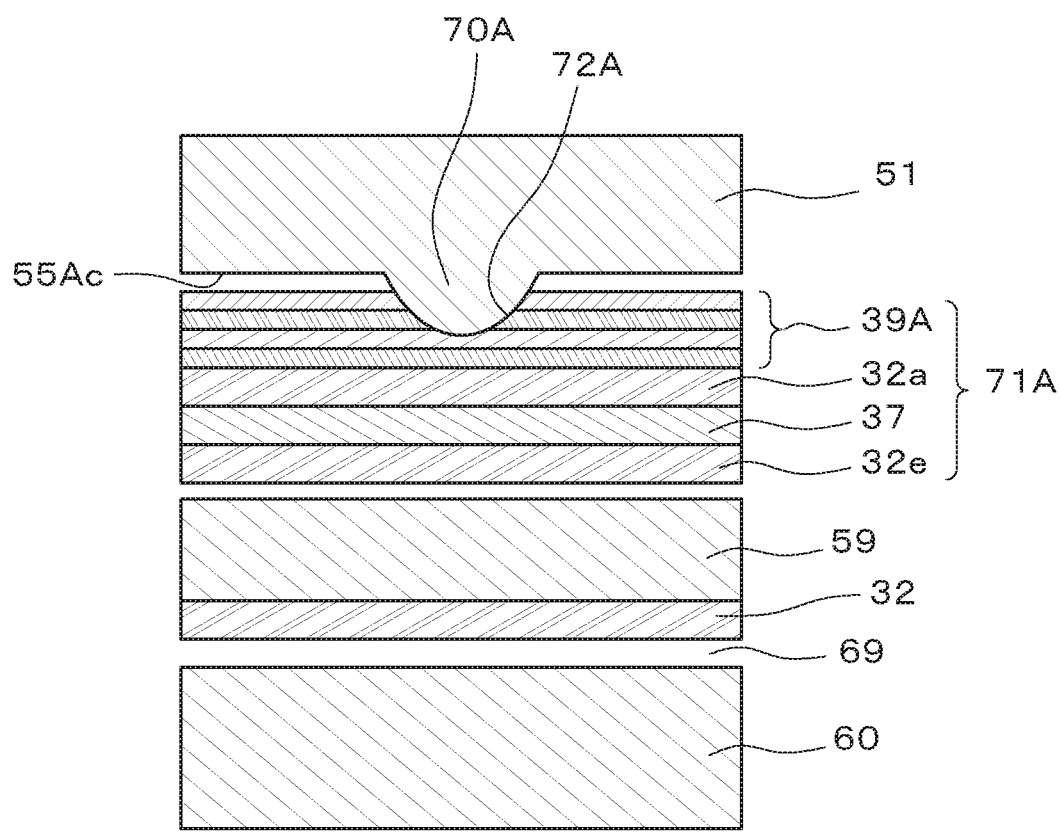
FIG. 29 is a cross-sectional view along D-D in FIG. 28.

In the mounting member 50A in FIGS. 28 and 29, a protrusion 70A for positioning a trim plate 37 with respect to the mounting member 50A is provided near the approximate center of a plane surface 55Ac. As shown in FIG. 28, the protrusion 70A is provided opposite to a portion near the bottom of a groove 53A, and is provided in a position opposite to an end portion of the forward edge portion 12 when the mounting member 50A is attached to the side frame 10. This configuration can increase support stiffness when the mounting member 50A is attached to the side frame 10.

The plane surface 55Ac is a side wall of an engaging portion 55A that a planer surface portion of the trim plate 37 faces, and is formed by a substantially planer surface. When the trim plate 37 is mounted, the plane surface 55Ac is a surface opposite to a plane surface of the trim plate 37 on the opposite side to the slit 69, that is, a surface at the back of the engaging portion 55A when viewed from the slit 69 side.

The trim plate 37 includes a plane surface 37a on the slit 69 side, and a plane surface 37b opposite to the plane surface 55Ac at the back of the engaging portion 55A.

The stay cloth 32 abuts at an end portion 32e on the plane surface 37a on the slit 69 side, passes along the curved surface 55Aa on the deep side further from the slit 69, abuts the plane surface 55Ac at the back, and then passes through the slit 69 from a curved surface 55Ab on the side near the slit 69 and is led to the outside of the mounting member 50A.

Figure 30:
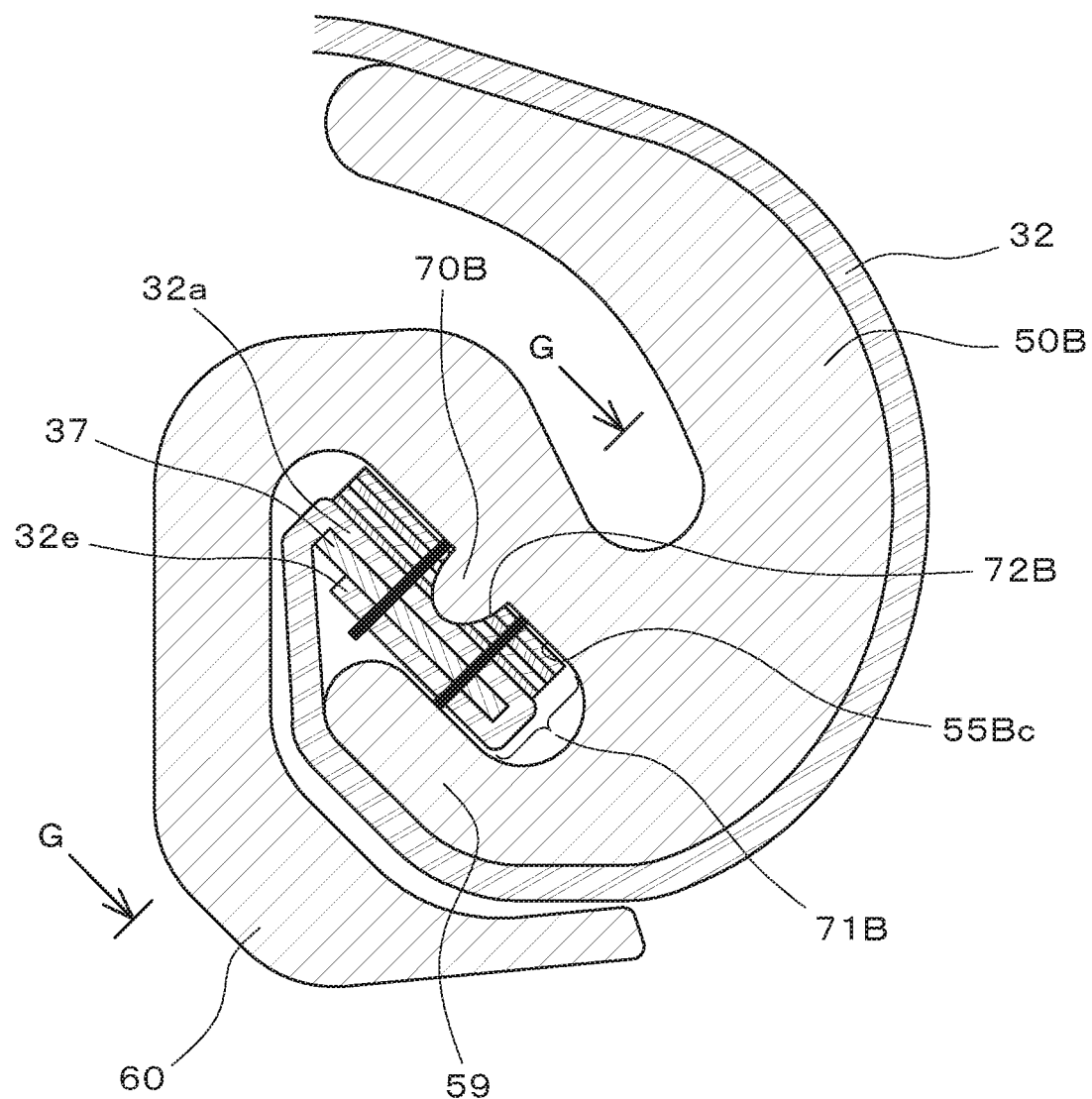
FIG. 30 is an explanatory cross-sectional view diagram illustrating the state of connection between a mounting member and a trim plate according to another modification of embodiment 5 of the present invention.

The end portion 32e of the stay cloth 32 abuts the plane surface 37a of the trim plate 37 on the slit side. The portion 32a of the stay cloth 32 bent back from the plane surface 37a on the slit side abuts the plane surface 37b at the back. On the portion 32a, a cut piece laminated body 39A in which a plurality of stay cloth cut pieces are stacked together is put in layers. A laminated body 71A composed of the end portion 32e, the trim plate 37, the portion 32e of the stay cloth 32, and the cut piece laminated body 39A is sewn together as shown in FIG. 30. The stay cloth cut pieces correspond to sheet-shaped bodies, and the cut piece laminated body 39A corresponds to a sheet-shaped body laminated body.

As shown in FIGS. 28 and 29, the laminated body 71A is provided with a recess 72A in a surface at the back of the engaging portion 55A when viewed from the slit 69 side. The recess 72A is provided in a position near the center of the surface of the stay cloth cut piece laminated body 39A, opposite to the protrusion 70A.

The recess 72A has a depth from the surface of the cut piece laminated body 39A through several pieces of the plurality of stay cloth cut pieces included in the cut piece laminated body 39A. The recess 72A does not reach the portion 32a of the stay cloth 32 and the trim plate 37. The provision of the recess 72A allows the worker to be given a clearer and more perceivable sense of clicking by engagement with the protrusion 70A.

Other components of the mounting member 50A, the trim plate 37, and the stay cloth 32 are similar to those of the mounting member 50, the trim plate 37, and the second stay cloth 32.

Thus, since the protrusion 70A and the recess 72A corresponding to a movement restraining portion are provided, when the laminated body 71A connected to the stay cloth 32 is inserted from the upper end or the lower end of the engaging portion 55A, the protrusion 70A engages with the recess 72A to position the laminated body 71A in the mounting member 50A.

The laminated body 71A, which is formed by stacking stay cloth cut pieces on the stay cloth 32, is not limited to this, and may be formed from soft resin thin sheets or other soft sheets such as cloth, non-woven fabric, felt, or the like, or alternatively, may be formed by winding two or more turns of the stay cloth 32 around the trim plate 37.

In the mounting member 50B in FIGS. 30 and 31, a protrusion 70B for positioning a trim plate 37 with respect to the mounting member 50B, and a recess 72B to be engaged with the protrusion 70B are provided near the approximate center of a plane surface 55Bc and near the center of the surface of a laminated body 71B, respectively.

The configuration of the laminated body 71B is the same as the configuration of the laminated body 71A.

The protrusion 70B is formed higher than the protrusion 70A.

The recess 72B penetrates through a stay cloth cut piece laminated body 39B included in a laminated body 71B and a portion 32a of a second stay cloth, reaching a trim plate 37. Other components of the mounting member 50B and the laminated body 71B are the same as those of the mounting member 50A and the laminated body 71A.

Thus, since the protrusion 70B and the recess 72B corresponding to a movement restraining portion are provided, when the laminated body 71B connected to the stay cloth 32 is inserted from an end portion of an engaging portion 55B, the protrusion 70B engages with the recess 72B to position the laminated body 71B in the mounting member 50B.

In this embodiment, at least one of a wall surface forming a holding space and an end portion side of a guide member has a movement restraining portion for positioning the end portion side of the guide member with respect to the wall surface in an engaging and disengaging direction of the end portion side of the guide member with and from the holding space.

Thus, the end portion of the guide member mounted is prevented from moving in the engaging and disengaging direction in the holding space. Further, positioning of the guide member end portion side in the engaging and disengaging direction becomes possible, facilitating the mounting of the guide member to the mounted portion.

Here, the engaging and disengaging direction is a direction substantially orthogonal to the direction of the tensile force acting on the guide member.

Accordingly, a portion with or from which the guide member is engaged or disengaged is prevented from being weakened by the tensile force acting on the guide member. Further, the end portion of the guide member is prevented from moving in a direction substantially orthogonal to the direction of the tensile force acting on the guide member in the holding space of the mounting member.

The movement restraining portion is formed by a protrusion provided on the wall surface forming the holding space.

Thus, the simple configuration allows the end portion of the guide member to be positioned in the holding space of the mounting member. Further, the stiffness of supporting the end portion of the guide member by the mounting member can be increased.

The movement restraining portion further includes a recess provided in the end portion side of the guide member. The recess may be provided in a position opposite to the protrusion when the end portion side of the guide member is mounted in the holding space.

Accordingly, the end portion of the guide member can be positioned in the holding space of the mounting member. Further, since the recess is provided in a position opposite to the protrusion when the end portion side of the guide member is mounted in the holding space, when the end portion side of the guide member is mounted in the holding space, the engagement between the protrusion and the recess can provide a sense of clicking, and can provide a sign that the end portion side of the guide member is set in a predetermined position, thus improving workability.

The holding space has an opening extending from the upper end to the lower end of the mounting member. A slit extending to an outside surface of the mounting member is provided along a side wall of the holding space, and the protrusion is provided on a side wall of the holding space in a position near the slit.

The end portion of the guide member in the holding space is subjected to the tensile force from the deep side of the holding space toward the slit. Since the protrusion is provided in a position near the slit, the end portion of the guide member is pressed against the protrusion by the tensile force acting on the guide member so that an effect of restricting the vertical movement of the end portion of the guide member can be more securely obtained.

Further, the protrusion presses the end portion of the guide member from the position near the slit to the side further from the slit in the holding space, an effect of preventing the end portion of the guide member from coming out from the holding space can also be obtained.

In the holding space, a plate to which the end portion side of the guide member is mounted is held. In the holding space, a soft sheet-shaped body is held between the side wall of the holding space and the plate. The movement restraining portion includes a protrusion provided on the side wall and a recess provided in the sheet-shaped body. The recess is provided in the position opposite to the protrusion when the plate is mounted in the holding space.

Thus, the softness of the sheet-shaped body held between the side wall and the plate facilitates movement of the plate to reach the position at which the protrusion engages the recess, and at the same time facilitates the engagement when the plate reaches the position at which the protrusion engages the recess, improving the mountability of the plate into the mounting member.

The sheet-shaped body is made by a sheet-shaped body laminated body in which a plurality of sheet-shaped bodies are stacked on one surface of the plate. The recess penetrates all the sheet-shaped bodies constituting the sheet-shaped body laminated body, reaching the plate.

The end portion side of the guide member is sewn to the plate. The protrusion is provided in a position not facing portions where the plate and the end portion are sewn together. The protrusion is provided on a surface that is subjected to the tensile load acting on the guide member accompanying the deployment of the airbag.

Thus, the provision of the soft sheet-shaped body laminated body on the one surface of the plate facilitates movement of the plate to reach the position at which the protrusion engages the recess, and at the same time, facilitates engagement when the plate reaches the position at which the protrusion engages the recess, improving the mountability of the plate into the mounting member. Further, the selection of the number of sheet-shaped bodies constituting the sheet-shaped body laminated body can facilitate setting of the state of engagement between the protrusion and the recess, realizing a movement restraining portion in an appropriately engaged state.

Further, the recess reaching the plate as well as the sheet-shaped body laminated body allows for positioning of the plate itself in the mounting member, more strongly restraining the movement of the plate and the end portion of the guide member in an up and down direction.

Embodiment 6

A sixth embodiment of the present invention will be described with reference to FIGS. 32 to 35.

A stay cloth mounting member 150 according to embodiment 6 is attached to a seat that includes a side frame extending along a side portion of the seat, an upper frame connected to at least an upper portion of the side frame, the airbag module mounted to the side frame, a trim cover of the seat, and a stay cloth with one end portion attached to a tearing portion of the trim cover to be able to enclose the airbag module and separate end portions of the trim cover when an airbag is deployed. The upper frame is provided with an annular portion formed in a substantially annular shape in cross section.

A mounting member is connected to the other end of the stay cloth. The mounting member is attached to the annular portion of the upper frame.

Figure 33:
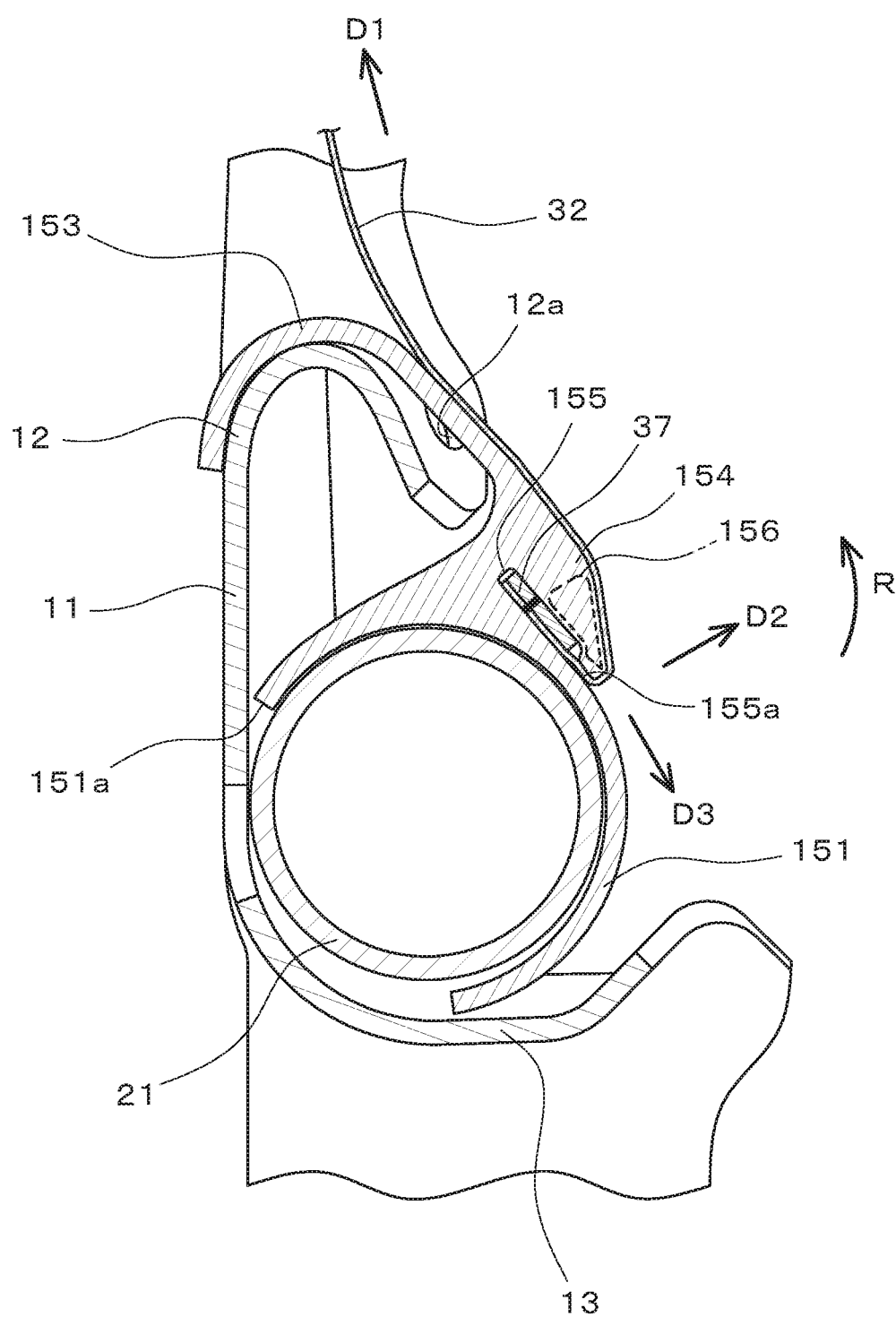
FIG. 33 is a cross-sectional explanatory diagram illustrating a stay cloth connected to a side frame via a mounting member according to embodiment 6 of the present invention.
Figure 34:
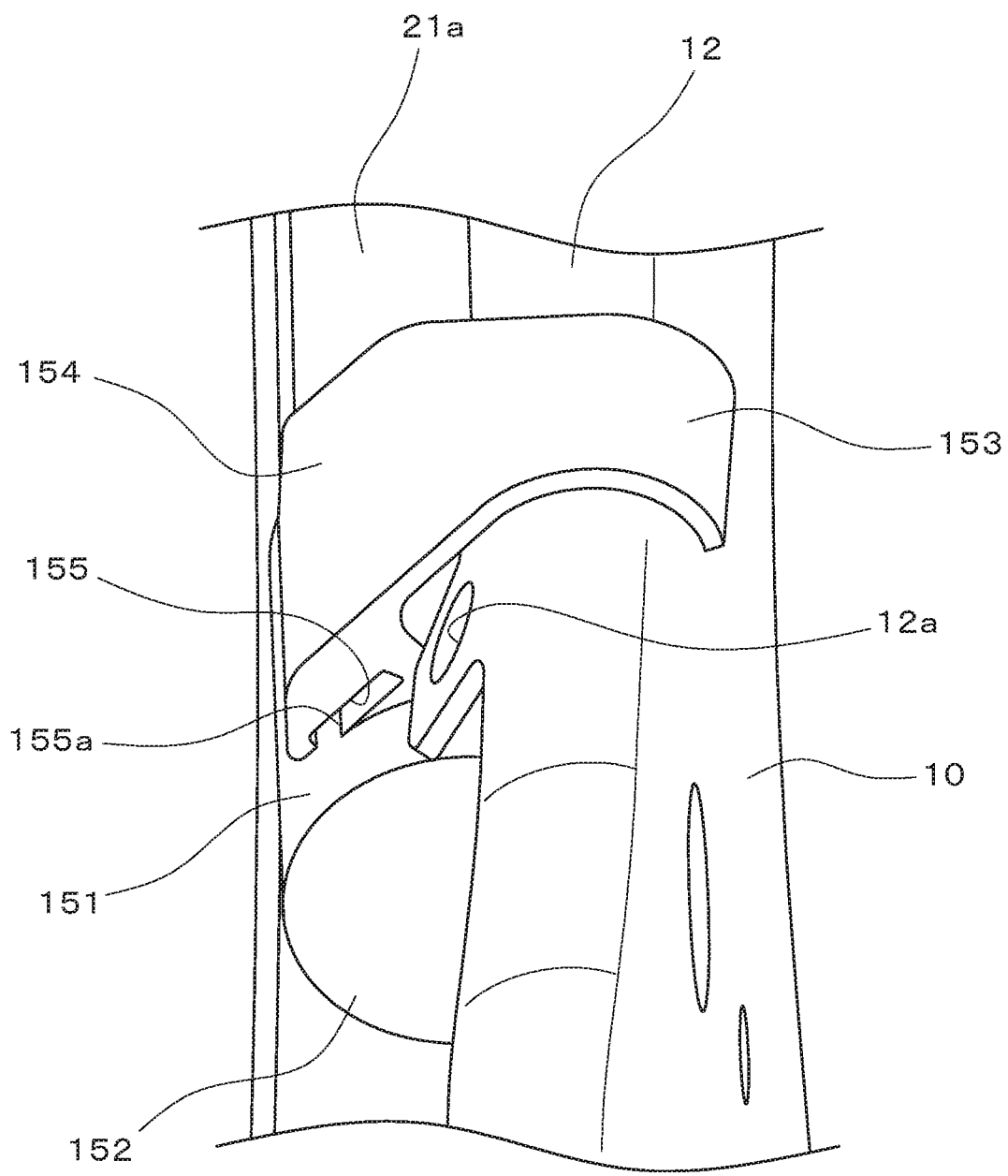
FIG. 34 is a perspective view showing the mounting member mounted to the side frame according to embodiment 6 of the present invention.

The stay cloth mounting member 150 is integrally molded from hard resin, and as shown in FIGS. 33 and 34, includes an upper frame connecting portion 151 in a C shape in cross section fitted on the periphery of an extended portion 21a of the upper frame 21, a lid 152 closing an end portion 21b of the upper frame 21, a side frame connecting portion 153 formed in such a manner as to rise from an outer surface of the upper frame connecting portion 151 and engage with an outer surface of a forward edge portion 12, a connecting portion 154 for connecting the side frame connecting portion 153 to the upper frame connecting portion 151, and an engaging portion 155 provided at the connecting portion 154, with which a trim plate 37 is engaged.

As shown in FIGS. 33 and 34, the upper frame connecting portion 151 has a generally tubular body in a C shape in cross section with an opening 151a extending in an axial direction, and is formed such that the shape of the inner surface and the thickness are axially uniform. The inner surface shape is substantially the same as the shape of the outer surface of the upper frame 21, and is formed slightly larger in diameter than the outer surface of the upper frame 21.

One end of the upper frame connecting portion 151 in the axial direction is closed by the lid 152 having a plane perpendicular to the axial direction. The lid 152 is continuous from the upper frame connecting portion 151, and is formed as a circular plate covering and concealing the end portion 21b of the upper frame 21.

The connecting portion 154 is bulgingly formed to rise on an outer surface of the upper frame connecting portion 151 on the opposite side to the opening 151a. The side frame connecting portion 153 is formed on the opposite side to the upper frame connecting portion 151 with the connecting portion 154 therebetween. The side frame connecting portion 153 is made from a curved plate, and is formed in a shape with an inner surface thereof generally conforming to an outer surface of an end portion of the forward edge portion 12, engagable with the end portion of the forward edge portion 12.

A groove-shaped engaging portion 155 for engaging the trim plate 37 is formed in the connecting portion 154 between the side frame connecting portion 153 and the upper frame connecting portion 151.

The engaging portion 155 has an opening 155a into which the trim plate 37 is inserted, formed in the connecting portion 154 to face the opposite side to the side frame connecting portion 153.

Accordingly, when the trim plate 37 to which the second stay cloth 32 is connected is inserted from the opening 155a and engaged with the engaging portion 155, the second stay cloth 32 is bent in a generally U shape at the opening 155a.

A portion from the engaging portion 155 through the tensile force absorbing portion 156 to the side frame connecting portion 153 is covered by the second stay cloth 32 as shown in FIG. 33. When the airbag is not deployed or is being inflated for deployment, the second stay cloth 32 is subjected to the tensile force in an arrow D1 direction that is a direction toward a tearing portion 40 from a portion in contact with the tensile force absorbing portion 156.

The stay cloth mounting member 150 is made from a hard resin, and thus the tensile force absorbing portion 156 has some elasticity, and when subjected to a pressure from outside, contracts inward. Consequently, the tensile force in the arrow D1 direction is weakened by the tensile force absorbing portion 156 contracting inward at a location where the second stay cloth 32 is bent in the extension direction on the outer surface of the tensile force absorbing portion 156.

Accordingly, as compared with the case where the second stay cloth 32 extends in an arrow D3 direction in FIG. 33, when the second stay cloth 32 extends in the directions of arrows D1 and D2, the tensile force acting on the second stay cloth 32 is weakened at the tensile force absorbing portion 156, and as a result, a torque R generated at the engaging portion 155 where the second stay cloth 32 is connected to the stay cloth mounting member 150 is reduced.

The second stay cloth 32 engaged like this is disposed as shown in FIG. 20.

Figure 35:
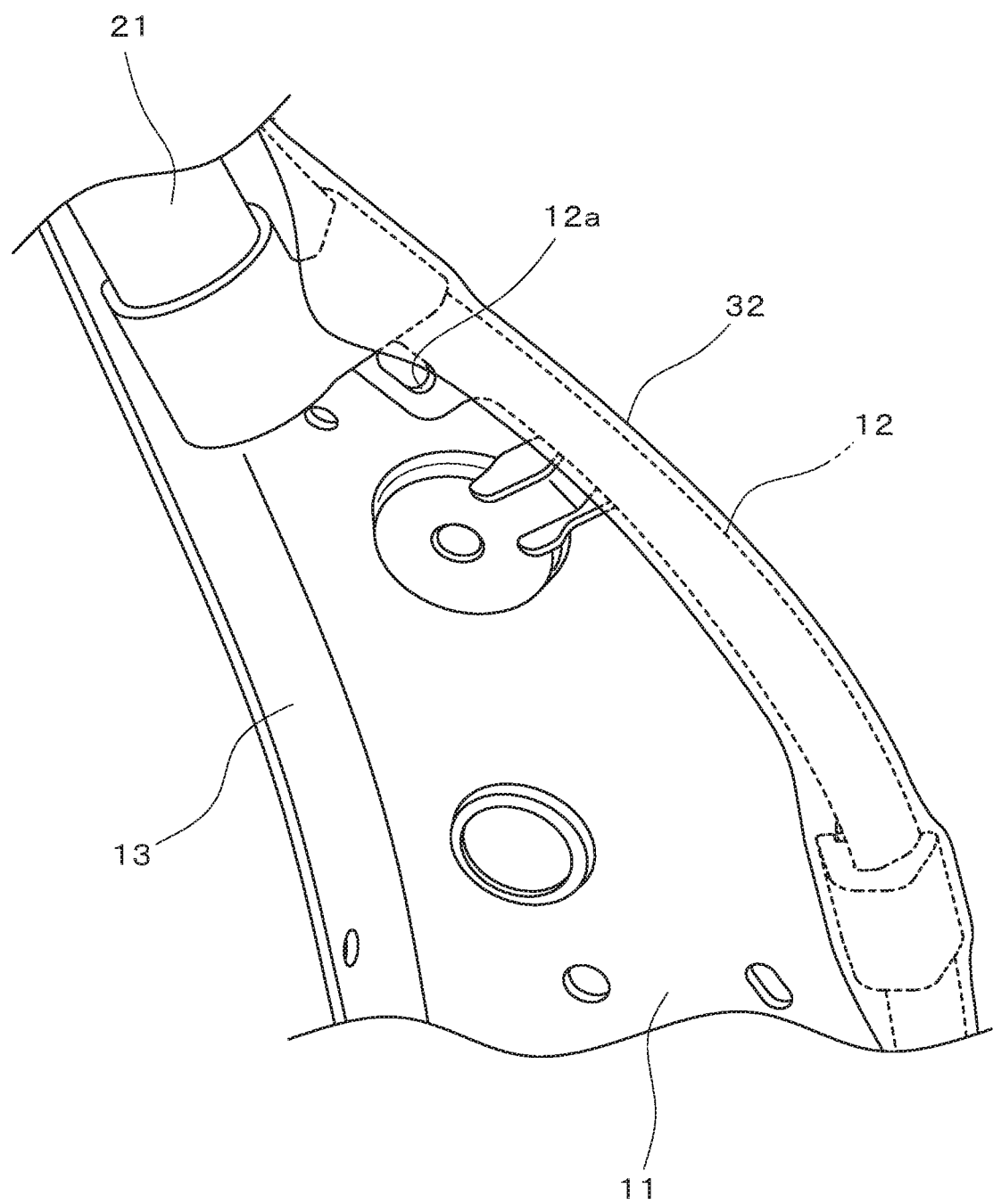
FIG. 35 is a perspective view showing the stay cloth connected to the side frame via the mounting member according to embodiment 6 of the present invention.
Figure 36:
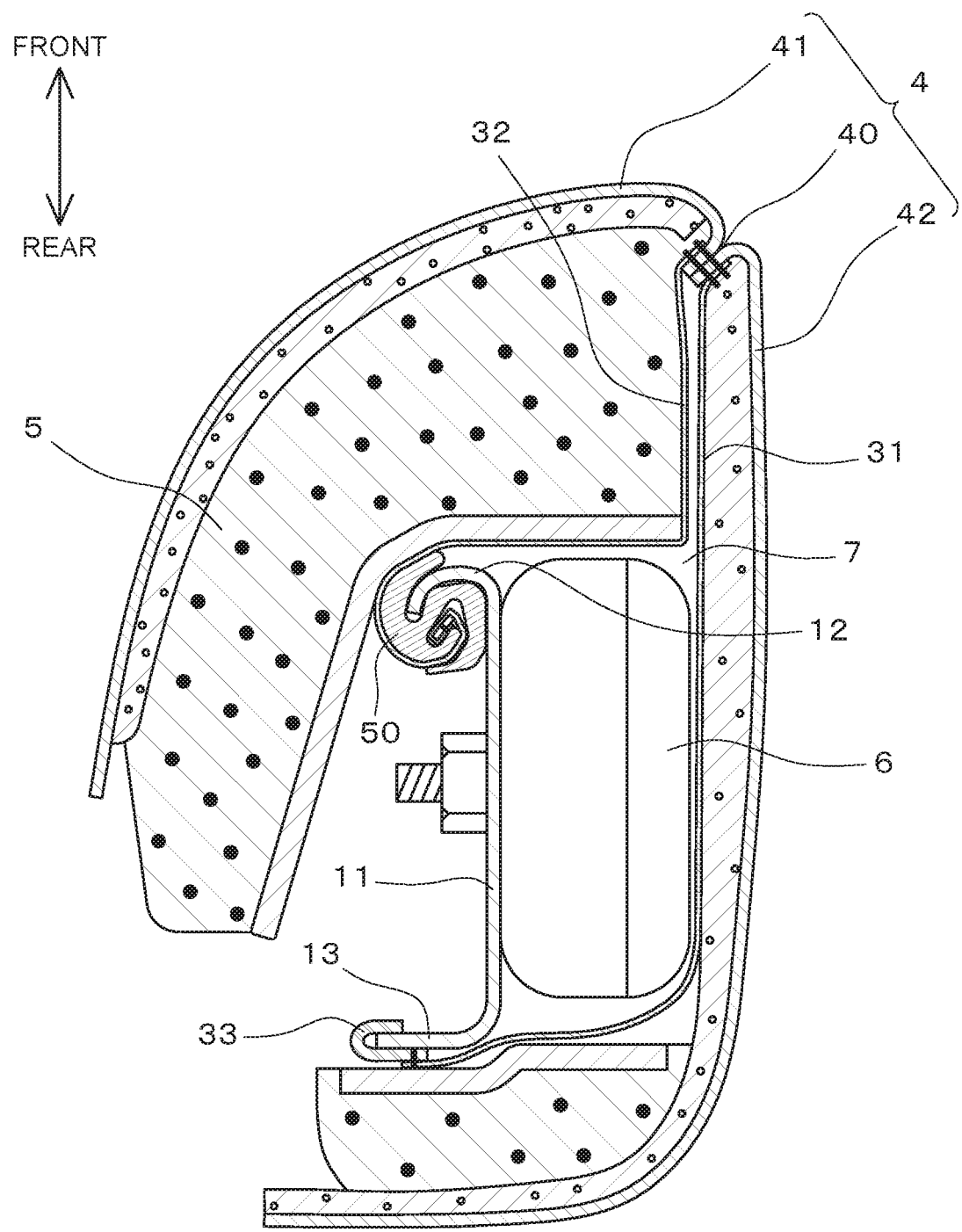
FIG. 36 is a cross-sectional view along A-A in FIG. 1.

As shown in FIGS. 33 to 35, the end portion 21b of the upper frame 21 is located slightly above a spring engaging hole 12a. The stay cloth mounting member 150 is attached to the end portion of the upper frame 21. Thus, the stay cloth mounting member 150 in this embodiment does not cover the spring engaging hole 12a and a lower connecting member 80, and allows the second stay cloth 32 to be mounted without interfering with the movement of a pressure receiving member 20.

A process for mounting the stay cloth mounting member 150 in this embodiment will be described.

First, the upper frame connecting portion 151 of the stay cloth mounting member 150 is put on and pressed against the outer wall of the extended portion 21a of the upper frame 21 to be fitted on the extended portion 21a. Then, the stay cloth mounting member 150 is slid along the longitudinal direction of the upper frame 21 to engage the lid 152 with the end portion 21b of the upper frame 21. Thereafter, the stay cloth mounting member 150 is rotated about the upper frame 21 to engage the side frame connecting portion 153 with the outer surface of the forward edge portion 12 of the side frame 10. Thereafter, the end portion of the second stay cloth 32 is inserted together with the trim plate 37 into the engaging portion 155 to engage the trim plate 37 with the engaging portion 155, completing the connection between the second stay cloth 32, the upper frame 21, and the side frame 10 using the stay cloth mounting member 150.

In this embodiment, the upper frame 21 is formed from a cylindrical body that is circular in cross section so that the stay cloth mounting member 150 can be rotated about the upper frame 21 when the stay cloth mounting member 150 is mounted.

In this embodiment, an upper frame includes an extended portion extended along the longitudinal direction of a side frame. An annular portion is formed at the extended portion. A mounting member includes a frame fitting portion having a shape that can be fitted on an outer surface of the annular portion.

Accordingly, only by fitting the frame fitting portion on the upper frame, the mounting member can be attached, resulting in facilitated mounting. Further, since the mounting member is attached to the annular portion at the extended portion, a mounting portion can be formed compact as compared with the case where it is attached to a place other than the extended portion of the upper frame.

When a mounting member is inserted into an upper frame, it is necessary to form a notch at the upper frame for letting a stay cloth to extend. This configuration allows the mounting member to be attached to cover the exterior of the upper frame, eliminating the need to form a notch for letting a stay cloth to extend, and simplifying the mounting structure. Further, the frame fitting portion pivots around the upper frame by pulling the mounting member by hand, facilitating the attachment and removal of the mounting member.

The mounting member includes a stay cloth connecting portion for connecting the stay cloth and an extension portion extending in a direction in which the stay cloth extends. The stay cloth connecting portion is provided closer to the frame fitting portion than the extension portion.

Thus, when the stay cloth is connected to the side frame side with the mounting member, the extension portion is present between a member such as a side frame and the stay cloth, and thus can prevent a direct contact between a member such as the side frame and the stay cloth, and can prevent damage to the stay cloth.

One edge of the side frame has an inclined portion inclined with respect to the extended portion. The extension portion is attached to the inclined portion.

Therefore, by setting the shape of the mounting member in accordance with the distance between the upper frame and the inclined portion and the degree of inclination, the mounting member can be mounted only in a set position appropriate for the distance and the degree of inclination. Thus the positioning of the mounting member is facilitated, and the attachment position of the extension portion can be restricted without an additional component.

The upper frame has an end portion between the upper end and the lower end of the side frame. The frame fitting portion has a lid to be fitted to cover the end portion of the upper frame.

Thus, since the frame fitting portion is engaged at the lid with the end portion of the upper frame, the frame fitting portion can be positioned with respect to the longitudinal direction of the upper frame, and the mounting member can be prevented from moving from the end portion side of the upper frame toward the extension direction of the upper frame.

An end portion of the extension portion opposite to the upper frame end portion is provided closer to the upper frame end portion than an end portion of the frame fitting portion opposite to the upper fame end portion.

Accordingly, after the frame fitting portion is engaged with the end portion of the upper frame, operability in pivoting the entire mounting member around the upper frame and disposing it in an appropriate position is improved. The frame fitting portion of the mounting member can be fitted into the back of a space between the side frame and the upper frame.

In the '270 Document, as a conventional technique, the side frame is often formed in a generally plate-shaped body in a D shape or the like wider downward from the upper end to extend forward of the seat. Therefore, in a configuration in which stay cloths are mounted to a side frame using listing wires as in the '270 Document, a complicated structure such as bending the listing wires in a hook shape in conformity with the shape of the place where the width of the side frame changes is required to prevent the stay cloths from loosening or tightening. This embodiment can provide an airbag module-equipped seat and a mounting member that allow for mounting of stay cloths to a place where the width of a side frame changes without causing tensioning and loosening with a simple configuration.

Embodiment 7

A seventh embodiment of the present invention will be described with reference to FIGS. 2, 20, and 36 to 42. Components similar to those in embodiment 1 will not be described.

Figure 37:
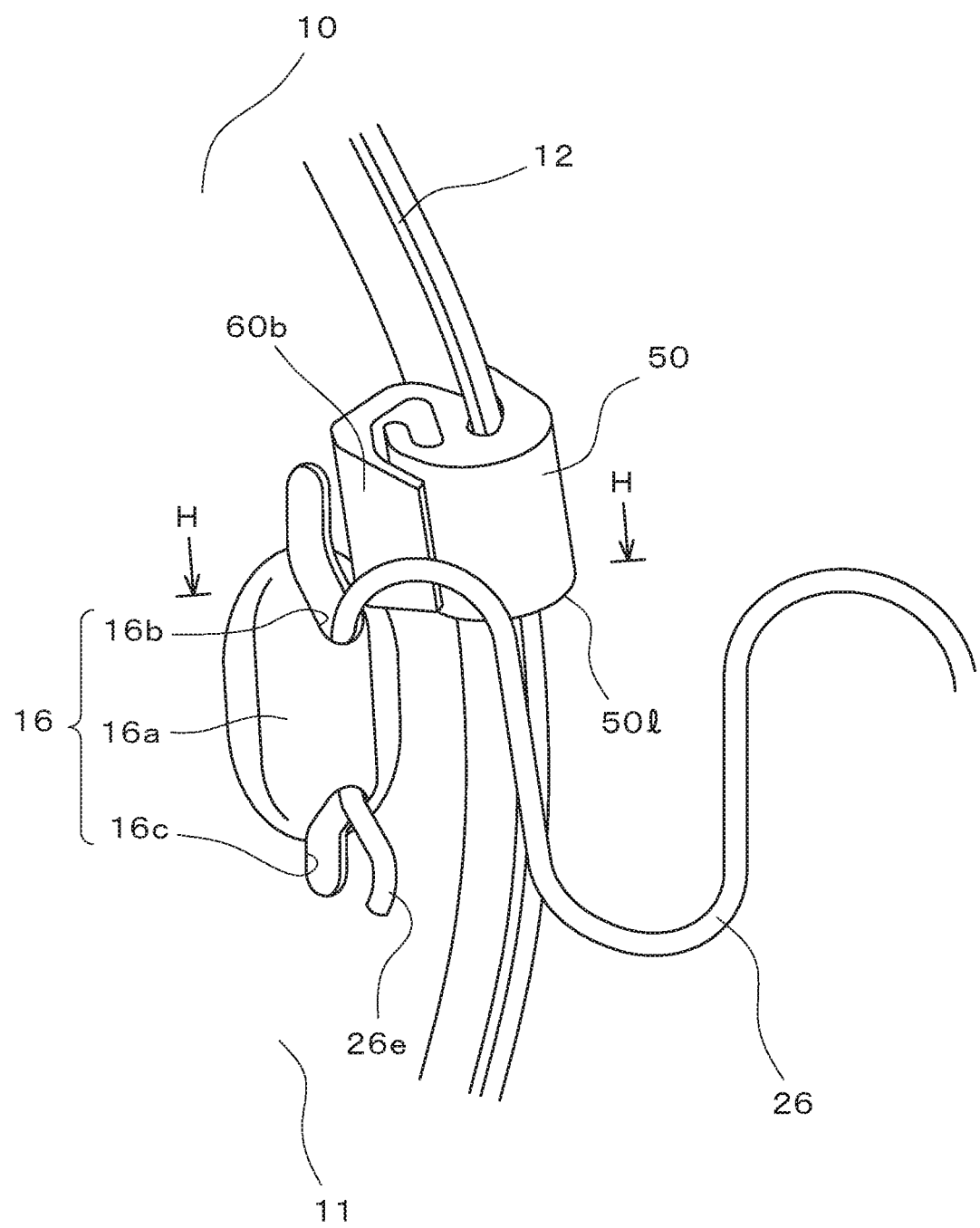
FIG. 37 is an explanatory perspective view diagram illustrating a mounting member mounted to a seat back frame according to embodiment 7 of the present invention.

As shown in FIG. 20, a pair of side frames 10 in this embodiment is provided with engaging portions 15, 16 in an upper position closer to a rear edge portion 13 and in a position lower than the center and closer to a forward edge portion 12, respectively. As shown in FIG. 37, the engaging portion 16 is composed of a curved portion 16*a* formed to protrude toward the inside of a vehicle seat S by drawing, and holes 16*b*, 16*c* provided to extend in an up and down direction above and below the curved portion 16*a*. The engaging portion 15 is configured the same as the engaging portion 16.

As shown in FIG. 20, hung-across members 25, 26 made from S springs formed from steel wire rods having flexibility are hung across the pair of side frames 10. As shown in FIGS. 20 and 37, the hung-across members 25, 26 are engaged at respective end portions 25*e*, 26*e* with the engaging portions 15, 16.

The hung-across members 25, 26 are not limited to S springs. Any members, such as plate springs, having a structure that can support an occupant from the rear can be used.

Figure 38:
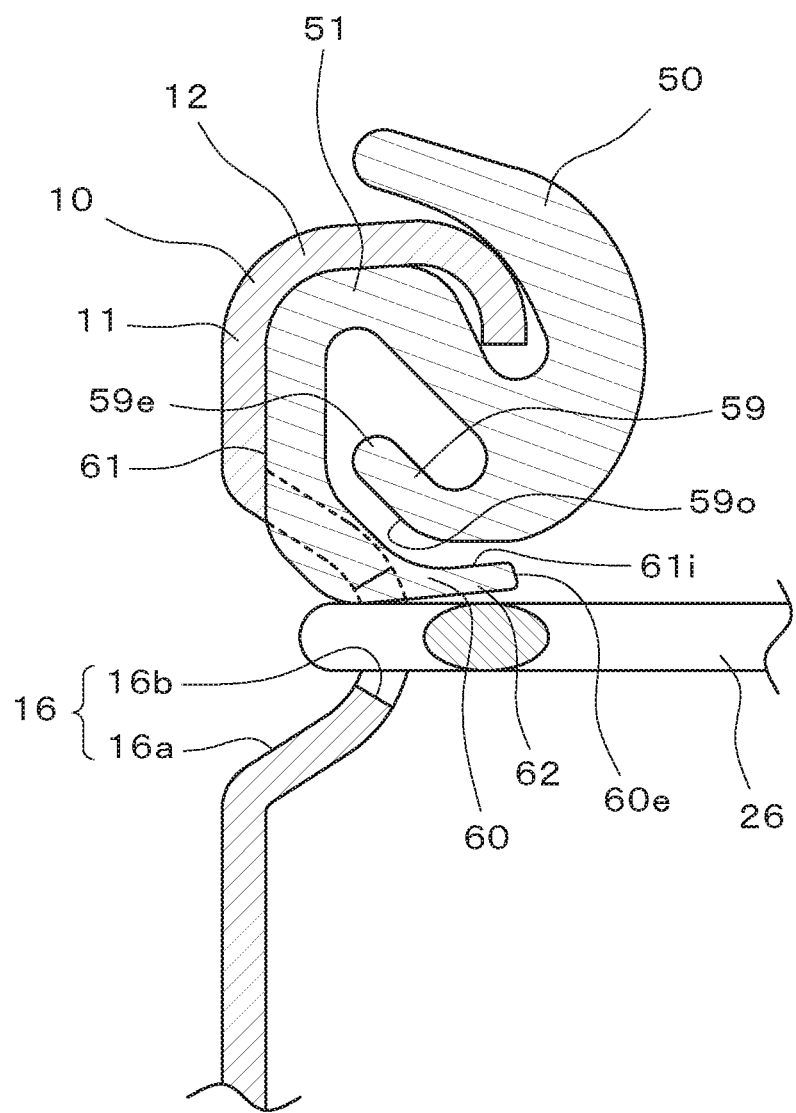
FIG. 38 is a cross-sectional view along H-H in FIG. 37.

As shown in FIGS. 37 and 38, the mounting member 50 in this embodiment is disposed above the engaging portion 16. The engaging portion 16 corresponds to a position restricting portion. A lower end surface 50*l* of the mounting member 50 is placed on the curved portion 16*a* of the engaging portion 16, and is supported by a portion of the curved portion 16*a* protruded inward from a surface of the side frame 10 on the inside of the vehicle seat S. Thus, since the mounting member 50 is placed on the engaging portion 16, the mounting member 50 is prevented from moving downward, and the stay close can be prevented from leaning downward by gravity. A rising portion 62 of the mounting member 50 abuts the hung-across member 26. A portion of the mounting member 50 from a wide portion 51 to a second wall 60 is biased toward and pressed against the forward edge portion 12 by the hung-across member 26.

In this embodiment, the mounting member 50 is disposed above the engaging portion 16 engaging the hung-across member 26, but is not limited to this. In another example, as shown in FIG. 2, in a vehicle seat S in which a pressure receiving member 20 made from a plate-shaped resin is disposed between right and left side frames 10, the mounting member 50 may be disposed above an extended-out portion 12*b* of a forward edge portion 12 provided with a spring engaging hole 12*a* for connecting the pressure receiving member 20 to the right and left side frames 10 to abut an upper end of the extended-out portion 12b, and the extended-out portion 12b may be used as a position restricting portion.

In this embodiment, the mounting member 50 and the side frame 10 are used as a mounting member and a side frame. Alternatively, they may be configured as mounting members 50A to 50B and side frames 10A to 10C shown in FIGS. 39 to 42.

Figure 39:
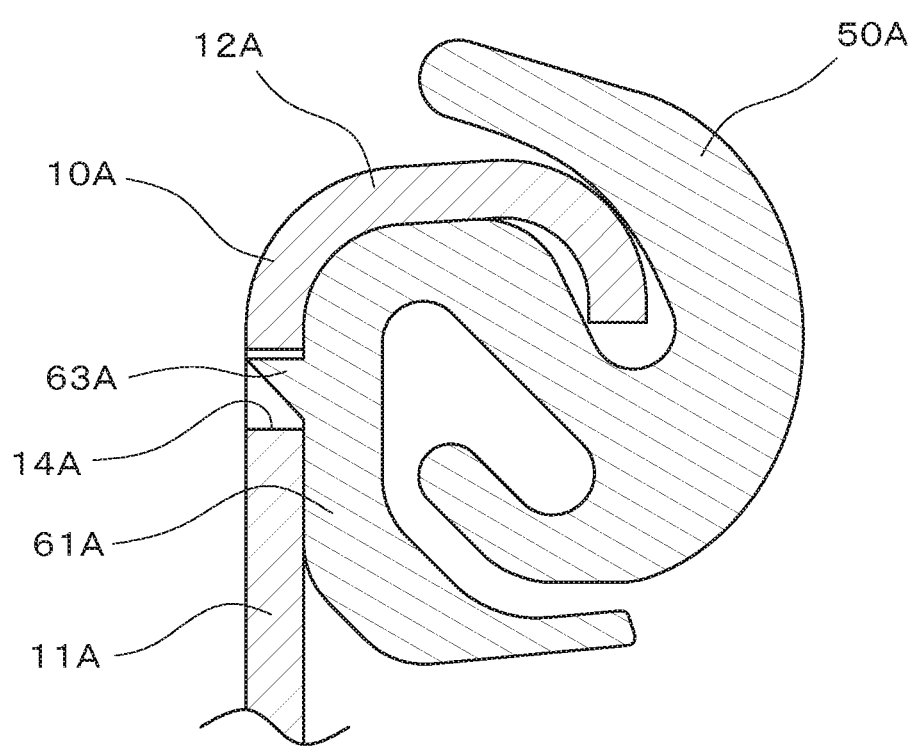
FIG. 39 is an explanatory cross-sectional view diagram illustrating a mounting member mounted to a seat back frame according to another modification of embodiment 7 of the present invention.

The member 50A shown in FIG. 39 has a protrusion 63A formed at an abutting portion 61A and erected from an outer surface of the abutting portion 61A. The protrusion 63A is formed in a tapered shape to be thinner from the abutting portion 61A toward the distal end.

In the side frame 10A, a hole 14A in a rectangular, circular, oval, or some other shape is formed at a place on which the protrusion 63A abuts when the mounting member 50A is attached to the side frame 10A. This provides a configuration which allows the mounting member 50A to be positioned in vertical and horizontal directions with respect to the side frame 10A by the protrusion 63A engaging with the hole 14A when the mounting member 50A is attached to the side frame 10A.

When the mounting member 50A is attached to the side frame 10A, the mounting member 50A is pressed into the forward edge portion 12A. With this configuration, the protrusion 63A engaging with the hole 14A gives a sense of clicking to a worker.

Figure 40:
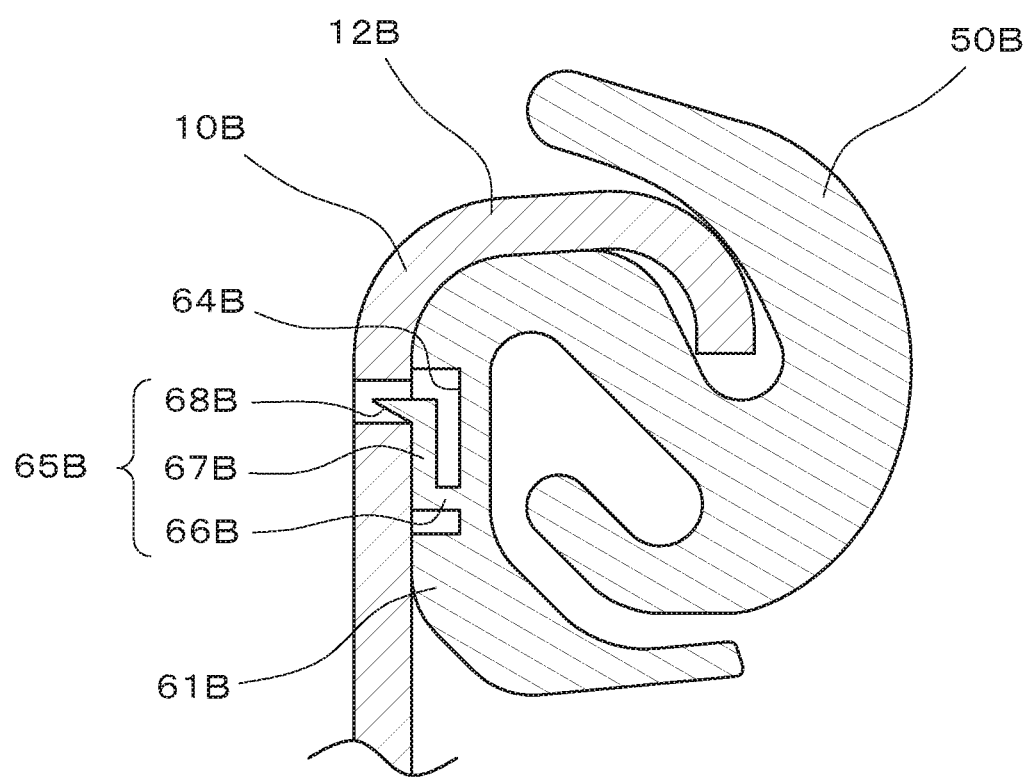
FIG. 40 is an explanatory cross-sectional view diagram illustrating a mounting member mounted to a seat back frame according to still another modification of embodiment 7 of the present invention.
Figure 41:
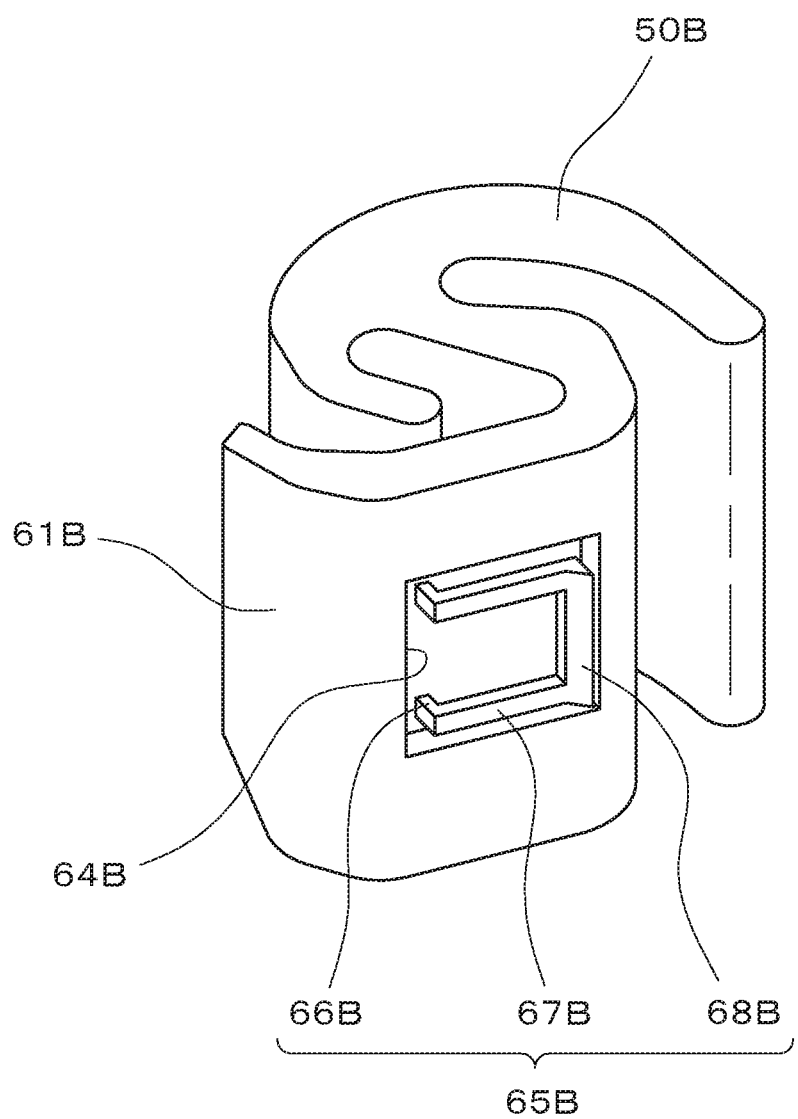
FIG. 41 is an explanatory perspective view diagram of the mounting member in FIG. 40.

A mounting member 50B shown in FIGS. 40 and 41 has, at an abutting portion 61B, a recess 64B formed by cutting an outer surface of the abutting portion 61B in a rectangular shape, and a locking piece 65B in an inverted C shape (generally U shape) in a plan view and in an L shape in a side view, raised from the recess 64B.

As shown in FIG. 41, the locking piece 65B includes a pair of legs 66B erected perpendicularly from the bottom surface of the recess 64B, a pair of biased portions 67B bent perpendicularly from the distal ends of the legs 66B and extending along the surface of the abutting portion 61B, and a locking portion 68B connecting the pair of biased portions 67B to each other at the ends of the biased portions 67B opposite to the legs 66B. The locking portion 68B is configured such that the end thereof opposite to the biased portions 67B protrudes from the surface of the abutting portion 61B.

The locking piece 65B has a generally L shape in a side view erected from the bottom surface of the recess 64B. The locking piece 65B is fixed at only one end of the biased portions 67B to the bottom surface of the recess 64B at the legs 66B, and has a free end at the engaging portion 68B at the other end. Thus the engaging portion 68B has elasticity in a direction substantially perpendicular to the outer surface of the abutting portion 61B.

In the side frame 10B, a hole 14B in a rectangular, circular, oval, or some other shape is formed at a place on which the locking portion 68B abuts when the mounting member 50B is attached to the side frame 10B. This provides a configuration in which, during attachment of the mounting member 50B to the side frame 10B, when the locking portion 68B abuts a side plate 11B, the biased portions 67B are biased toward the recess 64B, and when the locking portion 68B reaches the hole 14B, the locking portion 68B engages with the hole 14B, allowing the mounting member 50B to be positioned in vertical and horizontal directions with respect to the side frame 10B.

The mounting member 50B is configured such that when attached to the side frame 10B, the mounting member 50B is pressed into the forward edge portion 12B, and when the locking portion 68B engages with the hole 14B, a worker is given a sense of clicking.

Figure 42:
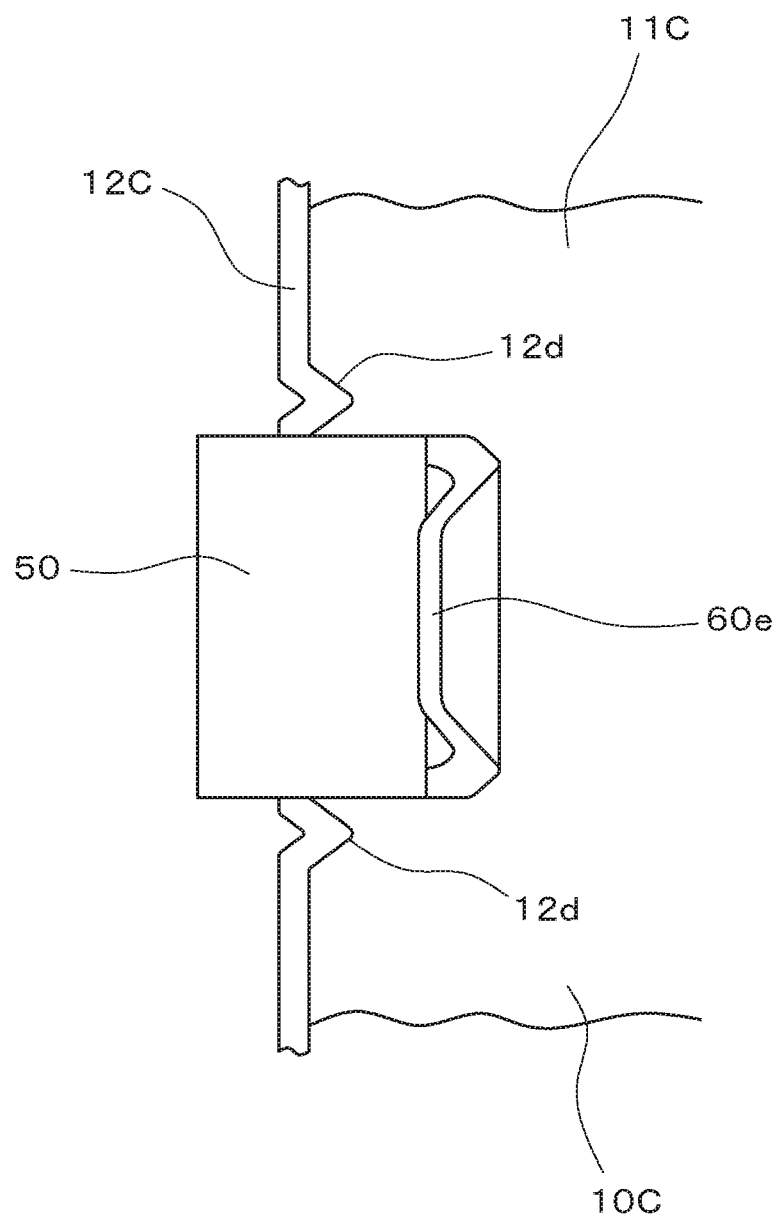
FIG. 42 is an explanatory perspective view diagram illustrating a side frame according to a modification of embodiment 7 of the present invention.

A side frame 10C shown in FIG. 42 is provided with a pair of protrusions 12d in a generally V shape in cross section at an edge of a forward edge portion 12C at two places above and below a position in which a mounting member 50 is provided. The protrusions 12d are formed by hitting the edge of the forward edge portion 12C with a sharp tool. The pair of protrusions 12d act as a movement restricting member for restricting the movement of the mounting member 50 in a vehicle seat S up and down direction.

In this embodiment, a position restricting portion for restricting the movement of a mounting member along an up and down direction of a side frame is provided to at least one of the side frame and the mounting member.

Accordingly, when a stay cloth is connected to the mounting member and is attached together with the mounting member to the side frame, the positioning of the mounting member in the seat up and down direction becomes possible, and mounting of the stay cloth to the side frame side is facilitated. Further, the mounting member attached can be prevented from moving in the seat up and down direction by gravity.

The position restricting portion is formed by a protrusion provided at one of the side frame and the mounting member, and a hole to engage with the protrusion provided at the other of the side frame and the mounting member.

Thus, the protrusion acts as a guide when the stay cloth and the mounting member are mounted, facilitating the mounting. Further, when the protrusion engages with the recess, the worker can feel a sense of clicking that the protrusion is fitted into the recess on hand, and thus can easily know that the mounting member is disposed in an appropriate position.

The side frame includes a side plate in a substantially planar plate and an edge portion formed by bending an end portion of the side plate in the seat front to back direction. The hole to be engaged with the protrusion is provided in the side wall.

Thus, since the hole is provided in the side plate, it is not necessary to perform bending for forming the edge portion after boring, as is the case where a hole is provided in the edge portion, and the hole can be disposed in a precise position.

The side frame includes the forward edge portion formed by bending an end portion of the side plate at the front of the seat. A groove in the mounting member is engaged with the forward edge portion. The position restricting portion is formed by the protrusion provided below the place at the end portion of the forward edge portion with which the mounting member engages.

Accordingly, without providing a protrusion, a recess, or the like, at the mounting member, only providing the protrusion at the side frame allows for positioning of the mounting member in a seat downward direction.

The side frame includes the forward edge portion formed by bending the end portion of the side plate at the front of the seat. The groove of the mounting member is engaged with the forward edge portion. The position restricting portion is formed by protrusions provided above and below the place at the end portion of the forward edge portion with which the mounting member engages.

Accordingly, without providing a protrusion, a recess, or the like, at the mounting member, only providing the protrusions at the side frame allows for positioning of the mounting member in a seat up and down direction.

The position restricting portion is formed by a different member attached to the side frame or a different member mounting portion provided at the side frame for mounting a different member.

Accordingly, an existing different member or different member mounting portion can be utilized to constitute the position restricting portion, and man-hours to manufacture the mounting member and the side frame can be reduced.

The position restricting portion is formed by a different member mounting portion provided at the side frame for mounting a different member to the side frame. The different member abuts a surface of the mounting member on the opposite side to the forward edge portion.

Thus, the different member mounting portion can allow the mounting member to be positioned in the up and down direction, and at the same time, using the different member mounted to the different member mounting portion allows the mounting member to be positioned in the seat front to back direction.

In the conventional technique, in the '659 Document, a structure for positioning the hooks in the up and down direction is not included. Thus it has been desired to include an up and down direction positioning mechanism for the hooks hooked on the hooking pins. Further, since a mechanism for positioning the hooks in the up and down direction is not included, it provides no signal as an indication from which to know whether the hooks are disposed in appropriate positions when hooked on the hooking pins. Thus, improvement in mounting workability has been desired. This embodiment can provide an airbag module-equipped seat in which a mounting member for mounting a stay cloth to a seat back frame is positioned in an up and down direction with respect to the seat back frame side.

Further, by providing a guide that allows for immediate feedback that the mounting member is disposed in an appropriate position at the seat back frame during mounting, an airbag module-equipped seat improved in workability in mounting the stay cloth to the seat back frame can be provided.

Embodiment 8

An eighth embodiment of the present invention will be described with reference to FIGS. 43 to 51. Components similar to those in embodiment 1 will not be described.

In a mounting member 50 in this embodiment, an engaging portion 55 for holding a trim plate 37 inside is disposed in an area surrounded by a forward edge portion 12 and a side plate 11 of a side frame 10. Thus when the trim plate 37 is subjected to the tensile force from a stay cloth 32, an outer wall surface of a wide portion 51 of the mounting member 50 is supported by a wall surface of the forward edge portion 12 and the side plate 11, which prevents the mounting member 50 from rotating in an E direction in FIG. 23.

Figure 44:
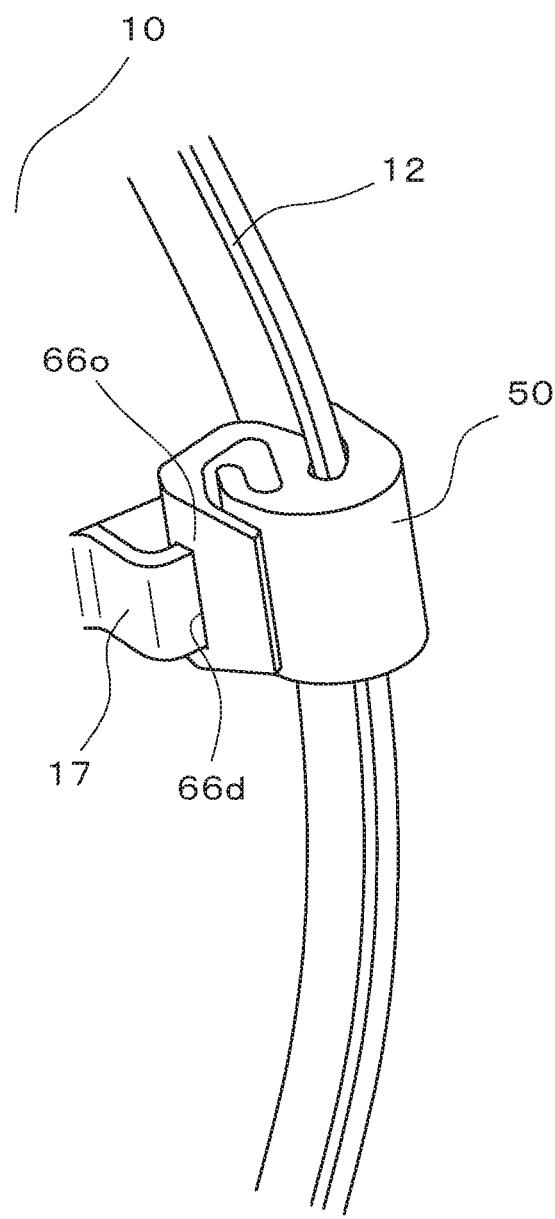
FIG. 44 is an explanatory perspective view diagram illustrating a cut and raised portion abutting a mounting member according to embodiment 8 of the present invention.
Figure 45:
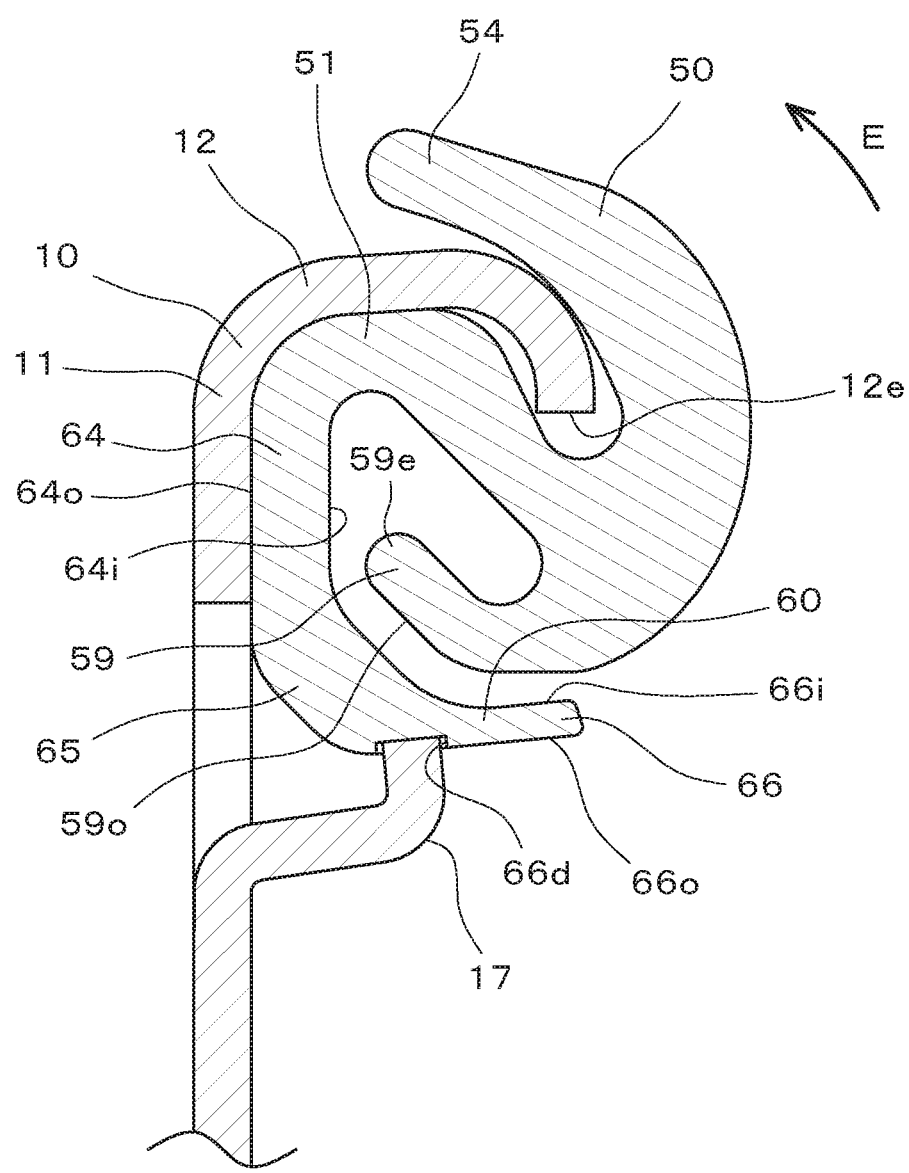
FIG. 45 is an explanatory cross-sectional view diagram illustrating the cut and raised portion abutting the mounting member according to embodiment 8 of the present invention.

As shown in FIGS. 44 and 45, a recess 66d is formed in an outer wall surface 66o of a third extension portion 66 in a place on which a distal end of a cut and raised portion 17 formed at the side plate 11 of the side frame 10 abuts.

The mounting member 50, with the trim plate 37 to which the stay cloth 32 is mounted held in the engaging portion 55, is attached such that the wide portion 51 is held between the cut and raised portion 17 and the forward edge portion 12. When the mounting member 50 is mounted to the forward edge portion 12, the cut and raised portion 17 engages with the recess 66d. The cut and raised portion 17 and the recess 66d position the mounting member 50. The cut and raised portion 17 and the recess 66d also act as a rotation supressing member, and prevent the mounting member 50 from rotating about the end portion 12e of the forward edge portion 12 of the side frame 10 toward an outside surface of the forward edge portion 12, in other words, toward an extension portion 54, that is, in an arrow E direction in FIG. 45.

In the example in FIGS. 44 and 45, the cut and raised portion 17 has a width in an axial direction of the rotation, that is, in an extension direction of the forward edge portion 12 and the mounting member 50, formed shorter than a width of the mounting member 50 in the same direction. However, the width of the cut and raised portion 17 is not limited to this, and may be formed the same length as the width of the mounting member 50 in the extension direction, or longer than the width of the mounting member 50 in the extension direction.

Although the recess 66d is provided in the example in FIGS. 44 and 45, the recess 66d does not necessarily need to be provided.

Figure 43:
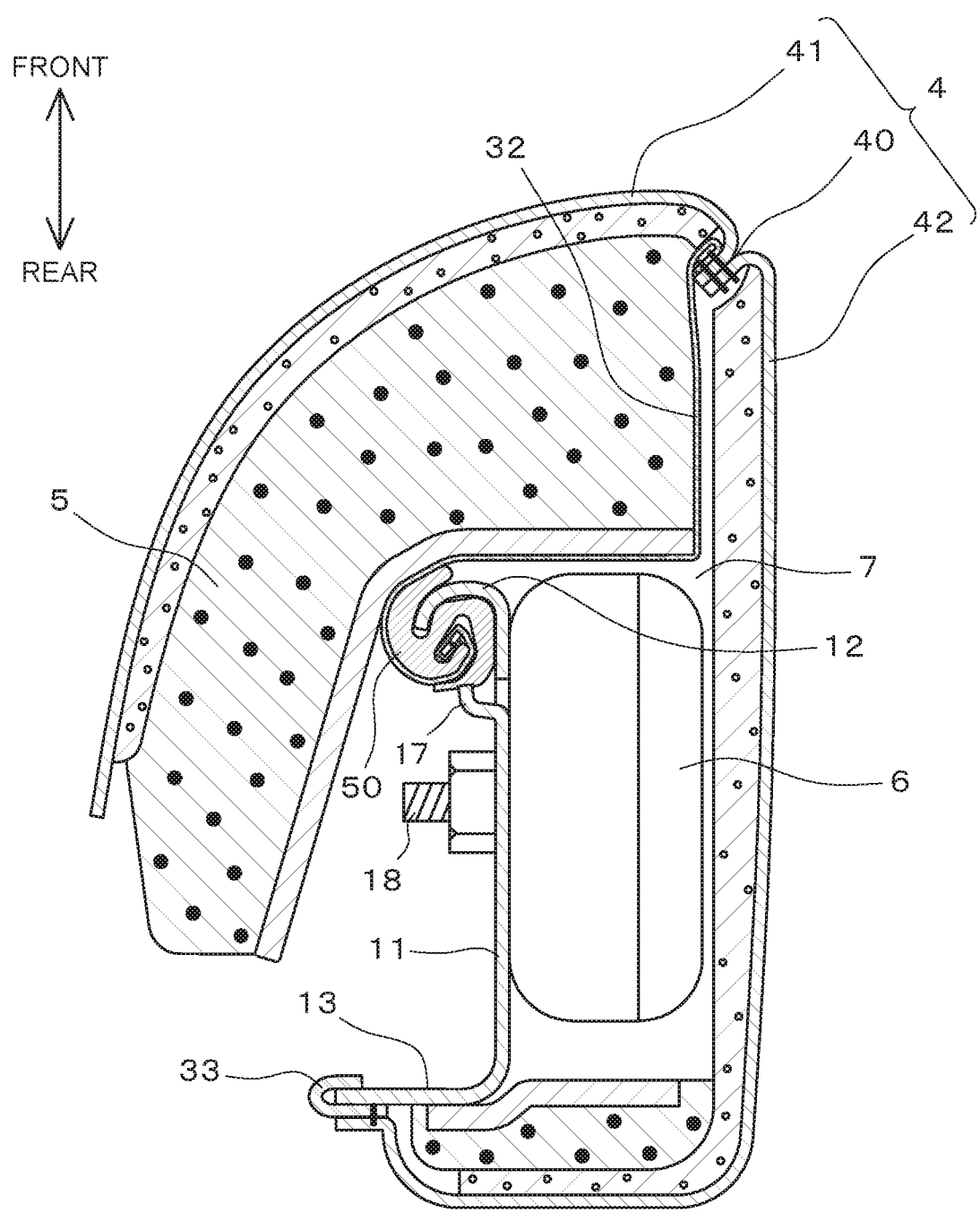
FIG. 43 is a cross-sectional view along A-A in FIG. 1.

As shown in FIG. 43, the cut and raised portion 17 is provided in a position different from that of a bolt 18 for mounting an airbag module 6 to the side frame 10. The cut and raised portion 17 is provided closer to the front of the seat S than the bolt 18, and is arranged at a distance therefrom in a seat S front to back direction.

A modification of the cut and raised portion is shown in FIGS. 46 to 49.

Figure 46:
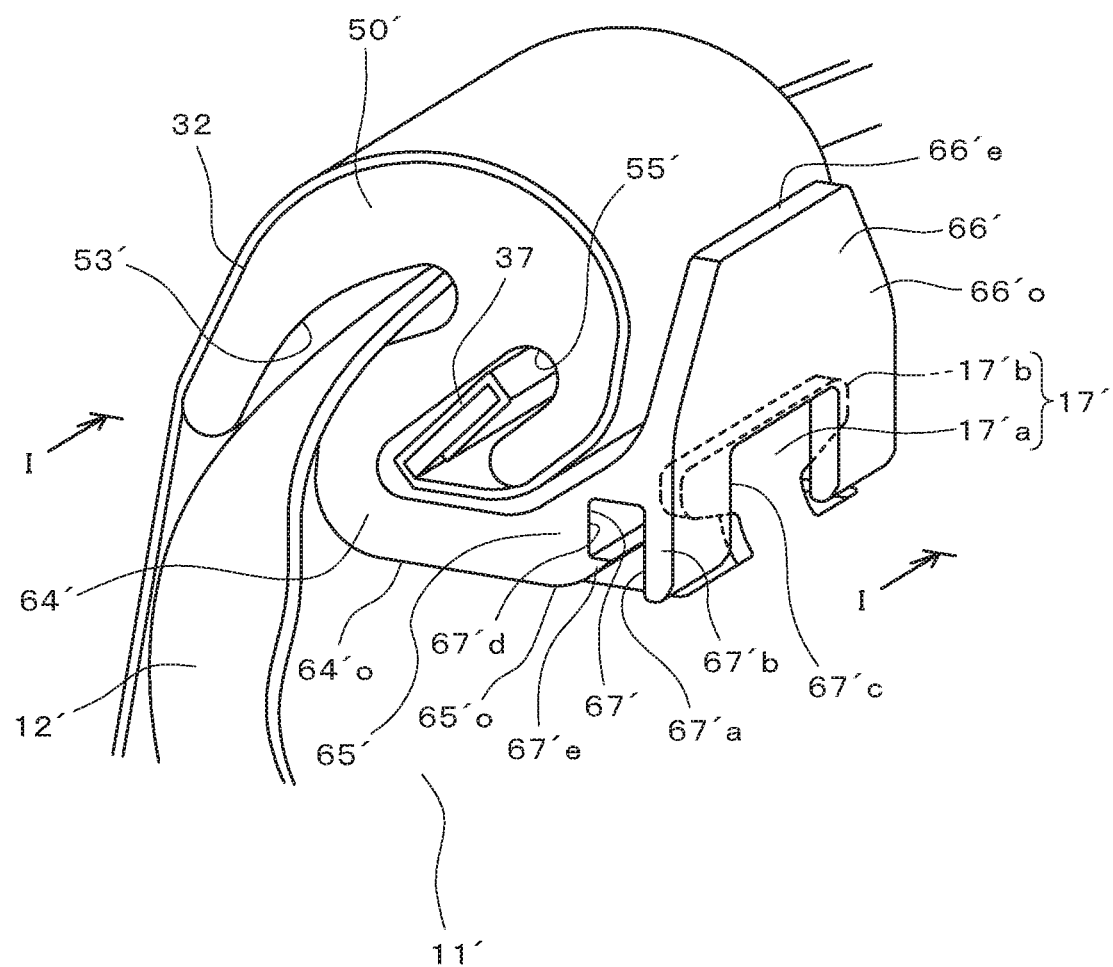
FIG. 46 is an explanatory perspective view diagram of a mounting member with a cut and raised portion according to a modification of embodiment 8 of the present invention.

A cut and raised portion 17' in this example is provided in a position near a forward edge portion 12' substantially in parallel with the forward edge portion 12', and is erected from a side plate 11' toward the inside of a seat S. As shown in FIG. 46, the cut and raised portion 17' is formed in a T shape with a distal end portion 17'b longer than a base portion 17'a in an extension direction of the forward edge portion 12'. All corners of the ends of the distal end portion 17'b are in an R shape to facilitate insertion of the distal end portion 17'b into a locking groove 67'.

Lower end surfaces of portions of the distal end portion 17'b that are not continuous with the base portion 17'a are oblique surfaces inclined to be lower toward the base portion 17'a at the center. Thus, the lower end surfaces of the portions of the distal end portion 17'b that are not continuous with the base portion 17'a are oblique surfaces inclined to be lower toward the base portion 17'a, thereby facilitating insertion of the distal end portion 17'b into the locking groove 67'.

A mounting member 50' shown in FIGS. 46 to 49 is attached to the side frame 10' provided with the cut and raised portion 17' in this example. The locking groove 67' with which the cut and raised portion 17' engages is provided in a second extension portion 65' of the mounting member 50'.

The locking groove 67' has an opening 67'a provided in an outer wall surface 65'o of the second extension portion 65', and is formed as a groove perpendicular to an outer wall surface 64'o of a first extension portion 64' and parallel to an outer wall surface 66'o of a third extension portion 66'. The locking groove 67' extends between both ends of the mounting member 50' in an extension direction, that is, from the upper end to the lower end.

The outer wall surface 66'o of the third extension portion 66' is extended in a direction opposite to an end portion 66'e of the third extension portion 66'. The extended portion constitutes a side wall 67'b of the locking groove 67' on the opposite side to the first extension portion 64'.

The side wall 67'b of the locking groove 67' is cut in a generally rectangular shape in an area near the center of the extension direction of the mounting member 50', forming an opening 67'*c*. The length of the opening 67'*c* in the extension direction of the mounting member 50' is formed greater than the width of the base portion 17'*a* of the cut and raised portion 17' in the extension direction.

The opening 67'*c* divides the side wall 67'*b* into two. An area from the third extension portion 66' to the side wall 67'*b* is C-shaped.

Figure 48:
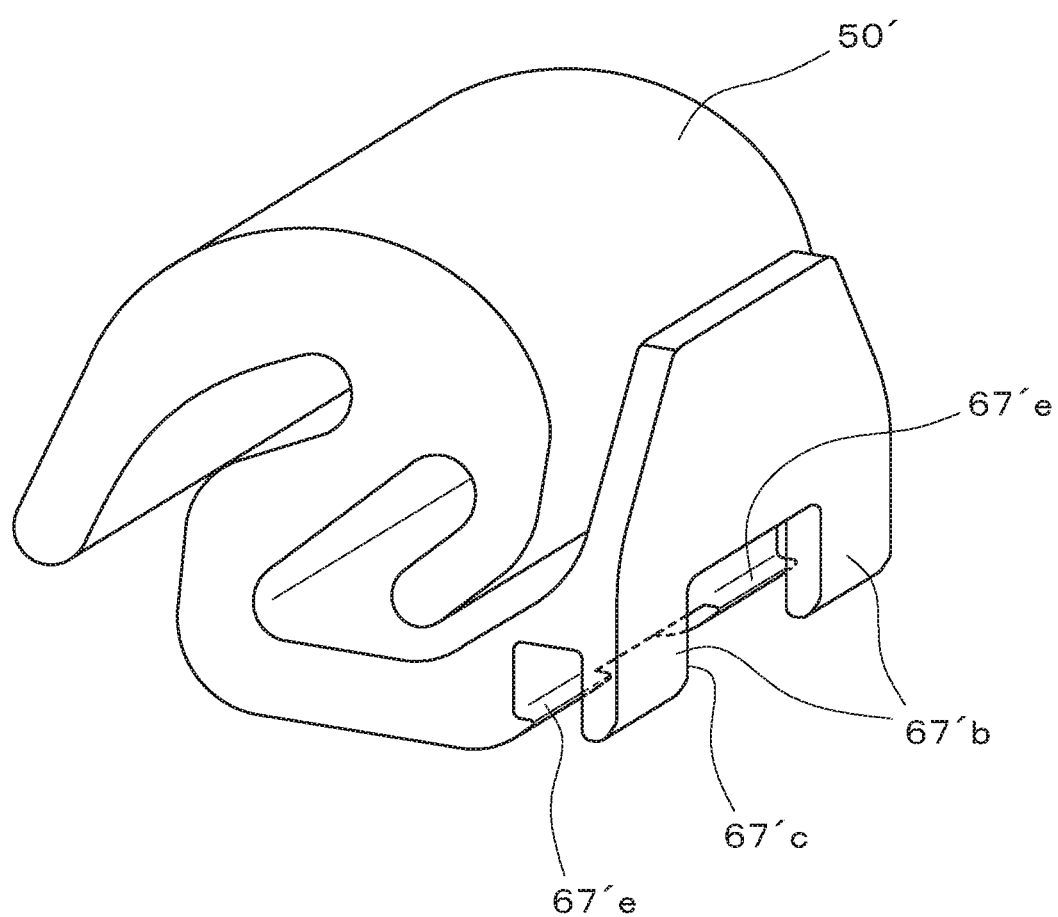
FIG. 48 is an explanatory perspective view diagram of a protrusion in a locking groove of the mounting member with which the cut and raised portion engages according to the modification of embodiment 8 of the present invention.

A side wall 67'*d* opposite to the side wall 67'*b* is formed with a protrusion 67'*e* extending in the extension direction of the mounting member 50' along the length of the opening 67'*a*. A surface of the protrusion 67'*e* at the back of the locking groove is erected perpendicularly from the side wall 67'*d*, but may be formed at an obtuse angle with respect to the side wall 67'*d*. As shown in FIG. 48, the protrusion 67'*e* is formed only at places facing the side wall 67'*b*, and is not formed at a place facing the opening 67'*c*.

The mounting member 50' is attached to the forward edge portion 12' by the bottom of the distal end portion 17'*b* of the cut and raised portion 17' being engaged with the protrusion 67'*e*.

The attachment of the mounting member 50' is performed as follows. First, a trim plate 37 to which an end portion of a stay cloth 32 is mounted is engaged with an engaging portion 55' of the mounting member 50'.

In this state, the groove 53' is engaged with the forward edge portion 12'. The locking groove 67' of the mounting member 50' is butted against the seat S upper or lower end portion of the distal end portion 17'*b*. The mounting member 50' is slid along the forward edge portion 12' to insert the distal end portion 17'*b* into the locking groove 67'.

When only the distal end portion 17'*b* moves in the locking groove 67' and the base portion 17'*a* is outside the locking groove 67', the distal end portion 17'*b* and the protrusion 67'*e* do not butt against each other, and a side surface of the distal end portion 17'*b* and the side walls 67'*b*, 67'*d* are substantially in parallel.

When the base portion 17'*a* is inserted into the locking groove 67', a curved outside surface of the base portion 17'*a* butts against the protrusion 67'*e*.

There is some space between the locking groove 67' and the distal end portion 17'*b*. Accordingly, as shown in FIG. 49, when an end portion of the side wall 67'*b* is made to abut on a curved inside surface of the base portion 17'*a*, and the distal end of the protrusion 67'*e* is made to abut on the curved outside surface of the base portion 17'*a*, to incline the mounting member 50' so that the first extension portion 64' side is slightly apart from the side plate 11', the base portion 17'*a* can be inserted through a space between the locking groove 67' and the distal end portion 17'*b*.

The provision of a space between the locking groove 67' and the distal end portion 17'*b* like this allows for absorption of tolerances between the locking groove 67' and the distal end portion 17'*b*.

A space does not necessarily need to be provided between the locking groove 67' and the distal end portion 17'*b*. When no space is provided between the locking groove 67' and the distal end portion 17'*b*, the cut and raised portion 17' can be prevented from rotating in the locking groove 67'.

Figure 49:
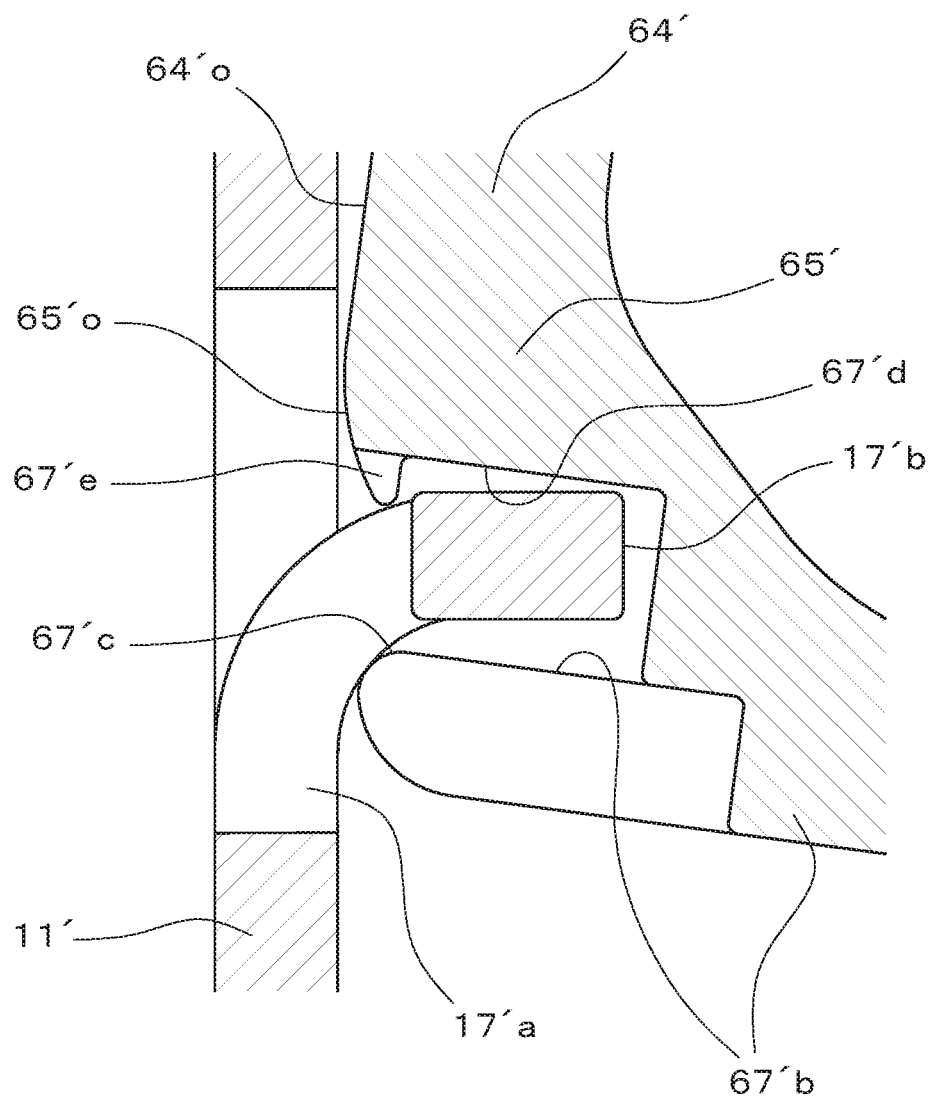
FIG. 49 is an explanatory cross-sectional view diagram of the cut and raised portion according to the modification of embodiment 8 of the present invention, and is a cross-sectional explanatory diagram of the cut and raised portion, the locking groove of the mounting member, and the surroundings cut at an opening along a plane perpendicular to an extension direction of the mounting member, with one end of a distal end portion inserted first reaching the opening, a base portion approaching a space between a side wall and the protrusion, and the other end of the distal end portion left outside the locking groove.

FIG. 49 is a cross-sectional explanatory view in which the cut and raised portion 17', the locking groove 67' of the mounting member 50', and the surroundings are cut at the opening 67'*a* along a plane perpendicular to the extension direction of the mounting member 50' in the state where the distal end portion 17'*b* first inserted reaches the opening 67'*c*, the base portion 17'*a* is reaching a space between the side wall 67'*b* and the protrusion 67'*e*, and the other end of the distal end portion 17'*b* is left outside the locking groove 67'.

At this time, the side surfaces of the distal end portion 17'*b* and the side walls 67'*b*, 67'*d* are inclined to each other.

Figure 47:
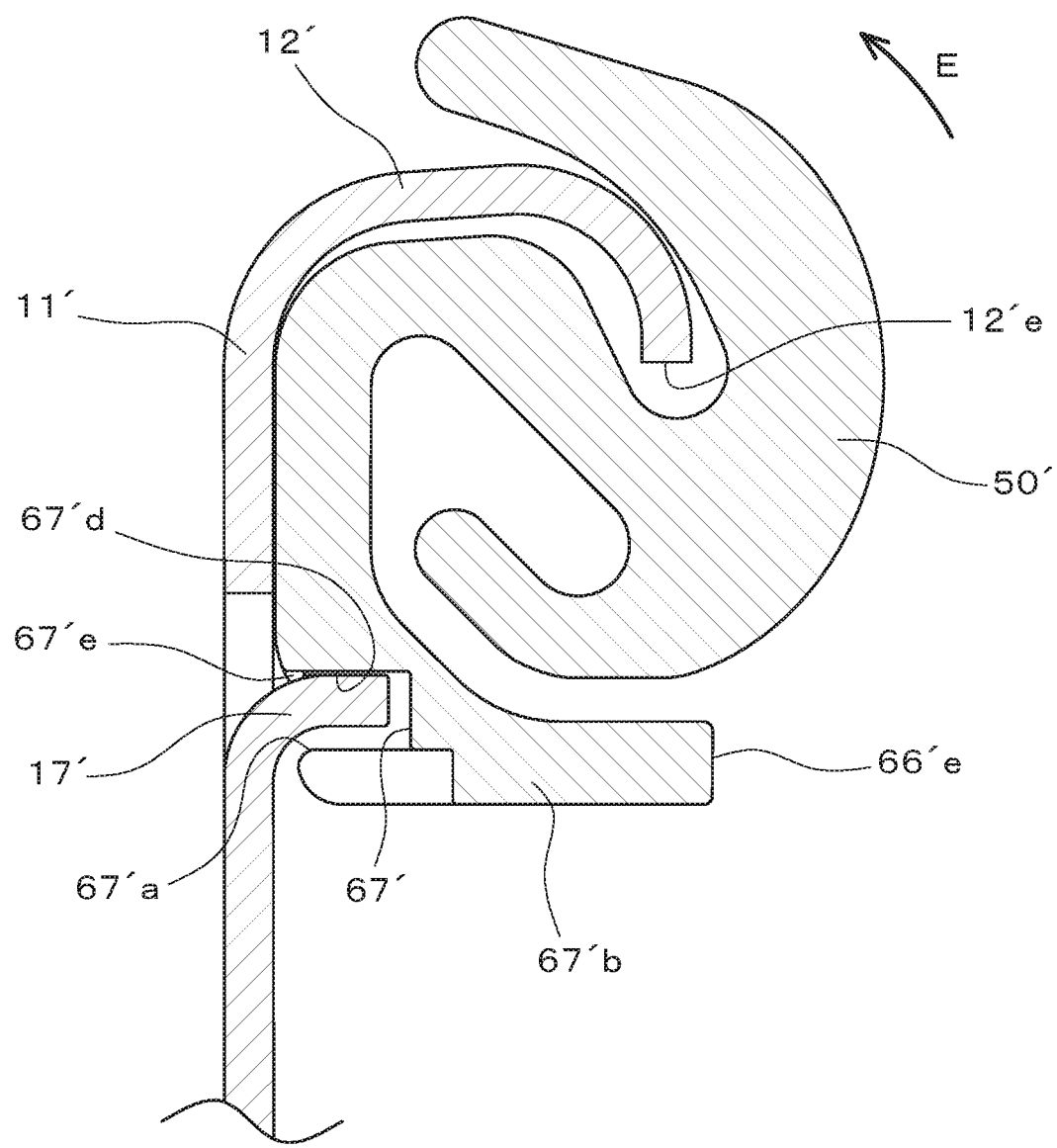
FIG. 47 is a cross-sectional view along I-I in FIG. 46.

The base portion 17'*a* passes through a space between the protrusion 67'*e* and the side wall 67'*b* to be held, as shown in FIGS. 47 and 48, in an area facing the opening 67'*c*. In this area, the protrusion 67'*e* is not present and does not constitute an obstacle, the mounting member 50' is again returned to the state in which the side surfaces of the distal end portion 17'*b* is substantially in parallel with the side walls 67'*b*, 67'*d*.

The distal end portion 17'*b* is engaged with the protrusion 67'*e* and housed in the locking groove 67'. Accordingly, the mounting member 50' can be prevented from being rotated about an end portion 12'*e* of the forward edge portion 12' of the side frame 10' toward the outer surface of the forward edge portion 12', in other words, toward the extension portion 54', that is, in an arrow E direction in FIG. 48 by the trim plate 37 engaged with the engaging portion 55' being subjected to the tensile force from the stay cloth 32.

Unless the mounting member 50' is inclined about the distal end of the side wall 67'*b* in a direction to make the extension portion 64' side apart from the side plate 11', the distal end portion 17'*b* cannot pass between the protrusion 67'*e* and the side wall 67'*b*, and cannot move in the up and down direction of the mounting member 50'. This direction is opposite to the direction in which the mounting member 50' tries to rotate when subjected to the tensile force from the stay cloth 32, and is a direction in which its rotation is difficult when the seat S in this embodiment is in use. Thus, when the seat S is in use, the distal end portion 17'*b* is in a state of being difficult to move in the up and down direction of the mounting member 50', and the cut and raised portion 17' realizes the vertical position restriction of the mounting member 50'.

Further, the opening 67'*c* for receiving the base portion 17'*a* of the cut and raised portion 17' is provided at the center in the up and down direction of the mounting member 50', realizing the vertical position restriction of the mounting member 50'.

Moreover, the cut and raised portion 17' is formed in a generally T shape so that the length of engagement between the distal end portion 17'*b* and the protrusion 67'*e* can be made long while the cut and raised portion 17' is made compact, resulting in increased stiffness of support by the cut and raised portion 17'.

The locking groove 67' is formed in the second extension portion 65' formed thickest of the surfaces of the mounting member 50' abutting the side plate 11' so that the locking groove 67' can ensure support stiffness for the cut and raised portion 17'.

Figure 50:
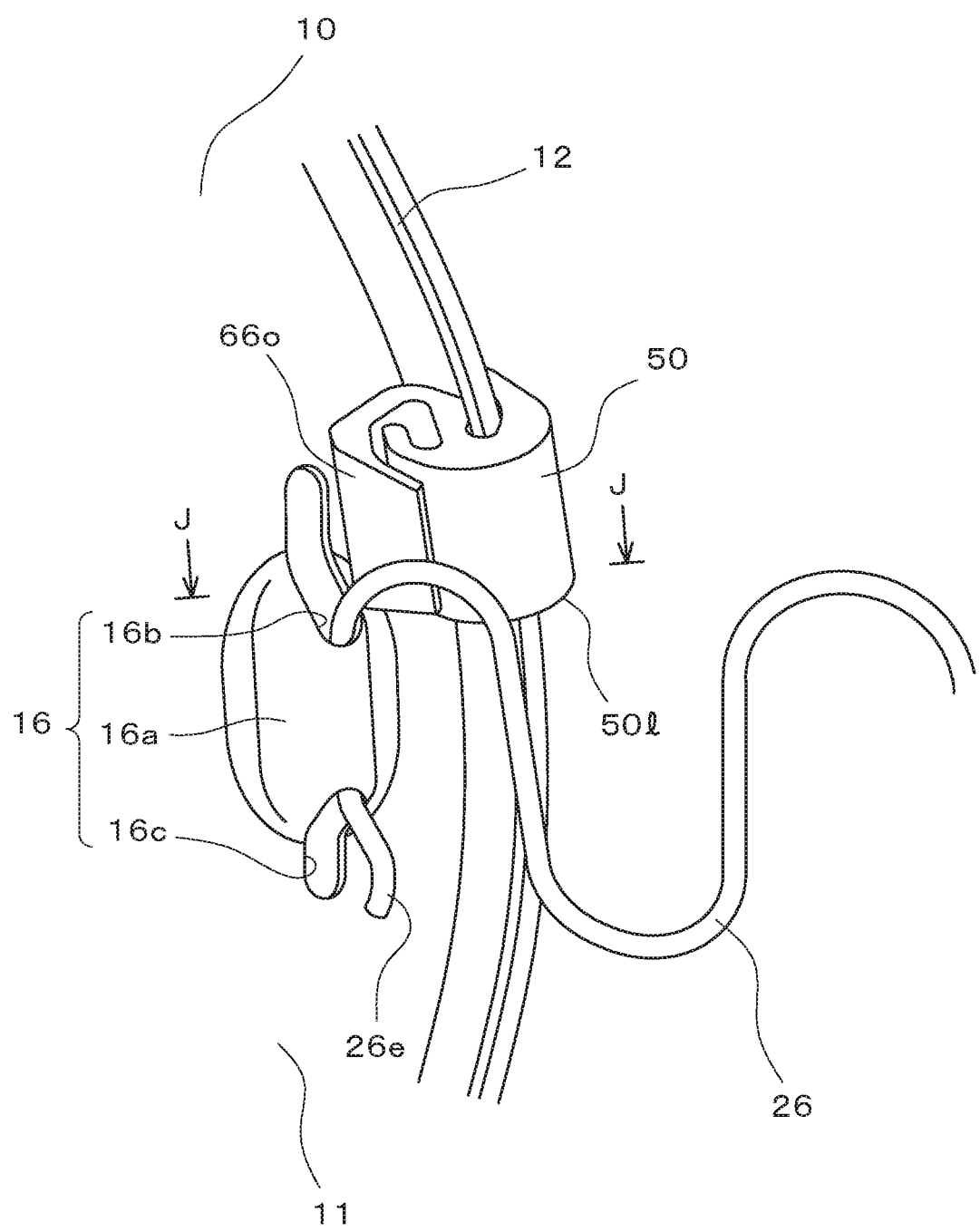
FIG. 50 is an explanatory perspective view diagram illustrating the mounting member mounted to the seat back frame according to embodiment 8 of the present invention.
Figure 51:
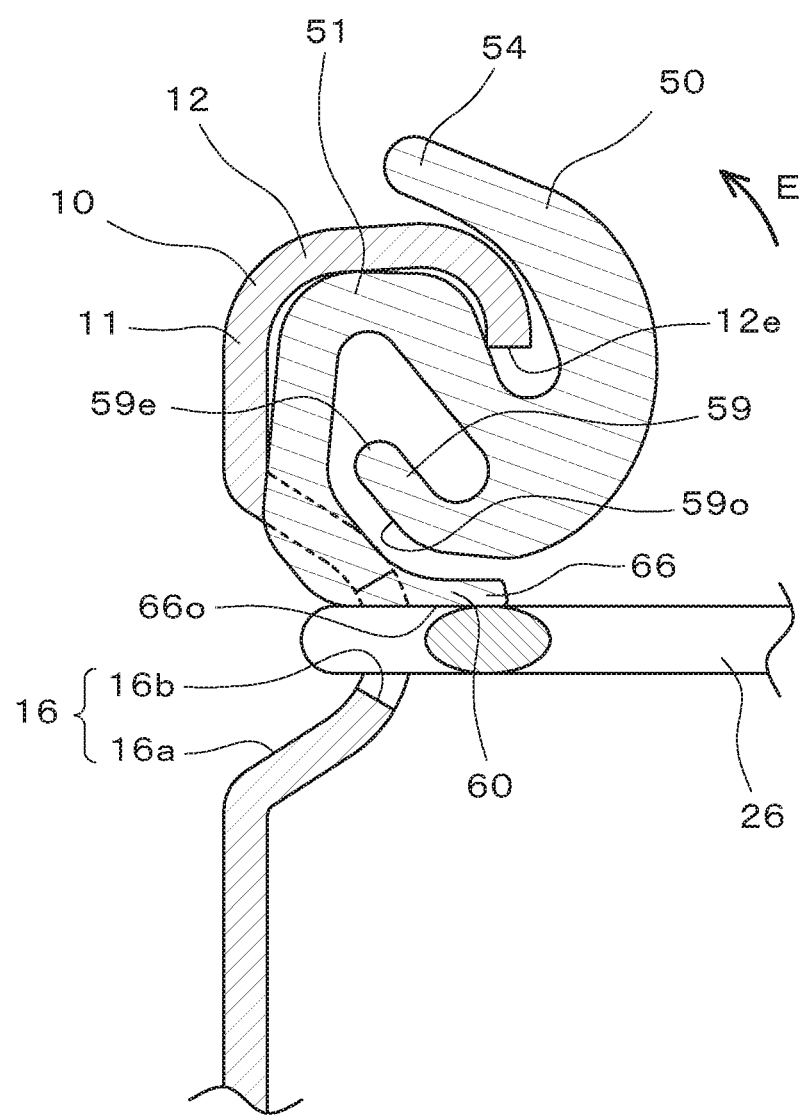
FIG. 51 is a cross-sectional view along J-J in FIG. 50.

In this embodiment, rotation of the mounting member 50 is prevented by the cut and raised portion and the recess or the locking groove, which is not limiting. As shown in FIGS. 50 and 51, as another example of a rotation suppressing member, a hung-across member 26 may be used.

As shown in FIGS. 50 and 51, a mounting member 50 is disposed above an engaging portion 16. A lower end surface 50*l* of the mounting member 50 is placed on a curved portion 16*a* of the engaging portion 16, and is supported by a portion of the curved portion 16*a* protruded inward from a surface of the side frame 10 on the inside of the vehicle seat S. Thus, since the mounting member 50 is placed on the engaging portion 16, the mounting member 50 is prevented from moving downward, and a stay cloth is prevented from leaning downward by gravity.

A third extension portion 66 of the mounting member 50 abuts, at an outer wall surface 66o, the hung-across member 26. A portion from a wide portion 51 to a second wall 60 of the mounting member 50 is biased toward and pressed against a forward edge portion 12 by the hung-across member 26. With this, a trim plate 37 engaged with an engaging portion 55 is subjected to the tensile force from a stay cloth 32, thereby preventing the mounting member 50 from rotating about an end portion 12e of the forward edge portion 12 of the side frame 10 toward the outer surface of the forward edge portion 12, in other words, toward an extension portion 54, that is, in an arrow E direction in FIG. 51.

The hung-across member 26 corresponds to a different member.

At this time, the third extension portion 66 is supported on a crest portion of the hung-across member 26 made from an S spring most displaced in a direction perpendicular to an extension direction of the spring, in other words, on the place with the maximum amplitude of the S spring in a wave shape.

Further, a recess to engage the crest portion may be provided in a place of the outer wall surface 66o of the third extension portion 66 of the second wall 60 on which the hung-across member 26 abuts, to position the hung-across member 26 and the third extension portion 66.

When a hole formed by drawing for mounting a different member is present near the forward edge portion 12 of the side frame 10, the mounting member 50 may be provided between a portion protruded by drawing around the hole and the forward edge portion 12. At this time, the protruded portion is made to abut on the outer wall surface 66o of the third extension portion 66 of the mounting member 50. In this configuration, the portion protruded by drawing (not shown) corresponds to a different member mounting portion.

In this embodiment, the mounting member 50 is configured to include a groove 53 to be attached to the forward edge portion 12 corresponding to a mounted portion, and the engaging portion 55 to house inside the trim plate 37 to which an end portion side of the stay cloth 32 is mounted, but is not limited to this, and may be configured as a J hook to which the end portion side of the stay cloth 32 is attached.

In this embodiment, a guide member for guiding the deployment direction of an airbag module, a mounting member to which an end portion side of the guide member is attached, and a mounted portion to which the mounting member is connected are included, and a rotation suppressing portion for preventing rotation of the mounting member with respect to the mounted portion is provided between the mounted portion and the mounting member.

Accordingly, the mounting member can be efficiently prevented from rotating with respect to the mounted portion. Specifically, during airbag deployment, the mounting member is subjected to a large force and is liable to rotate. Thus, even during airbag deployment, the mounting member can be prevented from rotating with respect to the mounted portion.

The rotation suppressing portion is a protrusion provided on a surface of a side frame on which the mounting member abuts.

Thus, the simple configuration can efficiently prevent the mounting member from rotating with respect to the side frame.

The protrusion is made by a cut and raised portion formed by cutting and raising a surface.

Thus, the simple configuration can efficiently prevent the mounting member from rotating with respect to the side frame.

The width of the cut and raised portion in an extension direction of a place of the side frame to which the mounting member is attached is smaller than the width of the mounting member in the extension direction.

Formation of the cut and raised portion results in formation of a hole in the side frame. The hole can be made smaller with respect to the mounting member, which thus prevents a reduction in rigidity when the mounting member is attached to the side frame.

The cut and raised portion is provided in a position different from the position of mounting the airbag module to the side frame.

Thus, interference between the mounting member and a member such as a bolt for mounting the airbag module to the side frame can be prevented, resulting in improved workability.

The side frame has a flange that is an end portion at the front or rear of the seat bent inward of the seat. The mounted portion is the flange. The protrusion is provided adjacent to the flange.

Accordingly, the mounting member can be attached to the flange with high rigidity while being prevented from rotating, resulting in increased rigidity when the mounting member is attached.

The protrusion is formed by a different member mounted to the side frame or a different member mounting portion provided at the side frame for mounting the different member.

Thus, an existing component can be used to effect suppression of rotation of the mounting member, eliminating the need to provide an additional rotation suppressing member, resulting in reduced man-hours to manufacture.

The protrusion is formed by a different member mounting portion provided at the side frame for mounting a different member mounted to the side frame. The different member is a member disposed at the seat back of the seat for supporting the back of an occupant.

Thus, an existing member for supporting the back of an occupant can be used to effect suppression of rotation of the mounting member, eliminating the need to provide an additional rotation suppressing member, resulting in reduced man-hours to manufacture.

The protrusion is formed by an S spring mounted to the side frame. The S spring abuts the surface of the mounting member opposite to the flange, at a crest portion displaced most in a direction perpendicular to the extension direction of the S spring, thereby preventing rotation of the mounting member with respect to the side frame.

Thus, an existing S spring can be used to effect suppression of rotation of the mounting member, eliminating the need to additionally provide a rotation suppressing member, and resulting in reduced man-hours to manufacture. Further, since a crest portion highest in rigidity of the portions of the S spring is made to abut on the surface of the mounting member opposite to the flange, the mounting member can be pressed against the flange by a sufficient force, resulting in a high degree of effectiveness in rotation suppression.

For hooks as in the '659 Document, hooks engaged with the airbag module side can be rotated by a force applied during airbag deployment. For connecting members for connecting end portions of stay cloths to the airbag module side as in the '659 Document, it has been desired that workability in the work of mounting the connecting members be improved, man-hours to manufacture the connecting members be reduced, and rigidity when the connecting members are attached to the airbag module side be increased. This embodiment can provide an airbag module-equipped seat in which a mounting member for mounting a stay cloth to the airbag module side is prevented from rotating during airbag deployment, and the mounting member.

Further, an airbag module-equipped seat using a mounting member for mounting a stay cloth to the airbag module side and providing good workability in the work of attaching the mounting member, and the mounting member can be provided.

Further, an airbag module-equipped seat using a mounting member for mounting a stay cloth to the airbag module side and reducing man-hours to manufacture the mounting member, and the mounting member can be provided.

Further, an airbag module-equipped seat using a mounting member for mounting a stay cloth to the airbag module side and providing high rigidity when the mounting member is attached to the airbag module side, and the mounting member can be provided.

REFERENCE NUMERALS

S1 seatback
S2 seat base portion
S3 headrest
F seat frame
D1, D2, D3 arrow
R torque
1 seat back frame
2 seat base frame
3 reclining mechanism
4 trim cover
5 cushion pad
6 airbag module
7 space
10 side frame
11 side plate
11a module connection portion
12 forward edge portion
12h hole
13 rear edge portion
14, 14', 51p, 58h protrusion
21 upper frame
22 lower frame
23 pillar support
31 first stay cloth
32 second stay cloth (stay cloth, guide member)
33 locking member
34 edge on the tearing portion side
35 edge opposite to the tearing portion
36 mounting portion
37 trim plate (lock member)
40 tearing portion
41 front gore
42 side gore
50, 50a, 50b, 50c, mounting member
50d, 50e, 50f, 50i
50g first clip
50h second clip
50l outer surface
51, 51e, 51g, 51i wide portion
52, 52e, 52g, 52i hooking portion
53, 53g, 53i, 59g groove (seat frame engagement groove)
53a first opening
54, 54e, 54g, 54i extension portion
54s slit
55, 55i engaging portion (lock member engagement groove)
55e open end, second opening
55f closed end
56, 57 tensile force absorbing portion
58g recess
59 first wall
60 second wall

The invention claimed is:

1. A mounting member, comprising:
a seat frame engagement groove configured to engage with an edge portion of a seat frame of an airbag module-equipped seat, and
a lock member engagement groove configured to engage with a lock member that is attached to one end of a guide member, an other end of the guide member being attached to a tearing portion of a trim cover of the airbag module-equipped seat;
wherein:
the seat frame engagement groove comprises a first opening,
the lock member engagement groove comprises a second opening,
the first opening and the second opening are open toward opposite sides relative to each other, and
the seat frame engagement groove in a cross-section extends in a same direction as an extending direction of at least a part of the guide member that extends from the lock member to the tearing portion of the trim cover.

2. The mounting member according to claim 1, wherein:
the lock member engagement groove comprises an open end and a closed end that is arranged opposite to the open end, and
the open end is disposed at an outer side of the closed end in a seat width direction.

3. The mounting member according to claim 1, wherein the lock member engagement groove is disposed between an outer end and an inner end of a side frame of the seat frame in a seat width direction.

4. The mounting member according to claim 1, further comprising an outer surface that extends from the lock member engagement groove to a side to which the guide member extends and that is bent at an obtuse angle.

5. The airbag module-equipped seat according to claim 1, wherein:
the seat frame comprises a forward edge portion and a rear edge portion, and
the one end of the guide member is disposed at an outer side of a line segment connecting an inner end of the forward edge portion and an inner end of the rear edge portion in a seat width direction.

6. An airbag module-equipped seat, comprising:
a seat frame,
an airbag module housing an airbag and mounted to the seat frame,
a trim cover having a tearing portion,
a guide member configured to transmit stress caused by inflation of the airbag to the tearing portion of the trim cover, and
a mounting member comprising:
a seat frame engagement groove configured to engage with an edge portion of the seat frame, and
a lock member engagement groove configured to engage with a lock member that is attached to one end of the guide member, an other end of the guide member being attached to the tearing portion of the trim cover,
wherein:
the edge portion of the seat frame is provided at an end portion of the seat frame in a seat front-to-rear direction and comprises a flange, and
the seat frame engagement groove sandwiches the flange of the edge portion to engage with the seat frame.

7. The airbag module-equipped seat according to claim 6, wherein:
the airbag module is connected to the seat frame by a bolt at a module connection portion of the seat frame, and
the one end of the guide member is disposed at an inner side of the module connection portion in a seat width direction.

8. The airbag module-equipped seat according to claim 6, wherein:
the seat frame comprises a forward edge portion and a rear edge portion, and
the one end of the guide member is disposed at an outer side of a line segment connecting an inner end of the forward edge portion and an inner end of the rear edge portion in a seat width direction.

9. The airbag module-equipped seat according to claim 6, wherein the guide member extends from an outer side of the seat frame to the lock member engagement grooves to wrap around a part of the mounting member, and is attached to the lock member engagement groove at the one end of the guide member.

10. The airbag module-equipped seat according to claim 6, wherein:
the seat frame comprises a side frame, and
the mounting member is attached to the side frame to cover an inner surface and an outer surface of an edge portion of the side frame.

11. The airbag module-equipped seat according to claim 6, wherein:
the lock member engagement groove comprises an open end and a closed end that is arranged opposite to the open end, and
the open end is disposed at an outer side of the closed end in a seat width direction.

12. The airbag module-equipped seat according to claim 6, wherein:
the seat frame engagement groove comprises a first opening,
the lock member engagement groove comprises a second opening,
the first opening and the second opening are open toward opposite sides relative to each other, and
the seat frame engagement groove in a cross-section extends in a same direction as an extending direction of at least a part of the guide member that extends from the lock member to the tearing portion of the trim cover.

13. The airbag module-equipped seat according to claim 6, wherein the lock member engagement groove is disposed between an outer end and an inner end of a side frame of the seat frame in a seat width direction.

14. The mounting member according to claim 6, further comprising an outer surface that extends from the lock member engagement groove to a side to which the guide member extends and that is bent at an obtuse angle.

15. The airbag module-equipped seat according to claim 1, wherein the seat frame is provided with a flange at the edge portion of the seat frame configured to engage with the mounting member.

16. A method of assembling the airbag module-equipped seat of claim 6, the method comprising:
attaching the lock member to one end of the guide member; and
engaging the mounting member with the edge portion of the seat frame.

17. The method of claim 6, wherein the lock member engagement groove is disposed between an outer end and an inner end of a side frame of the seat frame in a seat width direction.

18. The airbag module-equipped seat according to claim 6, wherein the guide member extends from an outer side of the seat frame to the lock member engagement grooves to wrap around a part of the mounting member, and is attached to the lock member engagement groove at the one end of the guide member.

* * * * *